(12) United States Patent
Gouw et al.

(10) Patent No.: US 12,540,115 B2
(45) Date of Patent: Feb. 3, 2026

(54) INHIBITORS OF PHOSPHOLIPID SYNTHESIS AND METHODS OF USE

(71) Applicant: The Board of Trustees of the Leland Stanford Junior University, Stanford, CA (US)

(72) Inventors: Arvin Gouw, San Francisco, CA (US); Steven R. Schow, Redwood City, CA (US); Robert J. Greenhouse, Newark, CA (US); Toni Kline, San Francisco, CA (US); Dean W. Felsher, San Mateo, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 881 days.

(21) Appl. No.: 17/635,891

(22) PCT Filed: Aug. 20, 2020

(86) PCT No.: PCT/US2020/047161
§ 371 (c)(1),
(2) Date: Feb. 16, 2022

(87) PCT Pub. No.: WO2021/035031
PCT Pub. Date: Feb. 25, 2021

(65) Prior Publication Data
US 2022/0315528 A1 Oct. 6, 2022

Related U.S. Application Data

(60) Provisional application No. 62/889,864, filed on Aug. 21, 2019.

(51) Int. Cl.
| | | |
|---|---|---|
| *A61K 31/41* | (2006.01) |
| *A61P 3/00* | (2006.01) |
| *C07C 311/08* | (2006.01) |
| *C07C 311/14* | (2006.01) |
| *C07C 311/51* | (2006.01) |
| *C07D 213/79* | (2006.01) |
| *C07D 401/04* | (2006.01) |
| *C07D 493/04* | (2006.01) |
| *C07D 493/10* | (2006.01) |

(52) U.S. Cl.
CPC ............ *C07C 311/08* (2013.01); *A61K 31/41* (2013.01); *A61P 3/00* (2018.01); *C07C 311/14* (2013.01); *C07C 311/51* (2013.01); *C07D 213/79* (2013.01); *C07D 401/04* (2013.01); *C07D 493/04* (2013.01); *C07D 493/10* (2013.01)

(58) Field of Classification Search
CPC .............................. C07D 257/04; A61K 31/41
See application file for complete search history.

(56) References Cited

U.S. PATENT DOCUMENTS

| | | | | |
|---|---|---|---|---|
| 7,645,773 B2 * | 1/2010 | Gillespie | .............. | C07D 417/14 546/152 |
| 9,493,411 B2 * | 11/2016 | Hasvold | .................... | A61P 9/14 |
| 11,702,394 B2 * | 7/2023 | Gouw | ................ | C07D 295/088 514/239.2 |
| 2009/0131475 A1 | 5/2009 | Uesugi et al. | | |
| 2012/0083471 A1 | 4/2012 | Townsend et al. | | |

FOREIGN PATENT DOCUMENTS

| | | | | |
|---|---|---|---|---|
| JP | 11092366 A * | 4/1999 | ............. | A61K 31/18 |
| WO | WO-2006109680 A1 * | 10/2006 | ........... | A61K 31/415 |
| WO | WO-2010005922 A1 * | 1/2010 | ............. | A61K 31/18 |
| WO | WO-2017140841 A1 * | 8/2017 | ................ | A61P 3/10 |
| WO | WO2019165232 | 8/2019 | | |

OTHER PUBLICATIONS

PubChem CID 60661318, National Center for Biotechnology Information. PubChem Compound Summary for CID 60661318, N-[2-(hydroxymethyl)phenyl]-1-phenylmethanesulfonamide. https://pubchem.ncbi.nlm.nih.gov/compound/60661318. Accessed Nov. 27, 2024, create date Oct. 18, 2012. (Year: 2012).*
Outlaw et al., Med. Chem. Comm. (2014), 5(6), 826-830. (Year: 2014).*
A machine generated English translation of JP 11-092366 A (Konishi et al.), 1999. (Year: 1999).*
A machine generated English translation of WO 2006/109680 A1 (Kuroiwa et al.), 2006. (Year: 2006).*
PUBCHEM-CID et al. (2012), "N-Phenylmethanesulfonamide", C7H9NO2S, pp. 1-28.

* cited by examiner

*Primary Examiner* — Laura L Stockton
(74) *Attorney, Agent, or Firm* — Pamela J. Sherwood; Andrew R. Guzman; Bozicevic, Field & Francis LLP

(57) ABSTRACT

Inhibitors of Glycerol 3-Phosphate Acyltransferase (GPAT) are provided; and methods of use in the treatment of cancer; and treatment of conditions relating to metabolic syndrome, hyperlipidemia, infection and inflammation.

7 Claims, 10 Drawing Sheets

INHIBITORS OF PHOSPHOLIPID SYNTHESIS AND METHODS OF USE

CROSS-REFERENCE

This application claims the benefit of U.S. Provisional Patent Application No. 62/889,864, filed Aug. 21, 2019, which application is incorporated herein by reference in its entirety.

GOVERNMENT RIGHTS

This invention was made with Government support under contracts CA184384 awarded by the National Institutes of Health. The Government has certain rights in the invention.

INTRODUCTION

Synthesis of mammalian phospholipids is based on a diacylglycerol unit that is contributed by either diacylglycerol or CDP-diacylglycerol. These phospholipid precursors are generated from phosphatidic acid. First, 1-acylglycerol-3-phosphate (also called lyso-phosphatidic acid or LPA) is made from glycerol-3-phosphate via glycerol-3-phosphate acyltransferase or from the acylation of dihydroxyacetone phosphate and reduction of 1-acyl-dihydroxyacetone phosphate to 1-acylglycerol-3-P. Membranes of the ER and mitochondria contain distinct isoforms of glycerol-3-phosphate acyltransferase (GPAT). The 1-acylglycerol-3-phosphate is then converted into phosphatidic acid by acyltransferase activities. Subsequently, diacylglycerol is generated from phosphatidic acid by the action of phosphatidic acid phosphatase-1. Alternatively, CDP-diacylglycerol synthase, an enzyme that is associated primarily with the ER catalyzes a reaction between CTP and phosphatidic acid leading to formation of CDP-diacylglycerol.

Phospholipids are involved in stabilizing proteins within the membrane, facilitating the active conformational structure of proteins, and as cofactors in enzymatic reactions. Phospholipids are essential for the absorption, transport and storage of lipids. Phospholipids are secreted into the bile to aid in the digestion and absorption of dietary fat. They form the monolayer on the surface of lipoproteins which function to transport neutral lipids throughout the body. Finally, phospholipids serve as a reservoir for signaling molecules, such as arachidonic acid, phosphatidate, diacylglycerol and inositol trisphosphate.

Targeted control of phospholipid synthesis through enzyme-specific inhibition is of interest for a variety of therapeutic, veterinary, and agricultural purposes. The present disclosure provides compositions and methods for this purpose.

SUMMARY

Provided are pharmacologic inhibitors of glycerol-3-phosphate acyltransferase (GPAT) and methods of use thereof. In some embodiments an effective dose of the GPAT inhibitor is administered to an individual or nonhuman animal for the treatment of cancer. In some embodiments the cancer is MYC-driven. In some embodiments the cancer is screened and determined to be lipogenesis-dependent. In other embodiments an effective dose of the GPAT inhibitor is administered to an individual or animal for treatment of metabolic syndrome and related disorders, including without limitation hyperlipidemia, diabetes, fatty liver disease, obesity, cardiovascular conditions, etc. In another embodiment GPAT inhibitors can also be used as treatments for infectious diseases and inflammatory or immune diseases in animals, including humans.

In some embodiments the GPAT inhibitor has a formula (I):

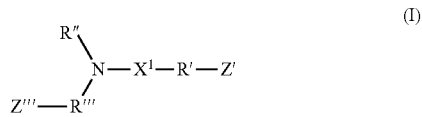

wherein:
R' and R''' are each independently selected from alkyl, substituted alkyl, alkyl alkenyl, alkyl alkynyl, cycloalkyl, cycloalkyl(alkyl), heterocycloalkyl, heterocycloalkyl(alkyl), substituted heterocycloalkyl, aryl, substituted aryl, aryl(alkyl), substituted aryl(alkyl), heteroaryl, substituted heteroaryl, and halo(alkyl);

Z' and Z''' are optional substituents selected from alkynyl, hydroxy, alkyl(hydroxy), ester, ether, nitrile/cyano, trifluoromethyl, trifluoromethyl ether, trifluoromethyl thioether, trifluoromethyl sulfoxide, trifluoromethyl sulfone, halide, polyalcohol, a straight chain or cyclic saccharide, amine, polyamine, ammonium, amide, azido, nitro, isonitrile, sulfate/sulfonic acid, sulfonate, sulfinate, sulfoxide, sulfone, carboxylate, carboxyl ester, ketone, aldehyde, carboxyl amide, lactone, amidine, sulfonamide, phosphate, phosphonate, phosphinate, boronic acid, boronate ester, amide, thiolate/thiol, thioester, and a carboxy isostere, wherein Z' or Z''' optionally forms a bond to a second compound of formula (I);

R'' is selected from hydrogen, alkyl, substituted alkyl, $OR^{1a}$, $NR^{1a_2}$ and $SR^{1a}$;

$R^{1a}$ is selected H, $COR^{2a}$, $SO_2R^{2a}$, $NHR^{2a}$, and $NHCOR^{2a}$, wherein each $R^{2a}$ are independently selected from alkyl, substituted alkyl, alkyl alkenyl, alkyl alkynyl, cycloalkyl, cycloalkyl(alkyl), heterocycloalkyl, heterocycloalkyl(alkyl), substituted heterocycloalkyl, aryl, substituted aryl, aryl(alkyl), substituted aryl(alkyl), heteroaryl, substituted heteroaryl, and halo(alkyl);

or R'' and Z' or Z''' together with the atoms to which they are attached form a cyclic group selected from heterocycloalkyl, or substituted heterocycloalkyl; and $X^1$ is selected from sulfonyl, sulfinyl, sulfonimidoyl, phosphonyl, phosphinate, thiophosphonyl, thiophosphinate, and phosphonamidate, or a pharmaceutically acceptable salt or solvate thereof.

In some embodiments the compound is a prodrug. In some embodiments, Formula (I) is chiral. Both mixed and single enantiomers and diastereomers are included in a chiral compound of formula (I).

In some embodiments a pharmaceutical formulation is provided, comprising a subject GPAT inhibitor (e.g., of formula (I)), and a pharmaceutically acceptable excipient. In some embodiments the formulation is provided in a unit dose form. In some embodiments the formulation is provided in sterile packaging for clinical use.

In some embodiments the subject GPAT inhibitor is used in the manufacture of a medicament for the treatment of cancer, the treatment of metabolic syndrome and related disorders, the treatment of infections and infestations, and the treatment of immunological disorders.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures.

DEFINITIONS

Figure 1:
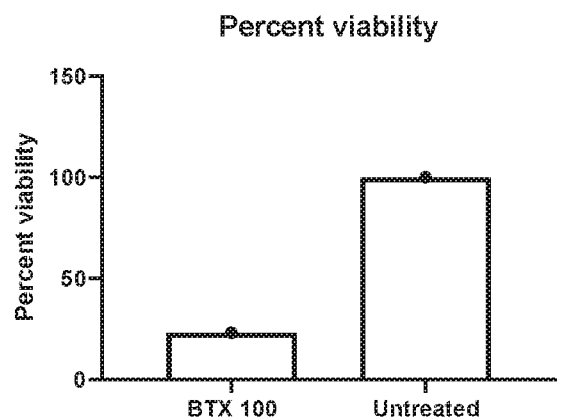
FIG. 1 illustrates that exemplary GPAT inhibitor BTX 100 suppresses cancer cell proliferation.

Before the present methods and compositions are described, it is to be understood that this invention is not limited to particular method or composition described, as such may, of course, vary. It is also to be understood that the terminology used herein is for the purpose of describing particular embodiments only, and is not intended to be limiting, since the scope of the present invention will be limited only by the appended claims.

In describing and claiming the present invention, certain terminology will be used in accordance with the definitions set out below. It will be appreciated that the definitions provided herein are not intended to be mutually exclusive. Accordingly, some chemical moieties may fall within the definition of more than one term.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are now described. All publications mentioned herein are incorporated herein by reference to disclose and describe the methods and/or materials in connection with which the publications are cited. It is understood that the present disclosure supersedes any disclosure of an incorporated publication to the extent there is a contradiction.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

It must be noted that as used herein and in the appended claims, the singular forms "a", "an", and "the" include plural referents unless the context clearly dictates otherwise. Thus, for example, reference to "a cell" includes a plurality of such cells and reference to "the peptide" includes reference to one or more peptides and equivalents thereof, e.g. polypeptides, known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

The terms "treatment", "treating", "treat" and the like are used herein to generally refer to obtaining a desired pharmacologic and/or physiologic effect. The effect can be prophylactic in terms of completely or partially preventing a disease or symptom(s) thereof and/or may be therapeutic in terms of a partial or complete stabilization or cure for a disease and/or adverse effect attributable to the disease. The term "treatment" encompasses any treatment of a disease in a plant, fish, reptile, bird or mammal, particularly a human, and includes: (a) preventing the disease and/or symptom(s) from occurring in a subject who may be predisposed to the disease or symptom(s) but has not yet been diagnosed as having it; (b) inhibiting the onset of disease and/or symptom(s), i.e., curing or arresting development of a disease and/or the associated symptoms; or (c) relieving the disease and the associated symptom(s), i.e., causing regression or preventing progression of the disease and/or symptom(s). Those in need of treatment can include those already affected (e.g., those with cancer, e.g. those having tumors) as well as those in which prevention is desired (e.g., those with increased susceptibility to cancer; those with cancer; those suspected of having cancer; etc.).

The terms "recipient", "individual", "subject", "host", and "patient", are used interchangeably herein and refer to any mammalian subject for whom diagnosis, treatment, or therapy is desired, particularly humans. "Mammal" for purposes of treatment refers to any animal classified as a mammal, including humans, domestic and farm animals, and zoo, sports, or pet animals, such as dogs, horses, cats, rabbits, small rodents, cows, sheep, goats, pigs, camels, etc. In some embodiments, the mammal is human. In some veterinary embodiments, the above terms also apply to fish, reptiles and birds (i.e., parrots, chickens, turkeys, cockatoos). In some agricultural embodiments (i.e., fungal infection), the above terms also apply to plants and trees.

A "therapeutically effective amount", a "therapeutically effective dose" or "therapeutic dose" is an amount sufficient to effect desired clinical results (i.e., achieve therapeutic efficacy, achieve a desired therapeutic response, etc.). A therapeutically effective dose can be administered in one or more administrations. For purposes of this disclosure, a therapeutically effective dose of an agent that inhibits a target gene (e.g., a MYC-dependent target gene, and the like) and/or compositions is an amount that is sufficient, when administered to the individual, to cure, palliate, ameliorate, stabilize, reverse, prevent, slow or delay the progression of the disease state (e.g., cancer, etc.) by, for example, inhibiting the growth of, inducing death of or otherwise preventing the clinical progressing of a MYC-dependent cancer present in the subject.

Glycerol-3-phosphate acyltransferase (GPAT, EC 2.3.1.15) There are four known isoforms of GPAT in humans, two microsomal isoforms located in the endoplasmic reticulum (GPAT3 and GPAT4), and two located in mitochondria (mtGPAT1 and mtGPAT2). The mitochondrial forms may be referred to as GPAM. mtGPAT1 is located on the outer mitochondrial membrane. mtGPAT1 displays a strong preference for incorporating palmitoyl-CoA (16:0), thereby primarily producing saturated phospholipids, whereas the other three enzymes are not selective. In some embodiments a GPAT inhibitor described herein selectively inhibits GPAT1.

FSG67 (2-(Nonylsulfonamido)benzoic acid) is an inhibitor of glycerol 3-phosphate acyltransferase (GPAT); $IC_{50}=24$ µM. It has been shown to reduce food intake, decrease body weight and adiposity, enhance energy utilization as fatty acid oxidation, reverse hepatic steatosis, and enhance insulin sensitivity in diet-induced obese mice. The inhibitor comprises structures with a negative charge at physiological pH to mimic the phosphate group of glycerol-3-phosphate and a long, saturated chain to mimic the chain of palmitoyl-CoA, the substrate for which GPAT1 demonstrates a strong preference. A sulfonamide linker can represent a stable mimic of the presumed intermediate or transition state of the acylation reaction catalyzed by GPAT.

The term "obesity-related condition" refers to any disease or condition that is caused by or associated with (e.g., by biochemical or molecular association) obesity or that is caused by or associated with weight gain and/or related biological processes that precede clinical obesity. Examples of obesity-related conditions include, but are not limited to, type 2 diabetes, metabolic syndrome, fatty liver disease such as NASH, hyperglycemia, hyperinsulinemia, impaired glucose tolerance, impaired fasting glucose, hyperlipidemia, hypertriglyceridemia, insulin resistance, hypercholesterolemia, atherosclerosis, coronary artery disease, peripheral vascular disease, vascular dementia and hypertension.

The terms "cancer," "neoplasm," and "tumor" are used interchangeably herein to refer to cells which exhibit autonomous, unregulated growth, such that they exhibit an aberrant growth phenotype characterized by a significant loss of control over cell proliferation. Cells of interest for detection, analysis, or treatment in the present application include precancerous (e.g., benign), malignant, pre-metastatic, metastatic, and non-metastatic cells. Cancers of virtually every tissue are known. The phrase "cancer burden" refers to the quantum of cancer cells or cancer volume in a subject. Reducing cancer burden accordingly refers to reducing the number of cancer cells or the cancer volume in a subject. The term "cancer cell" as used herein refers to any cell that is a cancer cell or is derived from a cancer cell e.g. clone of a cancer cell. Many types of cancers are known to those of skill in the art, including solid tumors such as carcinomas, sarcomas, glioblastomas, melanomas, lymphomas, myelomas, etc., and circulating cancers such as leukemias.

In some cases, the individual has recently undergone treatment for neoplasia (e.g., cancer, a tumor, etc.) and are therefore at risk for recurrence. In some instances, the individual has not recently or previously undergone treatment for a neoplasia (e.g., cancer, a tumor, etc.) but has been newly diagnosed with a neoplasia. Any and all neoplasia are suitable neoplasia to be treated by the subject methods e.g., utilizing an agent described herein or a herein described treatment kit.

Infectious diseases include infections caused by protozoan parasites, helminths, fungi, mites, bacteria and viruses infesting plants/trees, fish, reptiles, birds, and mammals, including humans.

Inflammatory or immune diseases include but are not limited to autoimmune diseases such as rheumatoid arthritis, MS, psoriasis, lupus, systemic sclerosis, inflammatory bowel disease/Crohn's disease, T-1 diabetes, Grave's disease, myasthenia gravis, vasculitis, contact dermatitis, osteoarthritis, gout, asthma, periodontitis sinusitis, gingivitis, HGD (transplant rejection), and GVHD.

The terms "co-administration" and "in combination with" include the administration of two or more therapeutic agents either simultaneously, concurrently or sequentially within no specific time limits. In one embodiment, the agents are present in the cell or in the subject's body at the same time or exert their biological or therapeutic effect at the same time. In one embodiment, the therapeutic agents are in the same composition or unit dosage form. In other embodiments, the therapeutic agents are in separate compositions or unit dosage forms. In certain embodiments, a first agent can be administered prior to (e.g., minutes, 15 minutes, 30 minutes, 45 minutes, 1 hour, 2 hours, 4 hours, 6 hours, 12 hours, 24 hours, 48 hours, 72 hours, 96 hours, 1 week, 2 weeks, 3 weeks, 4 weeks, 5 weeks, 6 weeks, 8 weeks, or 12 weeks before), concomitantly with, or subsequent to (e.g., 5 minutes, 15 minutes, 30 minutes, 45 minutes, 1 hour, 2 hours, 4 hours, 6 hours, 12 hours, 24 hours, 48 hours, 72 hours, 96 hours, 1 week, 2 weeks, 3 weeks, 4 weeks, 5 weeks, 6 weeks, 8 weeks, or 12 weeks after) the administration of a second therapeutic agent. Exemplary combinations of agents include chemotherapeutic and immune-oncology agents for the treatment of cancer; and agents for treatment of metabolic syndrome, T-2 diabetes and related disorders, agents such as statins, ezetimibe, thiazolidinediones, GLP-1 agonists, DPP-4 inhibitors, flozin/SGLT-2 inhibitor drugs, sulfonylureas/secretagogues, insulin, etc. Other exemplary combinations of agents include, anti-inflammatory drugs, immune modulators, immune suppressants, anti-cytokine antibodies and sequestrants, antibiotics, antifungal agents, antiviral drugs, antiparasitic agents, and antihelminth agents.

The terms "specific binding," "specifically binds," and the like, refer to non-covalent or covalent preferential binding to a molecule relative to other molecules or moieties in a solution or reaction mixture (e.g., an antibody specifically binds to a particular polypeptide or epitope relative to other available polypeptides). In some embodiments, the affinity of one molecule for another molecule to which it specifically binds is characterized by a $K_D$ (dissociation constant) of $10^{-5}$ M or less (e.g., $10^{-6}$ M or less, $10^{-7}$ M or less, $10^{-8}$ M or less, $10^{-9}$ M or less, 10-10 M or less, $10^{-11}$ M or less, $10^{-12}$ M or less, $10^{-13}$ M or less, $10^{-14}$ M or less, $10^{-15}$ M or less, or $10^{-16}$ M or less). "Affinity" refers to the strength of binding, increased binding affinity being correlated with a lower Kd.

The term "Alkyl" refers to a $C_1$-$C_{20}$ alkyl that may be linear, branched, or cyclic. "Lower alkyl", as in "lower alkyl", or "substituted lower alkyl", means a $C_1$-$C_{10}$ alkyl. The term "alkyl", "lower alkyl" or "cycloalkyl" includes methyl, ethyl, isopropyl, propyl, butyl, isobutyl, sec-butyl, tert-butyl, pentyl, neopentyl, hexyl, cyclopropyl, cyclopropylmethyl, cyclobutyl, cyclobutylmethyl, cyclopentyl, cyclopentylmethyl, cyclohexyl, cyclohexylmethyl, $C_6$ to $C_{12}$ spirocycles, cyclopropylethyl, cyclobutylethyl, decalinyl, Bicyclo-[1.1.1]-pentyl, norboranyl, bicylo-[2.2.2]-octyl, cubyl, adamantanyl and related cage hydrocarbon moieties. In certain embodiments, the alkyl is a $C_1$-$C_{20}$ alkyl. In certain embodiments the alkyl group is poly deuterated.

A "substituted alkyl" is an alkyl which is typically mono-, di-, or tri-substituted with heterocycloalkyl, aryl, substituted aryl, heteroaryl, nitro, cyano (also referred to herein as nitrile), azido, halo, —OR, —SR, —SF$_5$, —CHO, —COR, —C(O)OR, —C(O)—NR$_2$, —OC(O)R, —OC(O)NR$_2$, —OC(O)OR, —P(O)(OR)$_2$, —OP(O)(OR)$_2$, —NR$_2$, —N$^+$R$_3$ (wherein a counterion may be present), —CONR$_2$, —NRCOR, —NHC(O)OR, —NHC(O)NR$_2$, —NHC(NH) NR$_2$, SO$_3^-$, —SO$_2$OR, —OSO$_2$R, —SO$_2$NR$_2$, or —NRSO$_2$R, where each R is, independently, hydrogen, lower alkyl, R'-substituted lower alkyl, aryl, R'-substituted aryl, heteroaryl, heteroaryl(alkyl), R'-substituted aryl(alkyl), or aryl(alkyl) and each R' is, independently, hydroxy, halo, alkyloxy, cyano, thio, SF$_5$, nitro, alkyl, halo-alkyl, or amino. Substituted alkyls which are substituted with one to three of the substituents selected from the group consisting of alkynyl, cyano, halo, alkyloxy, thio, nitro, amino, or hydroxy are particularly of interest.

The term "Aryl" refers to an aromatic ring having (4n+2) pi electrons that may contain 6 to 20 ring carbon atoms, and be composed of a single ring (e.g., phenyl), or two or more condensed rings, such as 2 to 3 condensed rings (e.g., naphthyl), or two or more aromatic rings, such as 2 to 3 aromatic rings, which are linked by a single bond (e.g., biphenylyl). In certain cases, the aryl is $C_8$-$C_{16}$ or $C_8$ to $C_{14}$. In certain embodiments the alkyl group has one or more hydrogen atoms replaced with deuterium.

Heteroaryl means an aromatic ring system containing (4n+2)pi electrons and comprised of 1 to 10 ring carbon atoms and 1 to 5 heteroatoms selected from O, N, S, Se, having a single ring (e.g., thiophene, pyridine, pyrazine, imidazole, oxazole, tetrazole, etc.), or two or more condensed rings, for example 2 to 3 condensed rings (e.g., indole, benzimidazole, quinolone, quinoxaline, phenothiazine, etc.), or two or more aromatic rings, such as 2 to 3 aromatic rings, which are linked by a single bond (e.g., bipyridyl). In some cases, the heteroaryl is $C_1$-$C_{16}$, and a selection of 1 to 5 heteroatoms consisting of S, Se, N, and O.

The term "heterocycloalkyl", "heterocycle", "heterocyclic group" or "heterocyclyl" refers to a saturated or unsaturated nonaromatic ring system containing 1 to 10 ring carbon atoms and 1 to 5 heteroatoms selected from O, N, S, Se, having a single ring (e.g., tetrahydrofuran, aziridine, azetidine, pyrrolidine, piperidine, tetrathiopyran, hexamethylene oxide, oxazepane, etc.), or two or more condensed rings, such as 2 to 3 condensed rings (e.g., indoline, tetrahydrobenzodiazapines, etc., including fused, bridged and spiro ring systems, having 3-15 ring atoms, included 1 to 4 heteroatoms. In certain cases, the heterocycloalky is $C_1$-$C_{16}$, and a selection of 1 to 5 heteroatoms consisting of S, Se, N, and O. In fused ring systems, one or more of the rings can be cycloalkyl, heterocycloalkyl, aryl, or heteroaryl, provided that the point of attachment is through the non-aromatic ring. In certain embodiments, the nitrogen and/or sulfur atom(s) of the heterocyclic group are optionally oxidized to provide for the N-oxide, —S(O)—, or —SO$_2$— moieties.

Examples of heterocycles and heteroaryls include, but are not limited to, azetidine, pyrrole, imidazole, benzimidazole, pyrazole, benzopyrazole, tetrazole, 1,2,3-triazole, benzotriazole, 1,2,4-triazole, pyridine, pyrazine, pyrimidine, pyridazine, indolizine, isoindole, indole, dihydroindole, indazole, purine, quinolizine, isoquinoline, quinoline, phthalazine, naphthylpyridine, quinoxaline, quinazoline, cinnoline, pteridine, carbazole, carboline, phenanthridine, acridine, phenanthroline, isothiazole, benzoisothiazole, phenazine, isoxazole, benzoisooxazole, phenoxazine, phenothiazine, imidazolidine, imidazoline, piperidine, piperazine, indoline, phthalimide, 1,2,3,4-tetrahydroisoquinoline, 4,5,6,7-tetrahydrobenzo[b]thiophene, thiazole, benzothiazole, thiazolidine, furan, benzofuran, thiophene, benzothiophene, benzo[b]thiophene, morpholinyl, thiomorpholinyl (also referred to as thiamorpholinyl), 1,1-dioxothiomorpholinyl, piperidinyl, pyrrolidine, tetrahydrofuranyl, benzotetrahydrofuranyl, and the like.

Substituted heterocycloalkyl, aryl, heteroaryl are optionally substituted with, hydrogen, 1 to 3 alkyl, alkenyl, alkynyl, cycloalkyl, cycloalkyl(alkyl), aryl, substituted aryl, aryl (alkyl), —SO$_2$NR$^5$R$^5$, —PO$_3$H$_2$, —NR$^5$SO$_2$R$^6$ or —NR$^5$C (=O)R$^6$, wherein R$^5$ and R$^6$ are independently, hydrogen, alkyl, alkenyl, alkynyl, cycloalkyl, cycloalkyl(alkyl), aryl, optionally substituted heterocycloalkyl, aryloxy, heteroaryl, heteroaryl(alkyl), or R$^5$ and R$^6$ together are —(CH$_2$)$_{3\text{-}6}$- or —(CH$_2$)$_{0\text{-}3}$X(CH$_2$)$_{0\text{-}3}$— where X=NR, O, S, SO$_2$, substituted aryl(alkyl), halo(alkyl), SF$_5$, NR$^5_3{}^+$, azido, cyano (also referred to herein as nitrile), —OR$^5$, —SR$^5$, —NR$^5$R$^6$, halogen, nitro, SCH$_3$, OCF$_3$, SO$_2$CH$_3$, SCF$_3$, SO$_2$CF$_3$, CF$_3$, —SO$_2$OR$^5$, —OSO$_2$R$^5$, CCl$_3$, —C(=O)R$^5$, —C(=O)OR$^5$; —C(=O)NR$^5$R$^6$, —OC(=O)R$^5$.

By "substituted" as in "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation, functional groups, and the hydrocarbyl moieties C1-C24 alkyl (including C1-C18 alkyl, further including C1-C12 alkyl, and further including C$_1$-C$_6$ alkyl), C2-C24 alkenyl (including C2-C18 alkenyl, further including C2-C12 alkenyl, and further including C2-C6 alkenyl), C2-C24 alkynyl (including C2-C18 alkynyl, further including C2-C12 alkynyl, and further including C2-C6 alkynyl), C5-C30 aryl (including C5-C20 aryl, and further including C5-C12 aryl), and C6-C30 aralkyl (including C6-C20 aralkyl, and further including C6-C12 aralkyl). The above-mentioned hydrocarbyl moieties may be further substituted with one or more functional groups or additional hydrocarbyl moieties such as those specifically enumerated. Unless otherwise indicated, any of the groups described herein are to be interpreted as including substituted and/or heteroatom-containing moieties, in addition to unsubstituted groups.

"Sulfonyl" refers to the group SO$_2$-alkyl, SO$_2$-substituted alkyl, SO$_2$-alkenyl, SO$_2$-substituted alkenyl, SO$_2$-alkynyl, SO$_2$-substituted alkynyl, SO$_2$-cycloalkyl, SO$_2$-substituted cycloalkyl, SO$_2$-cycloalkenyl, SO$_2$-substituted cylcoalkenyl, SO$_2$-aryl, SO$_2$-substituted aryl, SO$_2$-heteroaryl, SO$_2$-substituted heteroaryl, SO$_2$-heterocyclic, and SO$_2$-substituted heterocyclic, wherein alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic, and substituted heterocyclic are as defined herein. Sulfonyl includes, by way of example, methyl-SO$_2$—, phenyl-SO$_2$—, and 4-methylphenyl-SO$_2$—. Sulfonimidoyl refers to S(O)(NH)-bonded as for sulfonyl defined above.

The term "water-soluble group" refers to a functional group that is well solvated in aqueous environments and that imparts improved water solubility to the compound to which it is attached. Water-soluble groups of interest include, but are not limited to, polyalcohols, straight chain or cyclic saccharides, primary, secondary, tertiary, or quaternary amines and polyamines, sulfate groups, sulfonate groups, sulfinate groups, carboxylate groups, phosphate groups, phosphonate groups, phosphinate groups, ascorbate groups, glycols, including polyethylene glycols (PEG) and modified PEGs, and polyethers. In some instances, water-soluble groups are primary, secondary, tertiary, and quaternary amines, carboxylates, phosphonates, phosphates, sulfonates, sulfates, —N(H)$_{0\text{-}1}$(CH$_2$CH$_2$OH)$_{1\text{-}2}$, —NHCH$_2$CH$_2$N (CH$_3$)$_{2\text{-}3}$, —NHCH$_2$CH$_2$SO$_3$H, —NHCH$_2$CH$_2$PO$_3$H$_2$ —NHCH$_2$CH$_2$CO$_2$H, —(CH$_2$CH$_2$O)$_{yy}$CH$_2$CH$_2$XR$^{yy}$, —(CH$_2$CH$_2$O)$_{yy}$CH$_2$CH$_2$X—, —X(CH$_2$CH$_2$O)$_{yy}$CH$_2$ CH$_2$—, glycol, oligoethylene glycol, and polyethylene glycol, wherein yy is selected from 1 to 1000, X is selected from O, S, and NR$^{zz}$, and R$^{zz}$ and R$^{yy}$ are independently selected from H and C1-3 alkyl.

The term "carboxy isostere" refers to standard medicinal bioisosteric replacement groups for carboxylic acids, amides and ester. These include, but are not limited to: acyl cyanamide, tetrazoles, hydroxychromes, 3-hydroxy-1,2,4-triazoles, 1-hydroxy pyrazoles, 2,4-dihydroxy imidazoles, 1-hydroxy imidazole, 1-hydroxy 1,2,3-triazole, alkylsulfonyl carboxamides, hydroxy isoxazoles, 5-hydroxy 1,2,4-oxadiazoles, thiazoles, 1,2,4-oxadiazoles, 1,2,4-oxadiazolones, oxazoles, triazoles, thiazoles, others hydroxamic acids, sulfonimide, acylsulfonamide, sulfonylureas, oxadiazolone, thiazolidinediones, oxadiazole, thiadiazole, isothiazoles, difluorophenols, tetramic acids, tetronic acids, squaric acids, hydroxyquinoline-ones, hydroxyquinoline-2-ones, boronic acids and phosphoric acids.

As used herein the term "PEG" refers to a polyethylene glycol or a modified polyethylene glycol. Modified polyethylene glycol polymers include a methoxypolyethylene glycol, and polymers that are unsubstituted or substituted at one end with an alkyl, a substituted alkyl or a substituent (e.g., as described herein).

By the term "functional groups" is meant chemical groups such as halo, hydroxyl, sulfhydryl, C1-C24 alkoxy, C2-C24 alkenyloxy, C2-C24 alkynyloxy, C5-C20 aryloxy, acyl (including C2-C24 alkylcarbonyl (—CO-alkyl) and C6-C20 arylcarbonyl (—CO-aryl)), acyloxy (—O-acyl), C2-C24 alkoxycarbonyl (—(CO)—O-alkyl), C6-C20 aryloxycarbonyl (—(CO)—O-aryl), halocarbonyl (—CO)—X where X is halo), C2-C24 alkylcarbonato (—O—(CO)—O-alkyl), C6-C20 arylcarbonato (—O—(CO)—O-aryl), carboxy (—COOH), carboxylato (—COO—), carbamoyl (—(CO)—NH$_2$), mono-substituted C1-C24 alkylcarbamoyl (—(CO)—NH(C1-C24 alkyl)), di-substituted alkylcarbamoyl (—(CO)—N(C1-C24 alkyl)$_2$), mono-substituted arylcarbamoyl (—(CO)—NH-aryl), thiocarbamoyl (—(CS)—NH$_2$), carbamido (—NH—(CO)-NH$_2$), cyano (—C≡N), isocyano (—N+≡C—), cyanato (—O—C≡N), isocyanato (—O—N+° C.—), isothiocyanato (—S—C≡N), azido (—N=N+=N—), formyl (—(CO)—H), thioformyl (—(CS)—H), amino (—NH$_2$), mono- and di-(C1-C24 alkyl)-substituted amino, mono- and di-(C5-C20 aryl)-substituted amino, C2-C24 alkylamido (—NH—(CO)-alkyl), C5-C20 arylamido (—NH—(CO)-aryl), imino (—CR=NH where R=hydrogen, C1-C24 alkyl, C5-C20 aryl, C6-C20 alkaryl, C6-C20 aralkyl, etc.), alkylimino (—CR=N(alkyl), where R=hydrogen, alkyl, aryl, alkaryl, etc.), arylimino (—CR=N(aryl), where R=hydrogen, alkyl, aryl, alkaryl, etc.), nitro (—NO$_2$), nitroso (—NO), sulfo (—SO$_2$—OH), sulfonato (—SO$_2$—O—), C1-C24 alkylsulfanyl (—S-alkyl; also termed "alkylthio"), arylsulfanyl (—S-aryl; also termed "arylthio"), C1-C24 alkylsulfinyl (—(SO)-alkyl), C5-C20 arylsulfinyl (—(SO)-aryl), C1-C24 alkylsulfonyl (—SO$_2$-alkyl), C5-C20 arylsulfonyl (—SO$_2$-aryl), phosphono (—P (O)(OH)$_2$), phosphonato (—P(O)(O—)$_2$), phosphinato (—P (O)(O—)), phospho (—PO$_2$), and phosphino (—PH$_2$), mono- and di-(C1-C24 alkyl)-substituted phosphino, mono- and di-(C5-C20 aryl)-substituted phosphine. In addition, the aforementioned functional groups may, if a particular group permits, be further substituted with one or more additional functional groups or with one or more hydrocarbyl moieties such as those specifically enumerated above.

When the term "substituted" appears prior to a list of possible substituted groups, it is intended that the term apply to every member of that group. For example, the phrase "substituted alkyl and aryl" is to be interpreted as "substituted alkyl and substituted aryl."

In addition to the disclosure herein, the term "substituted," when used to modify a specified group or radical, can also mean that one or more hydrogen atoms of the specified group or radical are each, independently of one another, replaced with the same or different substituent groups as defined below.

In addition to the groups disclosed with respect to the individual terms herein, substituent groups for substituting for one or more hydrogens (any two hydrogens on a single carbon can be replaced with =O, =NR$^{70}$, =N—OR$^{70}$, =N$_2$ or =S) on saturated carbon atoms in the specified group or radical are, unless otherwise specified, —R$^{60}$, halo, =O, —OR$^{70}$, —SR$^{70}$, —NR$^{80}$R$^{80}$, trihalomethyl, —CN, —OCN, —SCN, —NO, —NO$_2$, =N$_2$, —N$_3$, —SO$_2$R$^{70}$, —SO$_2$O-M$^+$, —SO$_2$OR$^{70}$, —OSO$_2$R$^{70}$, —OSO$_2$O-M$^+$, —OSO$_2$OR$^{70}$, —P(O)(O$^-$)$_2$(M$^+$)$_2$, —P(O)(OR$^{70}$)O$^-$M$^+$, —P(O)(OR$^{70}$) 2, —C(O)R$^{70}$, —C(S)R$^{70}$, —C(NR$^{70}$)R$^{70}$, —C(O)O$^-$M$^+$, —C(O)OR$^{70}$, —C(S)OR$^{70}$, —C(O)NR$^{80}$R$^{80}$, —C(NR$^{70}$)NR$^{80}$R$^{80}$, —OC(O)R$^{70}$, —OC(S)R$^{70}$, —OC(O)O$^-$M$^+$, —OC(O)OR$^{70}$, —OC(S)OR$^{70}$, —NR$^{70}$C(O)R$^{70}$, —NR$^{70}$C(S)R$^{70}$, —NR$^{70}$CO$_2$$^-$M$^+$, —NR$^{70}$CO$_2$R$^{70}$, —NR$^{70}$C(S)OR$^{70}$, —NR$^{70}$C(O)NR$^{80}$R$^{80}$, —NR$^{70}$C(NR$^{70}$)R$^{70}$ and —NR$^{70}$C(NR$^{70}$)NR$^{80}$R$^{80}$, where R$^{60}$ is selected from the group consisting of optionally substituted alkyl, cycloalkyl, heteroalkyl, heterocycloalkylalkyl, cycloalkylalkyl, aryl, arylalkyl, heteroaryl and heteroarylalkyl, each R$^{70}$ is independently hydrogen or R$^{60}$; each R$^{80}$ is independently R$^{70}$ or alternatively, two R$^{80}$'s, taken together with the nitrogen atom to which they are bonded, form a 5-, 6- or 7-membered heterocycloalkyl which may optionally include from 1 to 4 of the same or different additional heteroatoms selected from the group consisting of O, N and S, of which N may have —H or C1-C3 alkyl substitution; and each M$^+$ is a counter ion with a net single positive charge. Each M$^+$ may independently be, for example, an alkali ion, such as K$^+$, Na$^+$, Li$^+$; an ammonium ion, such as +N(R$^{60}$)$_4$; or an alkaline earth ion, such as [Ca$^{2+}$]$_{0.5}$, [Mg$^{2+}$]$_{0.5}$, or [Ba$^{2+}$]$_{0.5}$ ("subscript 0.5 means that one of the counter ions for such divalent alkali earth ions can be an ionized form of a compound of the invention and the other a typical counter ion such as chloride, or two ionized compounds disclosed herein can serve as counter ions for such divalent alkali earth ions, or a doubly ionized compound of the invention can serve as the counter ion for such divalent alkali earth ions). As specific examples, —NR$^{80}$R$^{80}$ is meant to include —NH$_2$, —NH-alkyl, N-pyrrolidinyl, N-piperazinyl, 4N-methyl-piperazin-1-yl, N-morpholinyl, —N(H)$_{0-1}$(CH$_2$CH$_2$OH)$_{1-2}$, —NHCH$_2$CH$_2$N(CH$_3$)$_{2-3}$, —NHCH$_2$CH$_2$SO$_3$H, —NHCH$_2$CH$_2$PO$_3$H$_2$ and —NHCH$_2$CH$_2$CO$_2$H.

In addition to the disclosure herein, substituent groups for hydrogens on unsaturated carbon atoms in "substituted" alkene, alkyne, aryl and heteroaryl groups are, unless otherwise specified, —R$^{60}$, halo, —O$^-$M$^+$, —OR$^{70}$, —SR$^{70}$, —S-M$^+$, —NR$^{80}$R$^{80}$, trihalomethyl, —CF$_3$, —CN, —OCN, —SCN, —NO, —NO$_2$, —N$_3$, —SO$_2$R$^{70}$, —SO$_3$$^-$M$^+$, —SO$_3$R$^{70}$, —OSO$_2$R$^{70}$, —OSO$_3$-M$^+$, —OSO$_3$R$^{70}$, —PO$_3$-2(M$^+$)$_2$, —P(O)(OR$^{70}$)O$^-$M$^+$, 7P(O)(OR$^{70}$)$_2$, —C(O)R$^{70}$, —C(S)R$^{70}$, —C(NR$^{70}$)R$^{70}$, —CO$_2$$^-$M$^+$, —CO$_2$R$^{70}$, —C(S)OR$^{70}$, —C(O)NR$^{80}$R$^{80}$, —C(NR$^{70}$)NR$^{80}$R$^{80}$, —OC(O)R$^{70}$, —OC(S)R$^{70}$, —OCO$_2$$^-$M$^+$, —OCO$_2$R$^{70}$, —OC(S)OR$^{70}$, —NR$^{70}$C(O)R$^{70}$, —NR$^{70}$C(S)R$^{70}$, —NR$^{70}$CO$_2$$^-$M$^+$, —NR$^{70}$CO$_2$R$^{70}$, —NR$^{70}$C(S)OR$^{70}$, —NR$^{70}$C(O)NR$^{80}$R$^{80}$, —NR$^{70}$C(NR$^{70}$)R$^{70}$ and —NR$^{70}$C(NR$^{70}$)NR$^{80}$R$^{80}$, where R$^{60}$, R$^{70}$, R$^{80}$ and M$^+$ are as previously defined, provided that in case of substituted alkene or alkyne, the substituents are not —O$^-$M$^+$, —OR$^{70}$, —SR$^{70}$, or —S-M$^+$.

In addition to the groups disclosed with respect to the individual terms herein, substituent groups for hydrogens on nitrogen atoms in "substituted" heteroalkyl and cycloheteroalkyl groups are, unless otherwise specified, —R$^{60}$, —O$^-$M$^+$, —OR$^{70}$, —SR$^{70}$, —S-M$^+$, —NR$^{80}$R$^{80}$, trihalomethyl, —CF$_3$, —CN, —NO, —NO$_2$, —S(O)$_2$R$^{70}$, —S(O)$_2$O$^-$M$^+$, —S(O)$_2$OR$^{70}$, —OS(O)$_2$R$^{70}$, —OS(O)$_2$O-M$^+$, —OS(O)$_2$OR$^{70}$, —P(O)(O$^-$)$_2$(M$^+$)$_2$, —P(O)(OR$^{70}$)O$^-$M$^+$, —P(O)(OR$^{70}$)(OR$^{70}$), —C(O)R$^{70}$, —C(S)R$^{70}$, —C(NR$^{70}$)R$^{70}$, —C(O)OR$^{70}$, —C(S)OR$^{70}$, —C(O)NR$^{80}$R$^{80}$, —C(NR$^{70}$)NR$^{8}$OR$^{80}$, —OC(O)R$^{70}$, —OC(S)R$^{70}$, —OC(O)OR$^{70}$, —OC(S)OR$^{70}$, —NR$^{70}$C(O)R$^{70}$, —NR$^{70}$C(S)R$^{70}$, —NR$^{70}$C(O)OR$^{70}$, —NR$^{70}$C(S)OR$^{70}$, —NR$^{70}$C(O)NR$^{8}$OR$^{80}$, —NR$^{70}$C(NR$^{70}$)R$^{70}$ and —NR$^{70}$C(NR$^{70}$)NR$^{8}$OR$^{80}$, where R$^{60}$, R$^{70}$, R$^{80}$ and M$^+$ are as previously defined.

Salts include but are not limited to: Na, K, Ca, Mg, ammonium, tetraalkyl ammonium, aryl and alkyl sulfonates, phosphates, carboxylates, sulfates, Cl, Br, and guanidinium.

Unless otherwise specified, reference to an atom is meant to include isotopes of that atom. For example, reference to H is meant to include $^1$H, $^2$H (i.e., D) and $^3$H (i.e., T), and reference to C is meant to include $^{12}$C and all isotopes of carbon (such as $^{13}$C).

In addition to the disclosure herein, in a certain embodiment, a group that is substituted has 1, 2, 3, or 4 substituents, 1, 2, or 3 substituents, 1 or 2 substituents, or 1 substituent.

Unless indicated otherwise, the nomenclature of substituents that are not explicitly defined herein are arrived at by naming the terminal portion of the functionality followed by the adjacent functionality toward the point of attachment. For example, the substituent "heterocycloalkyl(alkyl)" refers to the group (heterocycloalkyl)-(alkyl)-.

As to any of the groups disclosed herein which contain one or more substituents, it is understood, of course, that such groups do not contain any substitution or substitution patterns which are sterically impractical and/or synthetically non-feasible. In addition, the subject compounds include all stereochemical isomers arising from the substitution of these compounds.

In certain embodiments, a substituent may contribute to optical isomerism and/or stereo isomerism of a compound. Salts, solvates, hydrates, and prodrug forms of a compound are also of interest. Polymorphic, pseudo-polymorphic, amorphous and co-crystal forms of a compound are also of interest. All such forms are embraced by the present disclosure. Thus, the compounds described herein include salts, solvates, hydrates, prodrug and isomer forms thereof, including the pharmaceutically acceptable salts, solvates, hydrates, prodrugs and isomers thereof. In certain embodiments, a compound may be a metabolized into a pharmaceutically active derivative.

Definitions of other terms and concepts appear throughout the detailed description below.

DETAILED DESCRIPTION

As summarized above, provided are pharmacologic inhibitors of glycerol-3-phosphate acyltransferase (GPAT) and methods of use thereof. In some embodiments, an effective dose of the subject GPAT inhibitor is administered to an individual or nonhuman animal for the treatment of cancer. In some embodiments, the cancer is MYC-driven. In some embodiments, the cancer is screened and determined to be lipogenesis-dependent. In other embodiments, an effective dose of the subject GPAT inhibitor is administered to an individual or animal for treatment of metabolic syndrome and related disorders, including without limitation hyperlipidemia, diabetes, fatty liver disease, obesity, cardiovascular conditions, etc. In another embodiment, the subject GPAT inhibitors can also be used as treatments for infectious diseases and inflammatory or immune diseases in animals, including humans.

GPAT Inhibitors

As summarized above provided herein are GPAT inhibitor compounds. In some cases, the subject compounds can include an aryl or a heteroaryl core. Exemplary GPAT inhibitor compounds of interest are set forth in formulae (I), (II), (IIA), (IIAa), (IIAb), (IIB), (IIBa), (IIBb), (IIC), (IICa), (IID), (IIDa), (IIIA), (IIIAa), (IIIAb), (IIIB), (IIIBa), or any of the compounds disclosed herein.

In some cases, the subject GPAT inhibitor compound is of the formula (I):

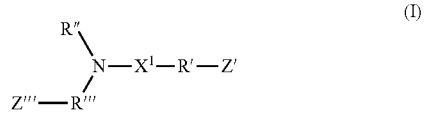

where:
R' and R''' are each independently selected from alkyl, substituted alkyl, alkyl alkenyl, alkyl alkynyl, cycloalkyl, cycloalkyl(alkyl), heterocycloalkyl, heterocycloalkyl(alkyl), substituted heterocycloalkyl, aryl, substituted aryl, aryl(alkyl), substituted aryl(alkyl), heteroaryl, substituted heteroaryl, and halo(alkyl);

Z' and Z''' are optional substituents selected from alkynyl, hydroxy, alkyl(hydroxy), ester, ether, nitrile, trifluoromethyl, trifluoromethyl ether, trifluoromethyl thioether, trifluoromethyl sulfoxide, trifluoromethyl sulfone, halide, polyalcohol, a straight chain or cyclic saccharide, amine, polyamine, ammonium, amide, azido, nitro, isonitrile, sulfate, sulfonic acid, sulfonate, sulfinate, sulfoxide, sulfone, carboxylate, carboxyl ester, ketone, aldehyde, carboxyl amide, lactone, amidine, sulfonamide, phosphate, phosphonate, phosphinate, boronic acid, boronate ester, amide, thiolate, thiol, thioester, and a carboxy isostere, wherein Z' or Z''' optionally forms a bond to a second compound of formula (I);

R'' is selected from hydrogen, alkyl, substituted alkyl, $OR^{1a}$, $NR^{1a_2}$ and $SR^{1a}$;

$R^{1a}$ is selected H, $COR^{2a}$, $SO_2R^{2a}$, $NHR^{2a}$, and $NHCOR^{2a}$, wherein each $R^{2a}$ are independently selected from alkyl, substituted alkyl, alkyl alkenyl, alkyl alkynyl, cycloalkyl, cycloalkyl(alkyl), heterocycloalkyl, heterocycloalkyl(alkyl), substituted heterocycloalkyl, aryl, substituted aryl, aryl(alkyl), substituted aryl(alkyl), heteroaryl, substituted heteroaryl, and halo(alkyl);

or R'' and Z' or Z''' together with the atoms to which they are attached form a cyclic group selected from heterocycloalkyl, or substituted heterocycloalkyl; and $X^1$ is selected from sulfonyl, sulfinyl, sulfonimidoyl, phosphonyl, phosphinate, thiophosphonyl, thiophosphinate, and phosphonamidate, or a pharmaceutically acceptable salt or solvate thereof.

In some embodiments of formula (I), at least one of R' and R''' is selected from substituted aryl, and substituted heteroaryl. In some cases, R' is substituted aryl or substituted heteroaryl. In some cases, R''' is substituted aryl or substituted heteroaryl. In some cases, R' is substituted aryl and R''' is selected from alkyl and substituted alkyl. In some cases, R' is substituted heteroaryl and R''' is selected from alkyl and substituted alkyl. In some cases, R' is substituted aryl and R''' is alkylalkoxyalkyl. In some cases, R' is substituted heteroaryl and R''' is alkylalkoxyalkyl. In some cases, R' is substituted aryl and R''' is selected from cycloalkyl and cycloalkyl(alkyl). In some cases, R' is substituted heteroaryl and R''' is selected from cycloalkyl and cycloalkyl(alkyl). In some cases, R' is substituted aryl and R''' is selected from spiroalkyl and substituted spiroalkyl. In some cases, R' is substituted heteroaryl and R''' is selected from spiroalkyl and substituted spiroalkyl. In some cases, R' is substituted aryl and R''' is selected from spiroheterocycle and substituted spiroheterocycle. In some cases, R' is substituted heteroaryl and R''' is selected from spiroheterocycle and substituted spiroheterocycle.

In some embodiments of formula (I), the compound includes at least one of the at least one of R'-Z' or R'''—Z'''. In certain cases, the compound of formula (I) includes R'-Z', wherein R' is selected from aryl, substituted aryl, heteroaryl and substituted aryl; and Z' is selected from hydroxy, alkyl (hydroxy), nitrile, trifluoromethyl, halide, polyalcohol, a straight chain or cyclic saccharide, amine, polyamine, sulfate, sulfonate, sulfinate, carboxylate, phosphate, phosphonate, phosphinate, boronic acid, boronate ester, amide, thiolate, thioester, and a carboxy isostere (e.g., as described herein). In some cases, Z' is a water soluble group (e.g., as described herein). In some cases, the compound of formula (I) includes R'''—Z''' wherein R''' is selected from aryl, substituted aryl, heteroaryl and substituted aryl; and Z''' is selected from hydroxy, alkyl(hydroxy), nitrile, trifluoromethyl, halide, polyalcohol, a straight chain or cyclic saccharide, amine, polyamine, sulfate, sulfonate, sulfinate, carboxylate, phosphate, phosphonate, phosphinate, boronic acid, boronate ester, amide, thiolate, thioester, and a carboxy isostere (e.g., as described herein). In some cases, Z' is a water soluble group (e.g., as described herein).

In certain embodiments of formula (I), Z' or Z''' is a water soluble group (e.g., as described herein). In certain cases, Z' or Z''' is a hydroxy or an alkyl(hydroxy group). In some cases, Z' or Z''' is a nitrile group. In some cases, Z' or Z''' is a trifluoromethyl group. In some cases, Z' or Z''' is a halide. In some cases, Z' or Z' is selected from a polyalcohol, a polyamine or PEG. In some cases, Z' or Z''' is a straight chain or cyclic saccharide, or a saccharide mimetic. In some cases, Z' or Z''' is an amine. In some cases, Z or Z''' is selected from sulfate, sulfonate and sulfinate. In some cases, Z' or Z''' is carboxylate. In some cases, Z' or Z' is selected from phosphate, phosphonate, and phosphinate. In some cases, Z' or Z''' is selected from boronic acid and boronate ester. In some cases, Z' or Z''' is amide. In some cases, Z' or Z''' is selected from thiolate, and thioester. In some cases Z' or Z''' is a carboxy isostere (e.g., as described herein).

In certain cases, Z' or Z''' forms a bond to a second compound of formula (I). In certain cases, Z' or Z''' forms a bond to another Z' or Z''' group of a second compound of formula (I). In certain other cases, Z' or Z''' and R'' together with the atoms to which they are attached form a cyclic group selected from heterocycloalkyl, or substituted heterocycloalkyl.

In certain embodiments of formula (I), $X^1$ is selected from $SO_2$, P(O)OM, P(S)OM, and P(O)SM, P(O)N(M)$_2$, wherein M is selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), Na+, K+, and NH4+. In certain cases, X is SO2. In certain cases, X' is P(O)OM, wherein M is selected from hydrogen, alkyl or substituted alkyl.

In certain embodiments, the GPAT inhibitor of formula (I) is described by formula (IIA) or (IIB):

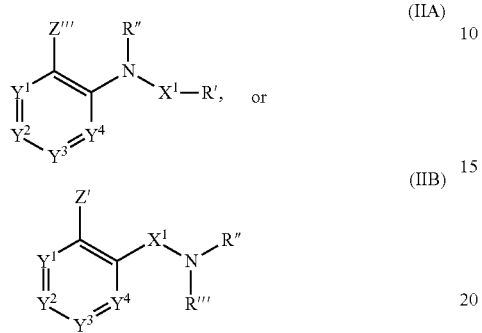

$X^1$ is selected from

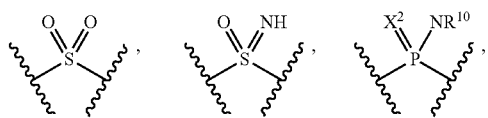

wherein $X^2$ is O or S, $R^{10}$ is selected from $SR^{10a}$, $OR^{10a}$, and $N(R^{10a})_2$;

each $R^{10a}$ is independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), Na+, K+, and NH4+;

Z' and Z''' are each independently selected from hydrogen, —CO2$R^a$, —(CH2), O$R^a$, —(CH2)$_m$OC(O)R, —CO2$R^a$CO2$R^a$—, a carboxy isostere, nitrile, halogen, trifluoromethyl, —P(O)(O$R^a$)2, SO2O$R^a$, B(O$R^a$)2, SO2CF3, SOCF3, S(O)O$R^a$, and SF5, wherein $R^a$ are each independently selected from hydrogen, alkyl, substituted alkyl, aryl, substituted aryl, cycloalkyl, substituted cycloalkyl, heterocycle, substituted heterocycle, heteroaryl, substituted heteroaryl;

R' and R''' are each independently selected from alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl);

R'' is selected from hydrogen, alkyl, substituted alkyl, $OR^{1a}$, $NR^{1a}_2$ and $SR^{1a}$;

$R^{1a}$ is selected H, $COR^{2a}$, $NHR^{2a}$, and $NHCOR^{2a}$, wherein each $R^{2a}$ are independently selected from alkyl, substituted alkyl, alkyl alkenyl, alkyl alkynyl, cycloalkyl, cycloalkyl(alkyl), heterocycloalkyl, heterocycloalkyl(alkyl), substituted heterocycloalkyl, aryl, substituted aryl, aryl(alkyl), substituted aryl(alkyl), heteroaryl, substituted heteroaryl, and halo(alkyl);

$Y^1$ is selected from $CR^1$ and N;
Y2 is selected from $CR^2$ and N;
$Y^3$ is selected from $CR^3$ and N;
$Y^4$ is selected from $CR^4$ and N; and $R^1$-$R^4$ are independently selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), SF5, $NR^5_{3+}$, azido, cyano, —$OR^5$, —$SR^5$, —$NR^5R^6$, halogen, nitro, SCH3, OCF3, SO2CH3, SCF3, SO2CF3, CF3, —SO2O$R^5$, —OSO2$R^5$, CCl3, —C(=O)$R^5$, —C(=O)O$R^5$; —C(=O)N$R^5R^6$, —O C(=O)$R^5$, —CHO, —C=N$R^5$; where $R^5$ and $R^6$ are independently selected from hydrogen, alkyl, substituted alkyl, alkyl alkenyl, alkyl alkynyl, cycloalkyl, cycloalkyl (alkyl), heterocycloalkyl, heterocycloalkyl(alkyl), aryl, substituted aryl, aryl(alkyl), substituted aryl(alkyl), heteroaryl, substituted heteroaryl, and halo(alkyl).

In certain embodiments, the GPAT inhibitor of formula (IIA) is described by formula (IIAa):

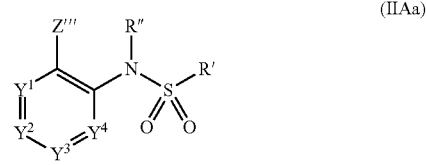

wherein:
Z''' is selected from hydrogen, —CO2$R^a$, —(CH2)$_n$O$R^a$, —(CH2)$_m$OC(O)R, a carboxy isostere, nitrile, halogen, trifluoromethyl, —P(O)(O$R^a$)2, SO2O$R^a$, B(O$R^a$)2, SO2CF3, SOCF3, S(O)O$R^a$, or SF5 wherein $R^a$ are each independently selected from hydrogen, alkyl, substituted alkyl, aryl, substituted aryl, cycloalkyl, substituted cycloalkyl, heterocycle, substituted heterocycle, heteroaryl, substituted heteroaryl;

R' is selected from alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl), wherein alkyl moieties are optionally substituted with a group selected from, alkyl, alkenyl, alkynyl, cycloalkyl, cycloalkyl (alkyl), heterocycloalkyl, heterocycloalkyl(alkyl), aryl, substituted aryl, aryl(alkyl), substituted aryl(alkyl), heteroaryl, substituted heteroaryl, halo(alkyl), SF5, $NR^5_{3+}$, azido, cyano, —$OR^5$, —$SR^5$, —$NR^5R^6$, halogen, nitro, SCH3, OCF3, SO2CH3, SCF3, SO2CF3, CF3, —SO2O$R^5$, —OSO2$R^5$, CC3, —C(=O)$R^5$, —C(=O)O$R^5$; —C(=O)N$R^5R^6$, —OC(=O)$R^5$, —CHO, and —C=N$R^5$;

R'' is selected from hydrogen, alkyl, substituted alkyl, $OR^{1a}$, $NR^{1a_2}$ and $SR^{1a}$;

$R^{1a}$ is selected H, $COR^{2a}$, $NHR^{2a}$, and $NHCOR^{2a}$, wherein each $R^{2a}$ are independently selected from alkyl, substituted alkyl, alkyl alkenyl, alkyl alkynyl, cycloalkyl, cycloalkyl(alkyl), heterocycloalkyl, heterocycloalkyl(alkyl), substituted heterocycloalkyl, aryl, substituted aryl, aryl(alkyl), substituted aryl(alkyl), heteroaryl, substituted heteroaryl, and halo(alkyl);

$Y^1$ is selected from $CR^1$ and N;
$Y^2$ is selected from $CR^2$ and N;
$Y^3$ is selected from $CR^3$ and N;
$Y^4$ is selected from $CR^4$ and N; and
$R^1$-$R^4$ are independently selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), SF$_5$, NR$^5_3$+, azido, cyano, —OR$^5$, —SR$^5$, —NR$^5$R$^6$, halogen, nitro, SCH$_3$, OCF$_3$, SO$_2$CH$_3$, SCF$_3$, SO$_2$CF$_3$, CF$_3$, —SO$_2$OR$^5$, —OSO$_2$R$^5$, CCl$_3$, —C(=O)R$^5$, —C(=O)OR$^5$; —C(=O)NR$^5$R$^6$, —O C(=O)R$^5$, —CHO, —C=NR$^5$; where R$^5$ and R$^6$ are independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl).

In certain embodiments of formulae (IIA) or (IIAa), Z''' is —CO$_2$R$^a$, and at least one of Y$^1$-Y$^4$ is N.

In certain embodiments, the formula (IIA) or (IIAa) excludes compounds described by the formula (IIAc):

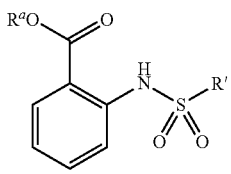

(IIIAc)

wherein:
R$^a$ is selected from alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), halo(alkyl), heteroaryl, and heteroaryl(alkyl); and R' is selected from alkyl and substituted alkyl.

In certain embodiments, the formula (IIA) or (IIAa) is not one of the following compounds:

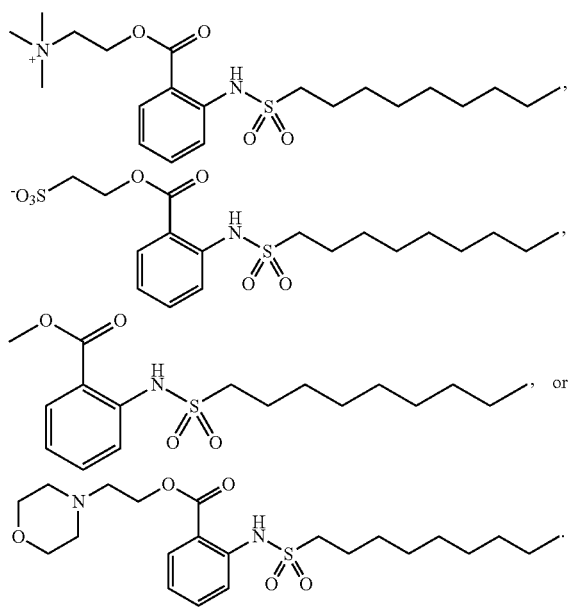

In certain embodiments, the GPAT inhibitor of formula (IIA) is described by formula (IIAb):

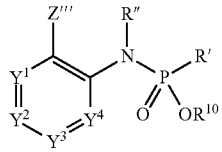

(IIAb)

wherein:
Z''' is selected from hydrogen, —CO$_2$R$^a$, —(CH$_2$)$_n$OR$^a$, —(CH$_2$)$_m$OC(O)R, a carboxy isostere, nitrile, halogen, trifluoromethyl, —P(O)(OR$^a$)$_2$, SO$_2$OR$^a$, B(OR$^a$)$_2$, SO$_2$CF$_3$, SOCF$_3$, S(O)OR$^a$, or SF$_5$ wherein R$^a$ are each independently selected from hydrogen, alkyl, substituted alkyl, aryl, substituted aryl, cycloalkyl, substituted cycloalkyl, heterocycle, substituted heterocycle, heteroaryl, substituted heteroaryl;

R$^{10}$ is selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), Na$^+$, K$^+$ and NH$_4^+$;

R' is selected from alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), wherein alkyl moieties are optionally substituted with a group selected from, alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), SF$_5$, NR$^5_3$+, azido, cyano, —OR$^5$, —SR$^5$, —NR$^5$R$^6$, halogen, nitro, SCH$_3$, OCF$_3$, SO$_2$CH$_3$, SCF$_3$, SO$_2$CF$_3$, CF$_3$, —SO$_2$OR$^5$, —OSO$_2$R$^5$, CCl$_3$, —C(=O)R$^5$, —C(=O)OR$^5$; —C(=O)NR$^5$R$^6$, —OC(=O)R$^5$, —CHO, and —C=NR$^5$;

R'' is selected from hydrogen, alkyl, substituted alkyl, OR$^{1a}$, NR$^{1a_2}$ and SR$^{1a}$;

R$^{1a}$ is selected H, COR$^{2a}$, NHR$^{2a}$, and NHCOR$^{2a}$, wherein each R$^{2a}$ are independently selected from alkyl, substituted alkyl, alkyl alkenyl, alkyl alkynyl, cycloalkyl, cycloalkyl(alkyl), heterocycloalkyl, heterocycloalkyl(alkyl), substituted heterocycloalkyl, aryl, substituted aryl, aryl(alkyl), substituted aryl(alkyl), heteroaryl, substituted heteroaryl, and halo(alkyl);

Y$^1$ is selected from CR$^1$ and N;
Y$^2$ is selected from CR$^2$ and N;
Y$^3$ is selected from CR$^3$ and N;
Y$^4$ is selected from CR$^4$ and N; and
R$^1$-R$^4$ are independently selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), SF$_5$, NR$^5_3$*, azido, cyano, —OR$^5$, —SR$^5$, —NR$^5$R$^6$, halogen, nitro, SCH$_3$, OCF$_3$, SO$_2$CH$_3$, SCF$_3$, SO$_2$CF$_3$, CF$_3$, —SO$_2$OR$^5$, —OSO$_2$R$^5$, CCl$_3$, —C(=O)R$^5$, —C(=O)OR$^5$; —C(=O)NR$^5$R$^6$, —O C(=O)R$^5$, —CHO, —C=NR$^5$; where R$^6$ and R$^6$ are independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl).

In certain embodiments of any one of formulae (IIA), (IIAa) or (IIAb), R' is selected from alkyl, substituted alkyl (e.g., with a substituent as described herein). In certain cases, R' is selected from C1-C20 alkyl. In some cases R' is selected from C1-C10 alkyl. In certain cases, R' is selected from, alkyl alkenyl and alkyl alkynyl. In some cases, R' is selected from C1-C20 alkyl alkenyl or alkyl alkynyl. In certain cases, R' is selected from C1-C10 alkyl alkenyl or alkyl alkynyl. In some cases the alkenyl or alkynyl substituent is substituted (e.g., with a substituent as described herein). In certain cases, R' is selected from alkoxy or substituted alkoxy. In some cases, R' is selected from C1-C20 alkoxy. In certain cases, R' is selected from C1-C10 alkoxy. In certain cases, R' is selected from alkylalkoxyalkyl or substituted alkylalkoxyalkyl. In some cases, R' is selected from C1-C20 alkylalkoxyalkyl. In certain cases, R' is selected from C1-C10 alkylalkoxyalkyl. In certain cases, R' is selected from cycloalkyl, cycloalkyl(alkyl), spiroalkyl, spiroheterocycle, bicycloalkyl, bicycloheterocycle, wherein any of these cyclic moieties are optionally substituted (e.g., with a substituent as described herein). In certain cases, R' is selected from heterocycloalkyl, and heterocycloalkyl(alkyl), wherein these heterocyclic moieties are optionally substituted (e.g., with a substituent as described herein). In certain cases R' is selected from aryl, substituted aryl, aryl(alkyl), and substituted aryl(alkyl), wherein these aryl moieties are optionally substituted (e.g., with a substituent as described herein). In certain cases, R' is selected from heteroaryl, and substituted heteroaryl, wherein these heteroaryl moieties are optionally substituted (e.g., with a substituent as described herein). In certain cases, R' is a halo(alkyl), wherein the halo(alkyl) group is optionally further substituted (e.g., with a substituent as described herein).

In certain embodiments of any one of formulae (IIA), (IIAa) or (IIAb), R' comprises an alkyl moiety which is optionally substituted with a group selected from, alkyl, alkenyl, alkynyl, cycloalkyl, cycloalkyl(alkyl), heterocycloalkyl, heterocycloalkyl(alkyl), aryl, substituted aryl, aryl (alkyl), substituted aryl(alkyl), heteroaryl, substituted heteroaryl, halo(alkyl), SF$_5$, NR$^5_3$*, azido, cyano, —OR$^5$, —SR$^5$, —NR$^5$R$^6$, halogen, nitro, SCH$_3$, OCF$_3$, SO$_2$CH$_3$, SCF$_3$, SO$_2$CF$_3$, CF$_3$, —SO$_2$OR$^5$, —OSO$_2$R$^5$, CCl$_3$, —C(═O)R$^5$, —C(═O)OR$^5$; —C(═O)NR$^5$R$^6$, —OC(═O) R$^5$, —CHO, and —C═NR$^5$, where R$^5$ and R$^6$ are independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl).

In certain cases of any one of formulae (IIA), (IIAa), (IIAb), Z''' is selected from hydrogen, —CO$_2$H, —CH$_2$OH, —CN, —Cl, —F, —I, —Br, tetrazole, 1,2,4-oxadiazol-3 (2H)-one, —CO$_2$R$^{11}$, —C(O)NHS(O)$_2$R$^{12}$, wherein R$^{11}$ is selected from alkyl, substituted alkyl, heterocycle, and substituted heterocycle; and R$^{12}$ is selected from alkyl, substituted alkyl, and trifluoromethyl. In certain cases, Z''' is hydrogen. In certain cases, Z''' is —CO$_2$H. In certain cases, Z''' is —CN. In certain cases, Z''' is selected from —Cl, —F, —I and —Br. In certain cases, Z''' is tetrazole. In certain cases, Z''' is 1,2,4-oxadiazol-3(2H)-one. In certain cases, Z''' is —CO$_2$R$^{11}$, wherein R$^{11}$ is selected from alkyl, substituted alkyl, heterocycle, and substituted heterocycle. In certain cases, Z''' is —C(O)NHS(O)$_2$R$^{12}$, wherein R$^{12}$ is selected from alkyl, substituted alkyl, and trifluoromethyl.

In certain cases of any one of formulae (IIA), (IIAa), (IIAb), R" is hydrogen. In certain cases R" is alkyl or substituted alkyl (e.g., as described herein). In certain cases, R" is OR$^{1a}$, wherein R$^{1a}$ is selected H, COR$^{2a}$, NHR$^{2a}$, and NHCOR$^{2a}$, and R$^{2a}$ is as described herein above. In certain cases, R" is NR$^{1a_2}$, wherein each R$^{1a}$ is independently selected from H, COR$^{2a}$, NHR$^{2a}$, and NHCOR$^{2a}$, and R$^{2a}$ is as described herein above. In certain cases, R" is SR$^{1a}$, wherein R$^{1a}$ is selected H, COR$^{2a}$, NHR$^{2a}$, and NHCOR$^{2a}$, and R$^{2a}$ is as described herein above.

In certain embodiments, the GPAT inhibitor of formula (IIB) is described by formula (IIBa):

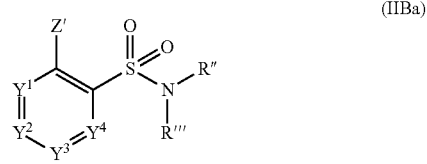

(IIBa)

wherein:

Z' is selected from hydrogen, —CO$_2$R$^a$, —(CH$_2$)$_n$OR$^a$, —(CH$_2$)$_m$OC(O)R, a carboxy isostere, nitrile, halogen, trifluoromethyl, —P(O)(OR$^a$)$_2$, SO$_2$OR$^a$, B(OR$^a$)$_2$, SO$_2$CF$_3$, SOCF$_3$, S(O)OR$^a$, or SF$_5$ wherein R$^a$ are each independently selected from hydrogen, alkyl, substituted alkyl, aryl, substituted aryl, cycloalkyl, substituted cycloalkyl, heterocycle, substituted heterocycle, heteroaryl, substituted heteroaryl;

R''' is selected from alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl), wherein alkyl moieties are optionally substituted with a group selected from, alkyl, alkenyl, alkynyl, cycloalkyl, cycloalkyl (alkyl), heterocycloalkyl, heterocycloalkyl(alkyl), aryl, substituted aryl, aryl(alkyl), substituted aryl(alkyl), heteroaryl, substituted heteroaryl, halo(alkyl), SF$_5$, NR$^5_3$+, azido, cyano, —OR$^5$, —SR$^5$, —NR$^5$R$^6$, halogen, nitro, SCH$_3$, OCF$_3$, SO$_2$CH$_3$, SCF$_3$, SO$_2$CF$_3$, CF$_3$, —SO$_2$OR$^5$, —OSO$_2$R$^5$, CCl$_3$, —C(═O)R$^5$, —C(═O) OR$^5$; —C(═O)NR$^5$R$^6$, —OC(═O)R$^5$,-CHO, and —C═NR$^5$, wherein R$^5$ and R$^6$ are independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl);

R" is selected from hydrogen, alkyl, substituted alkyl, OR$^{1a}$, NR$^{1a_2}$ and SR$^{1a}$;

R$^{1a}$ is selected H, COR$^{2a}$, NHR$^{2a}$, and NHCOR$^{2a}$, wherein each R$^{2a}$ are independently selected from alkyl, substituted alkyl, alkyl alkenyl, alkyl alkynyl, cycloalkyl, cycloalkyl(alkyl), heterocycloalkyl, heterocycloalkyl(alkyl), substituted heterocycloalkyl, aryl, substituted aryl, aryl(alkyl), substituted aryl(alkyl), heteroaryl, substituted heteroaryl, and halo(alkyl);

Y$^1$ is selected from CR$^1$ and N;
Y$^2$ is selected from CR$^2$ and N;
Y$^3$ is selected from CR$^3$ and N;
Y$^4$ is selected from CR$^4$ and N; and
R$^1$-R$^4$ are independently selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), SF$_5$, NR$^5_{3+}$, azido, cyano, —OR$^5$, —SR$^5$, —NR$^5$R$^6$, halogen, nitro, SCH$_3$, OCF$_3$, SO$_2$CH$_3$, SCF$_3$, SO$_2$CF$_3$, CF$_3$, —SO$_2$OR$^5$, —OSO$_2$R$^5$, CCl$_3$, —C(=O)R$^5$, —C(=O)OR$^5$; —C(=O)NR$^5$R$^6$, —O C(=O)R$^5$, —CHO, —C=NR$^5$; where R$^5$ and R$^6$ are independently selected from hydrogen, alkyl, substituted alkyl, alkyl alkenyl, alkyl alkynyl, cycloalkyl, cycloalkyl (alkyl), heterocycloalkyl, heterocycloalkyl(alkyl), aryl, substituted aryl, aryl(alkyl), substituted aryl(alkyl), heteroaryl, substituted heteroaryl, and halo(alkyl).

In certain embodiments, the GPAT inhibitor of formula (IIB) is described by formula (IIBb):

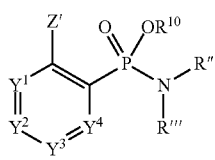

(IIBb)

wherein:

Z' is selected from hydrogen, —CO$_2$R$^a$, —(CH$_2$)$_n$OR$^a$, —(CH$_2$)$_m$OC(O)R, a carboxy isostere, nitrile, halogen, trifluoromethyl, —P(O)(OR$^a$)$_2$, SO$_2$OR$^a$, B(OR$^a$)$_2$, SO$_2$CF$_3$, SOCF$_3$, S(O)OR$^a$, or SF$_5$ wherein R$^a$ are each independently selected from hydrogen, alkyl, substituted alkyl, aryl, substituted aryl, cycloalkyl, substituted cycloalkyl, heterocycle, substituted heterocycle, heteroaryl, substituted heteroaryl;

R$^{10}$ is selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), Na$^+$, K$^+$ and NH$_4^+$;

R''' is selected from alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), wherein alkyl moieties are optionally substituted with a group selected from, alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), SF$_5$, NR$^5_3$*, azido, cyano, —OR$^5$, —SR$^5$, —NR$^5$R$^6$, halogen, nitro, SCH$_3$, OCF$_3$, SO$_2$CH$_3$, SCF$_3$, SO$_2$CF$_3$, CF$_3$, —SO$_2$OR$^5$, —OSO$_2$R$^5$, CCl$_3$, —C(=O)R$^5$, —C(=O)OR$^5$; —C(=O)NR$^5$R$^6$, —OC(=O)R$^5$,-CHO, and —C=NR$^5$, wherein R$^5$ and R$^6$ are independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl);

R'' is selected from hydrogen, alkyl, substituted alkyl, OR$^{1a}$, NR$^{1a2}$ and SR$^{1a}$;

R$^{1a}$ is selected H, COR$^{2a}$, NHR$^{2a}$, and NHCOR$^{2a}$, wherein each R$^{2a}$ are independently selected from alkyl, substituted alkyl, alkyl alkenyl, alkyl alkynyl, cycloalkyl, cycloalkyl(alkyl), heterocycloalkyl, heterocycloalkyl(alkyl), substituted heterocycloalkyl, aryl, substituted aryl, aryl(alkyl), substituted aryl(alkyl), heteroaryl, substituted heteroaryl, and halo(alkyl);

Y$^1$ is selected from CR$^1$ and N;
Y$^2$ is selected from CR$^2$ and N;
Y$^3$ is selected from CR$^3$ and N;
Y$^4$ is selected from CR$^4$ and N; and R$^1$-R$^4$ are independently selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), SF$_5$, NR$^5_{3+}$, azido, cyano, —OR$^5$, —SR$^5$, —NR$^5$R$^6$, halogen, nitro, SCH$_3$, OCF$_3$, SO$_2$CH$_3$, SCF$_3$, SO$_2$CF$_3$, CF$_3$, —SO$_2$OR$^5$, —OSO$_2$R$^5$, CCl$_3$, —C(=O)R$^5$, —C(=O)OR$^5$; —C(=O)NR$^5$R$^6$, —O C(=O)R$^5$, —CHO, —C=NR$^5$; where R$^5$ and R$^6$ are independently selected from hydrogen, alkyl, substituted alkyl, alkyl alkenyl, alkyl alkynyl, cycloalkyl, cycloalkyl (alkyl), heterocycloalkyl, heterocycloalkyl(alkyl), aryl, substituted aryl, aryl(alkyl), substituted aryl(alkyl), heteroaryl, substituted heteroaryl, and halo(alkyl).

In certain embodiments of any one of formulae (IIB), (IIBa) or (IIBb), R''' is selected from alkyl, substituted alkyl (e.g., with a substituent as described herein). In certain cases, R''' is selected from C1-C20 alkyl. In some cases R''' is selected from C1-C10 alkyl. In certain cases, R''' is selected from, alkyl alkenyl and alkyl alkynyl. In some cases, R''' is selected from C1-C20 alkyl alkenyl or alkyl alkynyl. In certain cases, R''' is selected from C1-C10 alkyl alkenyl or alkyl alkynyl. In some cases the alkenyl or alkynyl substituent is substituted (e.g., with a substituent as described herein). In certain cases, R''' is selected from alkoxy or substituted alkoxy. In some cases, R''' is selected from C1-C20 alkoxy. In certain cases, R''' is selected from C1-C10 alkoxy. In certain cases, R''' is selected from alkylalkoxyalkyl or substituted alkylalkoxyalkyl. In some cases, R''' is selected from C1-C20 alkylalkoxyalkyl. In certain cases, R''' is selected from C1-C10 alkylalkoxyalkyl. In certain cases, R''' is selected from cycloalkyl, cycloalkyl (alkyl), spiroalkyl, spiroheterocycle, bicycloalkyl, bicycloheterocycle, wherein any of these cyclic moieties are optionally substituted (e.g., with a substituent as described herein). In certain cases, R''' is selected from heterocycloalkyl, and heterocycloalkyl(alkyl), wherein these heterocyclic moieties are optionally substituted (e.g., with a substituent as described herein). In certain cases R''' is selected from aryl, substituted aryl, aryl(alkyl), and substituted aryl(alkyl), wherein these aryl moieties are optionally substituted (e.g., with a substituent as described herein). In certain cases, R''' is selected from heteroaryl, and substituted heteroaryl, wherein these heteroaryl moieties are optionally substituted (e.g., with a substituent as described herein). In certain cases, R''' is a halo(alkyl), wherein the halo(alkyl) group is optionally further substituted (e.g., with a substituent as described herein).

In certain embodiments of any one of formulae (IIB), (IIBa) or (IIBb), R''' comprises an alkyl moiety which is optionally substituted with a group selected from, alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), SF$_5$, NR$^5_{3+}$, azido, cyano, —OR$^5$, —SR$^5$, —NR$^5$R$^6$, halogen, nitro, SCH$_3$, OCF$_3$, SO$_2$CH$_3$, SCF$_3$, SO$_2$CF$_3$, CF$_3$, —SO$_2$OR$^5$, —OSO$_2$R$^5$, CCl$_3$, —C(=O)R$^5$, —C(=O)OR$^5$; —C(=O)NR$^5$R$^6$, —OC(=O)R$^5$,-CHO, and —C=NR$^5$, where R$^5$ and R$^6$ are independently selected from hydrogen, alkyl, substituted alkyl, alkyl alkenyl, alkyl alkynyl, cycloalkyl, cycloalkyl (alkyl), heterocycloalkyl, heterocycloalkyl(alkyl), aryl, substituted aryl, aryl(alkyl), substituted aryl(alkyl), heteroaryl, substituted heteroaryl, and halo(alkyl).

In certain cases of any one of formulae (IIB), (IIBa), (IIBb), Z' is selected from hydrogen, —CO$_2$H, —CH$_2$OH, —CN, —Cl, —F, —I, —Br, tetrazole, 1,2,4-oxadiazol-3 (2H)-one, —CO$_2$R$^{11}$, —C(O)NHS(O)$_2$R$^{12}$, wherein R" is selected from alkyl, substituted alkyl, heterocycle, and substituted heterocycle; and R$^{12}$ is selected from alkyl, substituted alkyl, and trifluoromethyl. In certain cases, Z' is hydrogen. In certain cases, Z' is —CO$_2$H. In certain cases, Z' is —CN. In certain cases, Z' is selected from —Cl, —F, —I and —Br. In certain cases, Z' is tetrazole. In certain cases, Z' is 1,2,4-oxadiazol-3(2H)-one. In certain cases, Z' is —CO$_2$R$^{11}$, wherein R" is selected from alkyl, substituted alkyl, heterocycle, and substituted heterocycle. In certain cases, Z' is —C(O)NHS(O)$_2$R$^{12}$, wherein R$^{12}$ is selected from alkyl, substituted alkyl, and trifluoromethyl.

In certain cases of any one of formulae (IIB), (IIBa), (IIBb), R" is hydrogen. In certain cases R" is alkyl or substituted alkyl (e.g., as described herein). In certain cases, R" is OR$^{1a}$, wherein R$^{1a}$ is selected H, COR$^{2a}$, NHR$^{2a}$, and NHCOR$^{2a}$, and R$^{2a}$ is as described herein above. In certain cases, R" is NR$^{1a}{}_2$, wherein each R$^{1a}$ is independently selected from H, COR$^{2a}$, NHR$^{2a}$, and NHCOR$^{2a}$, and R$^{2a}$ is as described herein above. In certain cases, R" is SR$^{1a}$, wherein R$^{1a}$ is selected H, COR$^{2a}$, NHR$^{2a}$, and NHCOR$^{2a}$, and R$^{2a}$ is as described herein above.

In certain cases of any one of formulae (IIA), (IIAa), (IIAb), (IIB), (IIBa) or (IIBb), Y$^1$ is CR$^1$; Y$^2$ is CR$^2$; Y$^3$ is CR$^3$; and Y$^4$ is CR$^4$; where R$^1$, R$^2$, R$^3$ and R$^4$ are independently selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl (alkyl), substituted aryl(alkyl), heteroaryl, substituted heteroaryl, halo(alkyl), SF$_5$, NR$^5{}_3{}^+$, azido, cyano, —OR$^5$, —SR$^5$, —NR$^5$R$^6$, halide, nitro, SCH$_3$, OCF$_3$, SO$_2$CH$_3$, SCF$_3$, SO$_2$CF$_3$, CF$_3$, —SO$_2$OR$^5$, —OSO$_2$R$^5$, CCl$_3$, —C(=O)R$^5$, —C(=O)OR$^5$; —C(=O)NR$^5$R$^6$, —OC(=O) R$^5$, -CHO, and —C=NR$^5$, wherein R$^5$ and R$^6$ are independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl).

In some cases of formulae (IIA), (IIAa), (IIAb), (IIB), (IIBa) or (IIBb), Y$^1$ is CR$^1$; Y$^2$ is CR$^2$; Y$^3$ is CR$^3$; and Y$^4$ is CR$^4$, and each of R$^1$-R$^4$ is hydrogen. In some cases, at least one of R$^1$-R$^4$ is halide. In some cases, at least two of R$^1$-R$^4$ is halide. In some cases, the halide is Fluoride. In some cases, the halide is chloride. In some cases, at least one of R$^1$-R$^4$ is —OR$^5$, wherein R$^5$ is selected from H or alkyl. In some cases, at least one of R$^1$-R$^4$ is alkyl or substituted alkyl.

In certain cases of any one of formulae (IIA), (IIAa), (IIAb), (IIB), (IIBa) or (IIBb), one of Y$^1$-Y$^4$ is N. In certain cases, Y$^1$ is N, Y$^2$ is CR$^2$, Y$^3$ is CR$^3$, and Y$^4$ is CR$^4$. In certain cases, Y$^2$ is N, Y$^1$ is CR$^1$, Y$^3$ is CR$^3$, and Y$^4$ is CR$^4$. In certain cases, Y$^3$ is N, Y$^2$ is CR$^2$; Y$^1$ is CR$^1$, and Y$^4$ is CR$^4$. In certain cases, Y$^4$ is N, Y$^2$ is CR$^2$, Y$^3$ is CR$^3$, and Y$^1$ is CR'.

In certain cases of any one of formulae (IIA), (IIAa), (IIAb), (IIB), (IIBa) or (IIBb), two or more of Y$^1$-Y$^4$ are N. In certain cases, any one of formulae (IIA), (IIAa), (IIAb), (IIB), (IIBa) or (IIBb) has a pyrimidine core. In certain cases, any one of formulae (IIA), (IIAa), (IIAb), (IIB), (IBa) or (IIBb) has a pyridazine core. In certain cases, any one of formulae (IIA), (IIAa), (IIAb), (III), (IIBa) or (IIBb) has a pyrazine core. In certain cases, any one of formulae (IIA), (IIAa), (IIAb), (IIB), (IIBa) or (IIBb) has a 1,2,4-triazine core. In certain cases, Y$^1$ is N, Y$^2$ is CR$^2$, Y$^3$ is N, and Y$^4$ is CR$^4$. In certain cases, Y$^2$ is N, Y$^1$ is CR'; Y$^3$ is CR$^3$; and Y$^4$ is N. In certain cases, Y$^1$ is N, Y$^2$ is N, Y$^3$ is CR$^3$, and Y$^4$ is CR$^4$. In certain cases, Y$^2$ is N, Y$^3$ is N, Y$^1$ is CR$^1$, and Y$^4$ is CR$^4$. In certain cases, Y$^3$ is N and Y$^4$ is N, Y$^1$ is CR$^1$, and Y$^2$ is CR$^2$. In certain cases, Y$^1$ is N, Y$^4$ is N, Y$^3$ is CR$^3$, and Y$^2$ is CR$^2$. In certain cases, Y$^1$ is N, Y$^3$ is N, Y$^4$ is N, and Y$^2$ is CR$^2$. In certain cases, Y$^1$ is N, Y$^2$ is N, Y$^4$ is N, and Y$^3$ is CR$^3$.

In certain embodiments, the GPAT inhibitor of formula (I) is described by formula (IIC) or (IID):

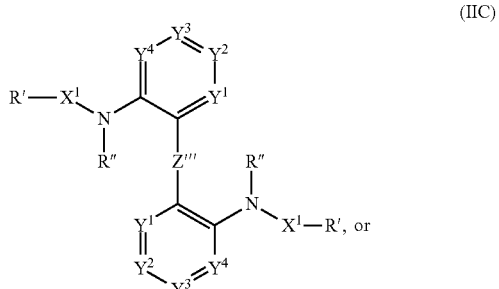

(IIC)

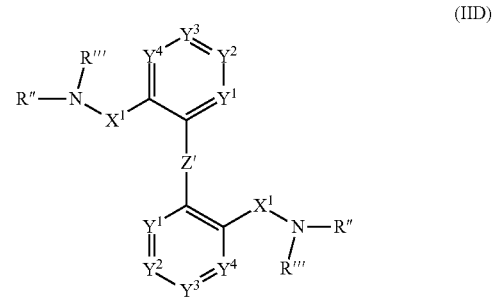

(IID)

wherein:
X$^1$ is selected from

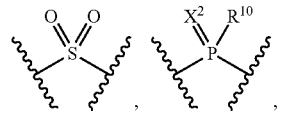

wherein X$^2$ is O or S, R$^{10}$ is selected from SR$^{10a}$, OR$^{10a}$, and N(R$^{10a}$)$_2$;

Z' and Z''' are each independently selected from —(CH$_2$), OR$^a$O(CH$_2$)n-, —(CH$_2$)$_m$OC(O)R$^a$—, —C(O)OR$^a$OC (O)—, —P(O)(OR$^a$)$_2$-, —SO$_2$OR$^a$OSO$_2$—, —S(O) OR$^a$OS(O)-, wherein R$^a$ are each independently selected from alkyl, substituted alkyl, aryl, substituted aryl, cycloalkyl, substituted cycloalkyl, heterocycle, substituted heterocycle, heteroaryl, substituted heteroaryl;

each R$^{10a}$ is independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), Na$^+$, K$^+$, and NH$_4{}^+$;

R' and R''' are each independently selected from alkyl, substituted alkyl, alklyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo (alkyl);

R" is selected from hydrogen, alkyl, substituted alkyl, $OR^{1a}$, $NR^{1a_2}$ and $SR^{1a}$;

$R^{1a}$ is selected H, $COR^{2a}$, $NHR^{2a}$, and $NHCOR^{2a}$, wherein each $R^{2a}$ are independently selected from alkyl, substituted alkyl, alkyl alkenyl, alkyl alkynyl, cycloalkyl, cycloalkyl(alkyl), heterocycloalkyl, heterocycloalkyl(alkyl), substituted heterocycloalkyl, aryl, substituted aryl, aryl(alkyl), substituted aryl(alkyl), heteroaryl, substituted heteroaryl, and halo(alkyl);

$Y^1$ is selected from $CR^1$ and N;

$Y^2$ is selected from $CR^2$ and N;

$Y^3$ is selected from $CR^3$ and N;

$Y^4$ is selected from $CR^4$ and N; and $R^1$-$R^4$ are independently selected from hydrogen, alkyl, substituted alkyl, alkenyl, alkynyl, cycloalkyl; cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), $SF_5$, $NR^5_3{}^+$, azido, cyano, $-OR^5$, $-SR^5$, $-NR^5R^6$, halogen, nitro, $SCH_3$, $OCF_3$, $SO_2CH_3$, $SCF_3$, $SO_2CF_3$, $CF_3$, $-SO_2OR^5$, $-OSO_2R^5$, $CCl_3$, $-C(=O)R^5$, $-C(=O)OR^5$; $-C(=O)NR^5R^6$, $-O\ C(=O)R^5$, $-CHO$, $-C=NR^5$; where $R^5$ and $R^6$ are independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl).

In certain embodiments, the GPAT inhibitor of formula (IIC) or (IID) is described by formula (IICa) or (IIDa):

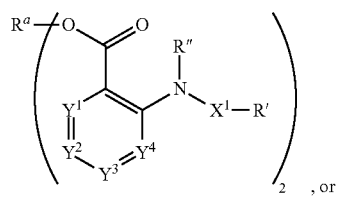

(IICa)

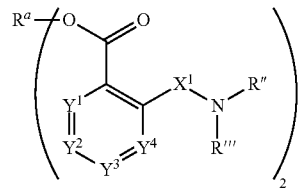

(IIDa)

wherein:

$X^1$ is selected from

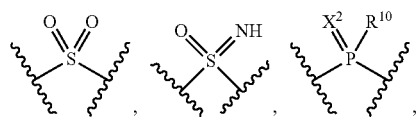

wherein $X^2$ is O or S, $R^{10}$ is selected from $SR^{10a}$, $OR^{10a}$, and $N(R^{10a})_2$;

$R^a$ are each independently selected from alkyl, substituted alkyl, aryl, substituted aryl, cycloalkyl, substituted cycloalkyl, heterocycle, substituted heterocycle, heteroaryl, and substituted heteroaryl;

each $R^{10a}$ is independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), $Na^+$, $K^+$, and $NH_4^+$;

R' and R''' are each independently selected from alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl);

R" is selected from hydrogen, alkyl, substituted alkyl, $OR^{1a}$, $NR^{1a_2}$ and $SR^{1a}$;

$R^{1a}$ is selected H, $COR^{2a}$, $NHR^{2a}$, and $NHCOR^{2a}$, wherein each $R^{2a}$ are independently selected from alkyl, substituted alkyl, alkyl alkenyl, alkyl alkynyl, cycloalkyl, cycloalkyl(alkyl), heterocycloalkyl, heterocycloalkyl(alkyl), substituted heterocycloalkyl, aryl, substituted aryl, aryl(alkyl), substituted aryl(alkyl), heteroaryl, substituted heteroaryl, and halo(alkyl);

$Y^1$ is selected from $CR^1$ and N;

$Y^2$ is selected from $CR^2$ and N;

$Y^3$ is selected from $CR^3$ and N;

$Y^4$ is selected from $CR^4$ and N; and $R^1$-$R^4$ are independently selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), $SF_5$, $NR^5_3{}^+$, azido, cyano, $-OR^5$, $-SR^5$, $-NR^5R^6$, halogen, nitro, $SCH_3$, $OCF_3$, $SO_2CH_3$, $SCF_3$, $SO_2CF_3$, $CF_3$, $-SO_2OR^5$, $-OSO_2R^5$, $CCl_3$, $-C(=O)R^5$, $-C(=O)OR^5$; $-C(=O)NR^5R^6$, $-O\ C(=O)R^5$, $-CHO$, $-C=NR^5$; where $R^5$ and $R^6$ are independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl).

In certain embodiments of formulae (IICa) or (IIDa), $R^a$ is selected from the following structures:

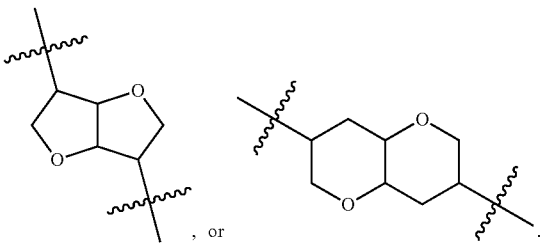 [SMILES: *C1COC2C(*)COC12 ; *C1COC2CC(*)COC2C1]

In certain cases, the compound of formula (IICa) is described by the following structure:

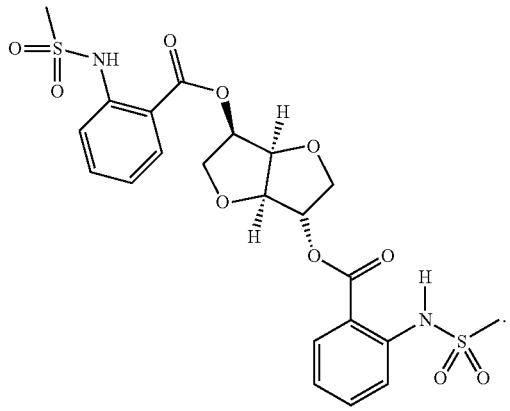

In certain embodiments of formula (110), or (IICa), R' is selected from alkyl, substituted alkyl (e.g., with a substituent as described herein). In certain cases, R' is selected from C1-C20 alkyl. In some cases R' is selected from C1-C10 alkyl. In certain cases, R' is selected from, alkyl alkenyl and alkyl alkynyl. In some cases, R' is selected from C1-C20 alkyl alkenyl or alkyl alkynyl. In certain cases, R' is selected from 01-C10 alkyl alkenyl or alkyl alkynyl. In some cases the alkyl alkenyl or alkyl alkynyl substituent is substituted (e.g., with a substituent as described herein). In certain cases, R' is selected from alkoxy or substituted alkoxy. In some cases, R' is selected from C1-C20 alkoxy. In certain cases, R' is selected from C1-C10 alkoxy. In certain cases, R' is selected from alkylalkoxyalkyl or substituted alkylalkoxyalkyl. In some cases, R' is selected from C1-C20 alkylalkoxyalkyl. In certain cases, R' is selected from C1-C10 alkylalkoxyalkyl. In certain cases, R' is selected from cycloalkyl, cycloalkyl(alkyl), spiroalkyl, spiroheterocycle, bicycloalkyl, substituted spiroheterocycle, wherein any of these cyclic moieties are optionally substituted (e.g., with a substituent as described herein). In certain cases, R' is selected from heterocycloalkyl, and heterocycloalkyl(alkyl), wherein these heterocyclic moieties are optionally substituted (e.g., with a substituent as described herein). In certain cases R' is selected from aryl, substituted aryl, aryl(alkyl), and substituted aryl(alkyl), wherein these aryl moieties are optionally substituted (e.g., with a substituent as described herein). In certain cases, R' is selected from heteroaryl, and substituted heteroaryl, wherein these heteroaryl moieties are optionally substituted (e.g., with a substituent as described herein). In certain cases, R' is a halo(alkyl), wherein the halo(alkyl) group is optionally further substituted (e.g., with a substituent as described herein).

In certain embodiments of any one of formulae (IIC), (IICa), R' comprises an alkyl moiety which is optionally substituted with a group selected from, alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo (alkyl), $SF_5$, $NR^5{}_3{}^+$, azido, cyano, $-OR^5$, $-SR^5$, $-NR^5R^6$, halogen, nitro, $SCH_3$, $OCF_3$, $SO_2CH_3$, $SCF_3$, $SO_2CF_3$, $CF_3$, $-SO_2OR^5$, $-OSO_2R^5$, $CCl_3$, $-C(=O)R^5$, $-C(=O)OR^5$; $-C(=O)NR^5R^6$, $-OC(=O)R^5$, -CHO, and $-C=NR^5$, where $R^5$ and $R^6$ are independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl).

In certain embodiments of formula (IID), or (IIDa), R'" is selected from alkyl, substituted alkyl (e.g., with a substituent as described herein). In certain cases, R'" is selected from C1-C20 alkyl. In some cases R'" is selected from C1-C10 alkyl. In certain cases, R'" is selected from, alkyl alkenyl and alkyl alkynyl. In some cases, R'" is selected from C1-C20 alkyl alkenyl or alkyl alkynyl. In certain cases, R'" is selected from C1-C10 alkyl alkenyl or alkyl alkynyl. In some cases the alkyl alkenyl or alkyl alkynyl substituent is substituted (e.g., with a substituent as described herein). In certain cases, R'" is selected from alkoxy or substituted alkoxy. In some cases, R'" is selected from C1-C20 alkoxy. In certain cases, R'" is selected from C1-C10 alkoxy. In certain cases, R'" is selected from alkylalkoxyalkyl or substituted alkylalkoxyalkyl. In some cases, R'" is selected from C1-C20 alkylalkoxyalkyl. In certain cases, R'" is selected from C1-C10 alkylalkoxyalkyl. In certain cases, R'" is selected from cycloalkyl, cycloalkyl(alkyl), spiroalkyl, spiroheterocycle, bicycloalkyl, bicycloheterocyle, wherein any of these cyclic moieties are optionally substituted (e.g., with a substituent as described herein). In certain cases, R'" is selected from heterocycloalkyl, and heterocycloalkyl(alkyl), wherein these heterocyclic moieties are optionally substituted (e.g., with a substituent as described herein). In certain cases R'" is selected from aryl, substituted aryl, aryl(alkyl), and substituted aryl(alkyl), wherein these aryl moieties are optionally substituted (e.g., with a substituent as described herein). In certain cases, R'" is selected from heteroaryl, and substituted heteroaryl, wherein these heteroaryl moieties are optionally substituted (e.g., with a substituent as described herein). In certain cases, R'" is a halo(alkyl), wherein the halo(alkyl) group is optionally further substituted (e.g., with a substituent as described herein).

In certain embodiments of any one of formulae (IID), (IIDa), R'" comprises an alkyl moiety which is optionally substituted with a group selected from, alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo (alkyl), $SF_5$, $NR^5{}_3{}^+$, azido, cyano, $-OR^5$, $-SR^5$, $-NR^5R^6$, halogen, nitro, $SCH_3$, $OCF_3$, $SO_2CH_3$, $SCF_3$, $SO_2CF_3$, $CF_3$, $-SO_2OR^5$, $-OSO_2R^5$, $CCl_3$, $-C(=O)R^5$, $-C(=O)OR^5$; $-C(=O)NR^5R^6$, $-OC(=O)R^5$, -CHO, and $-C=NR^5$, where $R^5$ and $R^6$ are independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl).

In certain cases of any one of formulae (IIC), (IICa), (IID), or (IIDa), R" is hydrogen. In certain cases R" is alkyl or substituted alkyl (e.g., as described herein). In certain cases, R" is $OR^{1a}$, wherein $R^{1a}$ is selected H, $COR^{2a}$, $NHR^{2a}$, and $NHCOR^{2a}$, and $R^{2a}$ is as described herein above. In certain cases, R" is $NR^{1a}{}_2$, wherein each $R^{1a}$ is independently selected from H, $COR^{2a}$, $NHR^{2a}$, and $NHCOR^{2a}$, and $R^{2a}$ is as described herein above. In certain cases, R" is $SR^{1a}$, wherein $R^{1a}$ is selected H, $COR^{2a}$, $NHR^{2a}$, and $NHCOR^{2a}$, and $R^{2a}$ is as described herein above.

In certain cases of any one of formulae (IIC), (IICa), (IID), or (IIDa), $Y^1$ is $CR^1$; $Y^2$ is $CR^2$; $Y^3$ is $CR^3$; and $Y^4$ is $CR^4$; where $R^1$, $R^2$, $R^3$ and $R^4$ are independently selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), SF$_5$, NR$^5_3$*, azido, cyano, —OR', —SR$^5$, —NR$^5$R$^6$, halide, nitro, SCH$_3$, OCF$_3$, SO$_2$CH$_3$, SCF$_3$, SO$_2$CF$_3$, CF$_3$, —SO$_2$OR$^5$, —OSO$_2$R$^5$, CCl$_3$, —C(=O)R$^5$, —C(=O)OR$^5$; —C(=O)NR$^5$R$^6$, —OC(=O)R$^5$,-CHO, and —C=NR$^5$, wherein R$^5$ and R$^6$ are independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl).

In some cases of formulae (IIC), (IICa), (IID), or (IIDa), Y$^1$ is CR$^1$; Y$^2$ is CR$^2$; Y$^3$ is CR$^3$; and Y$^4$ is CR$^4$, and each of R$^1$-R$^4$ is hydrogen. In some cases, at least one of R$^1$-R$^4$ is halide. In some cases, at least two of R$^1$-R$^4$ is halide. In some cases, the halide is Fluoride. In some cases, the halide is chloride. In some cases, at least one of R$^1$-R$^4$ is —OR$^5$, wherein R$^5$ is selected from H or alkyl. In some cases, at least one of R$^1$-R$^4$ is alkyl or substituted alkyl.

In certain cases of any one of formulae (IIC), (IICa), (IID), or (IIDa), one of Y$^1$—Y$^4$ is N. In certain cases, Y$^1$ is N, Y$^2$ is CR$^2$, Y$^3$ is CR$^3$, and Y$^4$ is CR$^4$. In certain cases, Y$^2$ is N, Y$^1$ is CR$^1$, Y$^3$ is CR$^3$, and Y$^4$ is CR$^4$. In certain cases, Y$^3$ is N, Y$^2$ is CR$^2$; Y$^1$ is CR$^1$, and Y$^4$ is CR$^4$. In certain cases, Y$^4$ is N, Y$^2$ is CR$^2$, Y$^3$ is CR$^3$, and Y$^1$ is CR$^1$.

In certain cases of any one of formulae (IIC), (IICa), (IID), or (IIDa), two or more of Y$^1$-Y$^4$ are N. In certain cases, Y$^1$ is N, Y$^2$ is CR$^2$, Y$^3$ is N, and Y$^4$ is CR$^4$. In certain cases, Y$^2$ is N, Y$^1$ is CR$^1$; Y$^3$ is CR$^3$; and Y$^4$ is N. In certain cases, Y$^1$ is N, Y$^2$ is N, Y$^3$ is CR$^3$, and Y$^4$ is CR$^4$. In certain cases, Y$^2$ is N, Y$^3$ is N, Y$^1$ is CR$^1$, and Y$^4$ is CR$^4$. In certain cases, Y$^3$ is N and Y$^4$ is N, Y$^1$ is CR$^1$, and Y$^2$ is CR$^2$. In certain cases, Y$^1$ is N, Y$^4$ is N, Y$^3$ is CR$^3$, and Y$^2$ is CR$^2$. In certain cases, Y$^1$ is N, Y$^3$ is N, Y$^4$ is N, and Y$^2$ is CR$^2$. In certain cases, Y$^1$ is N, Y$^2$ is N, Y$^4$ is N, and Y$^3$ is CR$^3$.

In certain embodiments, the GPAT inhibitor of formula (I) is described by formula (IIIA) or (IIIB):

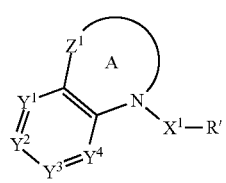

(IIIA)

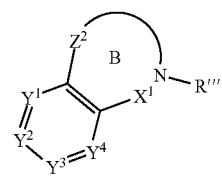

(IIIB)

wherein:
Z$^1$ and Z$^2$ are each independently selected from carboxylato, alkoxy, alkoxycarbonyl, imine, amino, amido, acyl, thio, and alkylthio;
ring A and B are each independently selected from a 5-10 membered cyclic group selected from heterocycle, and substituted heterocycle;

X$^1$ is selected from

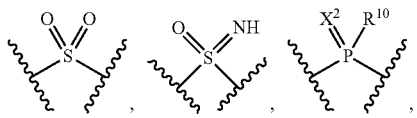

wherein X$^2$ is O or S, R$^{10}$ is selected from SR$^{10a}$, OR$^{10a}$, and N(R$^{10a}$)$_2$;
each R$^{10a}$ is independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), Na$^+$, K$^+$, and NH$_4^+$;
R' and R''' are each independently selected from alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo (alkyl);
Y$^1$ is selected from CR$^1$ and N;
Y$^2$ is selected from CR$^2$ and N;
Y$^3$ is selected from CR$^3$ and N;
Y$^4$ is selected from CR$^4$ and N; and
R$^1$-R$^4$ are independently selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), SF$_5$, NR$^5_3$*, azido, cyano, —OR$^5$, —SR$^5$, —NR$^5$R$^6$, halogen, nitro, SCH$_3$, OCF$_3$, SO$_2$CH$_3$, SCF$_3$, SO$_2$CF$_3$, CF$_3$, —SO$_2$OR$^5$, —OSO$_2$R$^5$, CCl$_3$, —C(=O)R$^5$, —C(=O)OR$^5$; —C(=O)NR$^5$R$^6$, —O C(=O)R$^5$, —CHO, —C=NR$^5$; where R$^5$ and R$^6$ are independently selected from, hydrogen, alkyl, substituted alkyl, alkyl alkenyl, alkyl alkynyl, cycloalkyl, cycloalkyl (alkyl), heterocycloalkyl, heterocycloalkyl(alkyl), aryl, substituted aryl, aryl(alkyl), substituted aryl(alkyl), heteroaryl, substituted heteroaryl, and halo(alkyl).

In certain embodiments of the GPAT inhibitor of formula (IIIA) or (IIIB), Z$^1$ and Z$^2$ are each independently selected from —(CH$_2$)$_n$O—, —C(NH)—, —(CH$_2$)$_m$OC(O)— and —CO$_2$—, wherein n and m are each independently an integer from 1-5. In certain cases of formula (IIIA), Z$^1$ is —(CH$_2$)$_n$O—, wherein n is an integer from 1. In some cases, Z$^1$ is —C(NH)-. In some cases, Z' is —(CH$_2$)$_m$OC(O)-, and m is 1. In some cases, Z$^1$ is —CO$_2$—. In certain cases of formula (IIIB), Z$^2$ is —(CH$_2$)$_n$O—, wherein n is an integer from 1. In some cases, Z$^2$ is —C(NH)-. In some cases, Z$^2$ is —(CH$_2$)$_m$OC(O)-, and m is 1. In some cases, Z$^2$ is —CO$_2$-.

In certain embodiments of the GPAT inhibitor of formula (IIIA) or (IIIB), is described by the formula (IIIAa), (IIIAb), or (IIIBa):

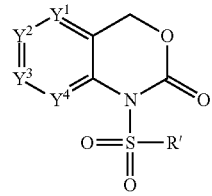

(IIIAa)

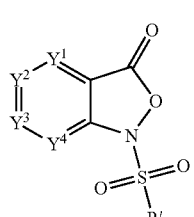

(IIIAb)

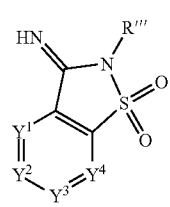

(IIIBa)

wherein:
R' and R'" are each independently selected from alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl);

$Y^1$ is selected from $CR^1$ and N;
$Y^2$ is selected from $CR^2$ and N;
$Y^3$ is selected from $CR^3$ and N;
$Y^4$ is selected from $CR^4$ and N; and
$R^1$-$R^4$ are independently selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), $SF_5$, $NR^5_3$, azido, cyano, —$OR^5$, —$SR^5$, —$NR^5R^6$, halogen, nitro, $SCH_3$, $OCF_3$, $SO_2CH_3$, $SCF_3$, $SO_2CF_3$, $CF_3$, —$SO_2OR^5$, —$OSO_2R^5$, $CCl_3$, —C(=O)$R^5$, —C(=O)$OR^5$; —C(=O)$NR^5R^6$, —O C(=O)$R^5$, —CHO, —C=$NR^5$; where $R^5$ and $R^6$ are independently selected from hydrogen, alkyl, substituted alkyl, alkyl alkenyl, alkyl alkynyl, cycloalkyl, cycloalkyl (alkyl), heterocycloalkyl, heterocycloalkyl(alkyl), aryl, substituted aryl, aryl(alkyl), substituted aryl(alkyl), heteroaryl, substituted heteroaryl, and halo(alkyl).

In certain embodiments of formula (IIIA), (IIIAa), or (IIIAb) R' is selected from alkyl, substituted alkyl (e.g., with a substituent as described herein). In certain cases, R' is selected from C1-C20 alkyl. In some cases R' is selected from C1-C10 alkyl. In certain cases, R' is selected from, alkyl alkenyl and alkyl alkynyl. In some cases, R' is selected from C1-C20 alkyl alkenyl or alkyl alkynyl. In certain cases, R' is selected from C1-C10 alkyl alkenyl or alkyl alkynyl. In some cases the alkyl alkenyl or alkyl alkynyl substituent is substituted (e.g., with a substituent as described herein). In certain cases, R' is selected from alkoxy or substituted alkoxy. In some cases, R' is selected from C1-C20 alkoxy. In certain cases, R' is selected from C1-C10 alkoxy. In certain cases, R' is selected from alkylalkoxyalkyl or substituted alkylalkoxyalkyl. In some cases, R' is selected from C1-C20 alkylalkoxyalkyl. In certain cases, R' is selected from C1-C10 alkylalkoxyalkyl. In certain cases, R' is selected from cycloalkyl, cycloalkyl(alkyl), spiroalkyl, spiroheterocycle, bicycloalkyl, substituted spiroheterocycle, wherein any of these cyclic moieties are optionally substituted (e.g., with a substituent as described herein). In certain cases, R' is selected from heterocycloalkyl, and heterocycloalkyl(alkyl), wherein these heterocyclic moieties are optionally substituted (e.g., with a substituent as described herein). In certain cases R' is selected from aryl, substituted aryl, aryl(alkyl), and substituted aryl(alkyl), wherein these aryl moieties are optionally substituted (e.g., with a substituent as described herein). In certain cases, R' is selected from heteroaryl, and substituted heteroaryl, wherein these heteroaryl moieties are optionally substituted (e.g., with a substituent as described herein). In certain cases, R' is a halo(alkyl), wherein the halo(alkyl) group is optionally further substituted (e.g., with a substituent as described herein).

In certain embodiments of any one of formulae (IIIA), (IIIAa), or (IIIAb) R' comprises an alkyl moiety which is optionally substituted with a group selected from, alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), $SF_5$, $NR^5_3$*, azido, cyano, —$OR^5$, —$SR^5$, —$NR^5R^6$, halogen, nitro, $SCH_3$, $OCF_3$, $SO_2CH_3$, $SCF_3$, $SO_2CF_3$, $CF_3$, —$SO_2OR^5$, —$OSO_2R^5$, $CCl_3$, —C(=O)$R^5$, —C(=O)$OR^5$; —C(=O)$NR^5R^6$, —OC(=O)$R^5$,-CHO, and —C=$NR^5$.

In certain embodiments of formula (IIIB), or (IIIBa), R is selected from alkyl, substituted alkyl (e.g., with a substituent as described herein). In certain cases, R'" is selected from C1-C20 alkyl. In some cases R'" is selected from C1-C10 alkyl. In certain cases, R'" is selected from, alkyl alkenyl and alkyl alkynyl. In some cases, R'" is selected from C1-C20 alkyl alkenyl or alkyl alkynyl. In certain cases, R'" is selected from C1-C10 alkyl alkenyl or alkyl alkynyl. In some cases the alkl alkenyl or alkyl alkynyl substituent is substituted (e.g., with a substituent as described herein). In certain cases, R'" is selected from alkoxy or substituted alkoxy. In some cases, R'" is selected from C1-C20 alkoxy. In certain cases, R'" is selected from C1-C10 alkoxy. In certain cases, R'" is selected from cycloalkyl, cycloalkyl (alkyl), spiroalkyl, spiroalkyloxyalkyl, bicycloalkyl, wherein any of these cyclic moieties are optionally substituted (e.g., with a substituent as described herein). In certain cases, R'" is selected from heterocycloalkyl, and heterocycloalkyl(alkyl), wherein these heterocyclic moieties are optionally substituted (e.g., with a substituent as described herein). In certain cases R'" is selected from aryl, substituted aryl, aryl(alkyl), and substituted aryl(alkyl), wherein these aryl moieties are optionally substituted (e.g., with a substituent as described herein). In certain cases, R'" is selected from heteroaryl, and substituted heteroaryl, wherein these heteroaryl moieties are optionally substituted (e.g., with a substituent as described herein). In certain cases, R'" is a halo(alkyl), wherein the halo(alkyl) group is optionally further substituted (e.g., with a substituent as described herein).

In certain embodiments of any one of formulae (IIIB), (IIIBa), R'" comprises an alkyl moiety which is optionally substituted with a group selected from, alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), $SF_5$, $NR^5_3$+, azido, cyano, —$OR^5$, —$SR^5$, —$NR^5R^6$, halogen, nitro, $SCH_3$, $OCF_3$, $SO_2CH_3$, $SCF_3$, $SO_2CF_3$, $CF_3$, —$SO_2OR^5$, —$OSO_2R^5$, $CCl_3$, —C(=O)$R^5$, —C(=O)$OR^5$; —C(=O)$NR^5R^6$, —OC(=O) $R^5$,-CHO, and —C=$NR^5$, where $R^5$ and $R^6$ are independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl).

In certain cases of any one of formulae (IIIA), (IIIAa), (IIIAb), (IIIB), or (IIBa), R" is hydrogen. In certain cases R" is alkyl or substituted alkyl (e.g., as described herein). In certain cases, R" is $OR^{1a}$, wherein $R^{1a}$ is selected H, $COR^{2a}$, $NHR^{2a}$, and $NHCOR^{2a}$, and $R^{2a}$ is as described herein above. In certain cases, R" is $NR^{1a2}$, wherein each $R^{1a}$ is independently selected from H, $COR^{2a}$, $NHR^{2a}$, and $NHCOR^{2a}$, and $R^{2a}$ is as described herein above. In certain cases, R" is $SR^{1a}$, wherein $R^{1a}$ is selected H, $COR^{2a}$, $NHR^{2a}$, and $NHCOR^{2a}$, and $R^{2a}$ is as described herein above.

In certain cases of anyone of formulae (IIIA), (IIIAa), (IIIAb), (IIIB), or (IIBa), $Y^1$ is $CR^1$; $Y^2$ is $CR^2$; $Y^3$ is $CR^3$; and $Y^4$ is $CR^4$; where $R^1$, $R^2$, $R^3$ and $R^4$ are independently selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), $SF_5$, $NR^5_3$*, azido, cyano, —OR', —$SR^5$, —$NR^5R^6$, halide, nitro, $SCH_3$, $OCF_3$, $SO_2CH_3$, $SCF_3$, $SO_2CF_3$, $CF_3$, —$SO_2OR^5$, —$OSO_2R^5$, $CCl_3$, —C(=O)$R^5$, —C(=O)O$R^5$, —C(=O)N$R^5R^6$, —OC(=O)$R^5$, -CHO, and —C=N$R^5$, wherein $R^5$ and $R^6$ are independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl).

In some cases of formulae (IIIA), (IIIAa), (IIIAb), (IIIB), or (IIIBa), $Y^1$ is $CR^1$; $Y^2$ is $CR^2$; $Y^3$ is $CR^3$; and $Y^4$ is $CR^4$, and each of $R^1$-$R^4$ is hydrogen. In some cases, at least one of $R^1$-$R^4$ is halide. In some cases, at least two of $R^1$-$R^4$ is halide. In some cases, the halide is Fluoride. In some cases, the halide is chloride. In some cases, at least one of $R^1$-$R^4$ is —$OR^5$, wherein $R^5$ is selected from H or alkyl. In some cases, at least one of $R^1$-$R^4$ is alkyl or substituted alkyl.

In certain cases of any one of formulae (IIIA), (IIIAa), (IIIAb), (IIIB), or (IIIBa), one of $Y^1$—$Y^4$ is N. In certain cases, $Y^1$ is N, $Y^2$ is $CR^2$, $Y^3$ is $CR^3$, and $Y^4$ is $CR^4$. In certain cases, $Y^2$ is N, $Y^1$ is $CR^1$, $Y^3$ is $CR^3$, and $Y^4$ is $CR^4$. In certain cases, $Y^3$ is N, $Y^2$ is $CR^2$; $Y^1$ is $CR^1$, and $Y^4$ is $CR^4$. In certain cases, $Y^4$ is N, $Y^2$ is $CR^2$, $Y^3$ is $CR^3$, and $Y^1$ is $CR^1$.

In certain cases of any one of formulae (IIIA), (IIIAa), (IIIAb), (IIIB), or (IIIBa), two or more of $Y^1$-$Y^4$ are N. In certain cases, $Y^1$ is N, $Y^2$ is $CR^2$, $Y^3$ is N, and $Y^4$ is $CR^4$. In certain cases, $Y^2$ is N, $Y^1$ is $CR^1$; $Y^3$ is $CR^3$; and $Y^4$ is N. In certain cases, $Y^1$ is N, $Y^2$ is N, $Y^3$ is $CR^3$, and $Y^4$ is $CR^4$.

In certain cases, $Y^2$ is N, $Y^3$ is N, $Y^1$ is $CR^1$, and $Y^4$ is $CR^4$. In certain cases, $Y^3$ is N and $Y^4$ is N, $Y^1$ is $CR^1$, and $Y^2$ is $CR^2$. In certain cases, $Y^1$ is N, $Y^4$ is N, $Y^3$ is $CR^3$, and $Y^2$ is $CR^2$. In certain cases, $Y^1$ is N, $Y^3$ is N, $Y^4$ is N, and $Y^2$ is $CR^2$. In certain cases, $Y^1$ is N, $Y^2$ is N, $Y^4$ is N, and $Y^3$ is $CR^3$.

In certain embodiments, the GPAT inhibitor is any one of the following structures:

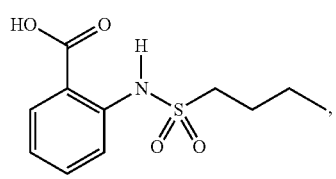

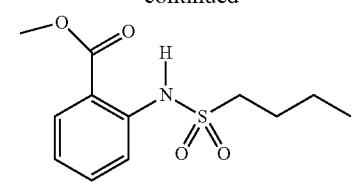

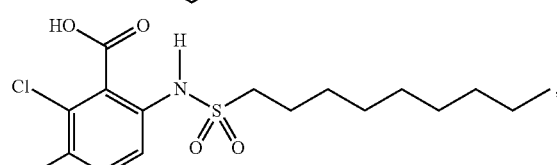

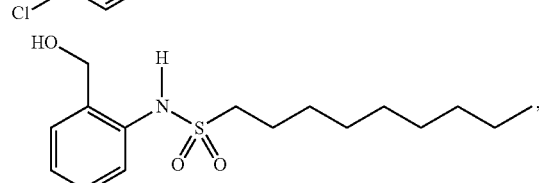

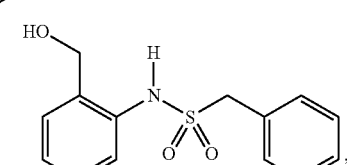

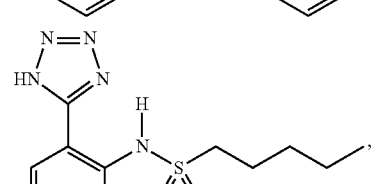

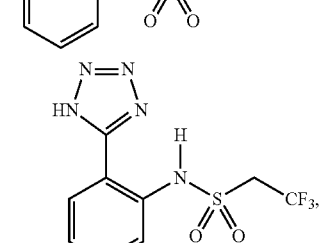

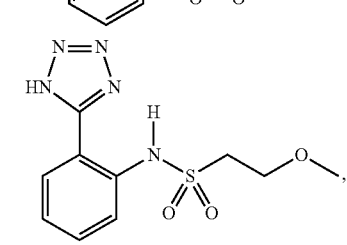

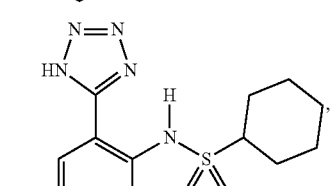

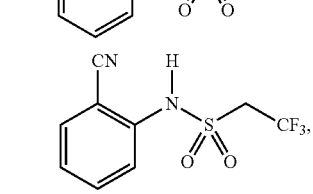

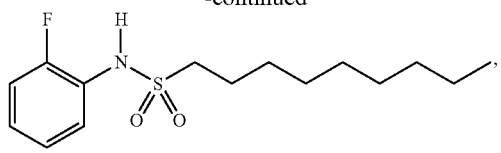
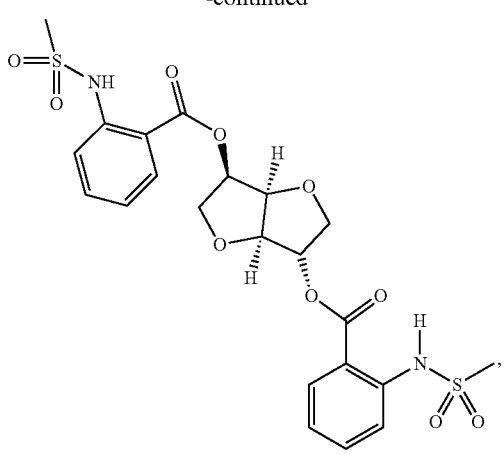
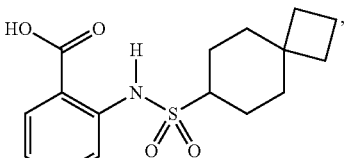
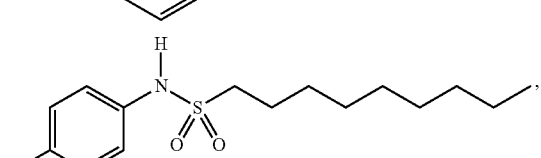
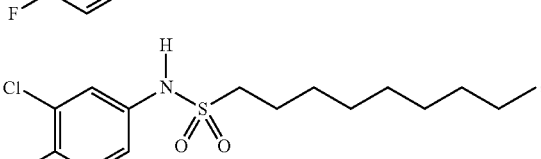
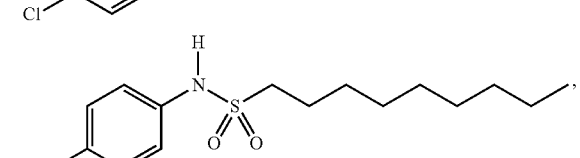
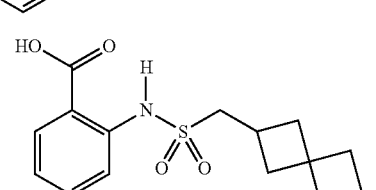
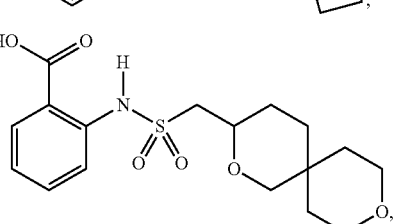
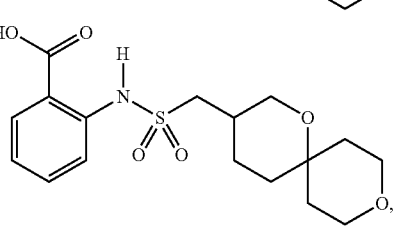

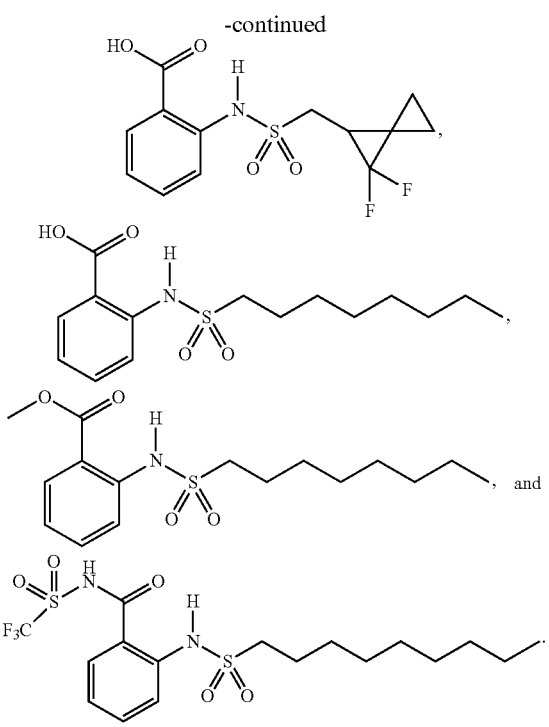

In certain embodiments, the GPAT inhibitor is any one of the following structures:

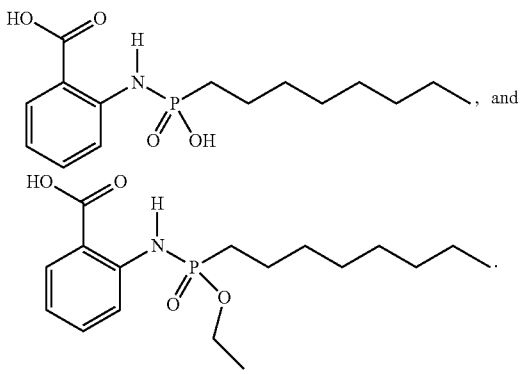

In certain embodiments, the GPAT inhibitor is any one of the following structures:

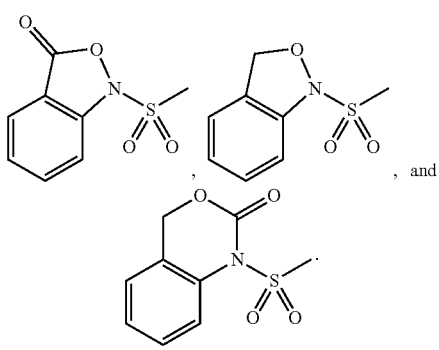

In certain embodiments, the GPAT inhibitor of any one of the formulae or structures described herein, wherein the compound includes one or more chiral centers, wherein each chiral center is independently of R-configuration, S-configuration or a mixture thereof. In certain cases, the GPAT inhibitor includes one or more chiral centers of R-configuration. In certain cases, the GPAT inhibitor includes one or more chiral centers of S-configuration. In certain cases, the GPAT inhibitor includes one or more chiral centers as a mixture of R- and S-configuration.

In some cases, the subject GPAT inhibitor is of the formula (II):

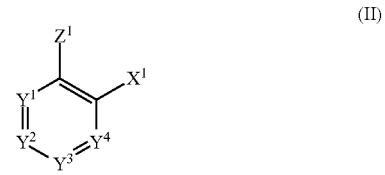

(II)

wherein:
$X^1$ is selected from a sulfonamide, a retro-sulfonamide, a sulfinamide, a retro-sulfinamide, a phosphonamidite, a retro-phosphamidite, a phosphonamidate, a retro-phosphonamidate, a hydroxamic acid, a hydrazide, wherein any of $X^1$ moieties are optionally substituted (e.g., with a substituent as described herein);

$Z^1$ is selected from hydrogen, $-CO_2R^a$, $-(CH_2)_nOR^a$, $-(CH_2)_mOC(O)R$, $-CO_2R^aCO_2R^a-$, a carboxy isostere, nitrile, halogen, trifluoromethyl, $-P(O)(OR^a)_2$, $SO_2OR^a$, $B(OR^a)_2$, $SO_2CF_3$, $SOCF_3$, $S(O)OR^a$, and $SF_5$, wherein $R^a$ are each independently selected from hydrogen, alkyl, substituted alkyl, aryl, substituted aryl, cycloalkyl, substituted cycloalkyl, heterocycle, substituted heterocycle, heteroaryl, substituted heteroaryl;

$Y^1$ is selected from $CR^1$ and N;
$Y^2$ is selected from $CR^2$ and N;
$Y^3$ is selected from $CR^3$ and N;
$Y^4$ is selected from $CR^4$ and N; and
$R^1$-$R^4$ are independently selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), $SF_5$, $NR^5_3{}^+$, azido, cyano, $-OR^5$, $-SR^5$, $-NR^5R^6$, halogen, nitro, $SCH_3$, $OCF_3$, $SO_2CH_3$, $SCF_3$, $SO_2CF_3$, $CF_3$, $-SO_2OR^5$, $-OSO_2R^5$, $CCl_3$, $-C(=O)R^5$, $-C(=O)OR^5$, $-C(=O)NR^5R^6$, $-O$ $C(=O)R^5$, $-CHO$, $-C=NR^5$; where $R^5$ and $R^6$ are independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl).

or a pharmaceutically acceptable salt or solvate thereof.

In certain embodiments, the GPAT inhibitor of formula (II) is described by any of the formulae (IIA), (IIB), (IIAa), (IIAb), (IBa) or (IIBb).

In certain embodiments, the GPAT inhibitor compound is described by the structure of one of the compounds of formulas (I)-(IIIBb). It is understood that any of the subject compounds disclosed herein may be present in a salt form. In some cases, the salt form of the compound is a pharmaceutically acceptable salt.

Aspects of the present disclosure include GPAT inhibitor compounds (e.g., as described herein), salts thereof (e.g., pharmaceutically acceptable salts), and/or solvate, hydrate and/or prodrug forms thereof. In addition, it is understood that, in any compound described herein having one or more chiral centers, if an absolute stereochemistry is not expressly indicated, then each center may independently be of R-configuration or S-configuration or a mixture thereof. It will be appreciated that all permutations of salts, solvates, hydrates, prodrugs and stereoisomers are meant to be encompassed by the present disclosure.

In some embodiments, the subject GPAT inhibitor compounds, or a prodrug form thereof, are provided in the form of pharmaceutically acceptable salts. Compounds containing an amine or nitrogen containing heteroaryl group may be basic in nature and accordingly may react with any number of inorganic and organic acids to form pharmaceutically acceptable acid addition salts. Acids commonly employed to form such salts include inorganic acids such as hydrochloric, hydrobromic, hydriodic, sulfuric and phosphoric acid, as well as organic acids such as para-toluenesulfonic, methanesulfonic, oxalic, para-bromophenylsulfonic, carbonic, succinic, citric, benzoic and acetic acid, and related inorganic and organic acids. Such pharmaceutically acceptable salts thus include sulfate, pyrosulfate, bisulfate, sulfite, bisulfite, phosphate, monohydrogenphosphate, dihydrogenphosphate, metaphosphate, pyrophosphate, chloride, bromide, iodide, acetate, propionate, decanoate, caprylate, acrylate, formate, isobutyrate, caprate, heptanoate, propiolate, oxalate, malonate, succinate, suberate, sebacate, fumarate, maleate, butyne-1,4-dioate, hexyne-1,6-dioate, benzoate, chlorobenzoate, methylbenzoate, dinitrobenzoate, hydroxybenzoate, methoxybenzoate, phthalate, terephathalate, sulfonate, xylenesulfonate, phenylacetate, phenylpropionate, phenylbutyrate, citrate, lactate, 3-hydroxybutyrate, glycollate, maleate, tartrate, methanesulfonate, propanesulfonates, naphthalene-1-sulfonate, naphthalene-2-sulfonate, mandelate, hippurate, gluconate, lactobionate, and the like salts. In certain specific embodiments, pharmaceutically acceptable acid addition salts include those formed with mineral acids such as hydrochloric acid and hydrobromic acid, and those formed with organic acids such as fumaric acid and maleic acid.

In some embodiments, the subject compounds are provided in a prodrug form. "Prodrug" refers to a derivative of an active agent that requires a transformation within the body to release the active agent. In certain embodiments, the transformation is an enzymatic transformation. Prodrugs are frequently, although not necessarily, pharmacologically inactive until converted to the active agent. "Promoiety" refers to a form of protecting group that, when used to mask a functional group within an active agent, converts the active agent into a prodrug. In some cases, the promoiety will be attached to the drug via bond(s) that are cleaved by enzymatic or non-enzymatic means in vivo. Any convenient prodrug forms of the subject compounds can be prepared, e.g., according to the strategies and methods described by Rautio et al. ("Prodrugs: design and clinical applications", Nature Reviews Drug Discovery 7, 255-270 (February 2008)). In some cases, the promoiety is attached to the carboxylic acid group of the subject compounds. In certain cases, the promoiety is an acyl or substituted acyl group. In certain cases, the promoiety is an alkyl or substituted alkyl group, e.g., that forms an ester when attached to the carboxylic acid group of the subject compounds.

In some embodiments, the subject compounds, prodrugs, stereoisomers or salts thereof are provided in the form of a solvate (e.g., a hydrate). The term "solvate" as used herein refers to a complex or aggregate formed by one or more molecules of a solute, e.g. a prodrug or a pharmaceutically-acceptable salt thereof, and one or more molecules of a solvent. Such solvates are typically crystalline solids having a substantially fixed molar ratio of solute and solvent. Representative solvents include by way of example, water, methanol, ethanol, isopropanol, acetic acid, and the like. When the solvent is water, the solvate formed is a hydrate.

In some embodiments, the subject compounds are provided by oral dosing and absorbed into the bloodstream. In some embodiments, the oral bioavailability of the subject compounds is 30% or more. Modifications may be made to the subject compounds or their formulations using any convenient methods to increase absorption across the gut lumen or their bioavailability. In some embodiments, the subject compounds are solubilized for administration by injection, infusion, intrathecal infusion/injection, or topically administered to specific tissues (i.e. rectum, vagina, mouth, skin, surgical tissue bed, lung, trachea, bladder, tissue ulcer, wound).

In some embodiments, the subject compounds are metabolically stable (e.g., remain substantially intact in vivo during the half-life of the compound). In certain embodiments, the compounds have a half-life (e.g., an in vivo half-life) of 5 minutes or more, such as 10 minutes or more, 12 minutes or more, 15 minutes or more, 20 minutes or more, 30 minutes or more, 60 minutes or more, 2 hours or more, 6 hours or more, 12 hours or more, 24 hours or more, or even more. In some embodiments, the subject compounds are metabolically unstable and yield active drug upon metabolism.

Formulations and Dosing

The compounds of this disclosure can be supplied in the form of a pharmaceutical composition. Any suitable pharmaceutical composition may be employed, described in more detail below. As such, in some instances, methods of the present disclosure may include administering an inhibitor in a composition comprising an excipient (e.g., an isotonic excipient) prepared under sufficiently sterile conditions for administration to a mammal, e.g., a human.

Administration of an inhibitor to a subject, as described herein, may be performed employing various routes of administration. The route of administration may be selected according to a variety of factors including, but not necessarily limited to, the condition to be treated, the formulation and/or device used, the patient to be treated, and the like. Routes of administration useful in the disclosed methods include but are not limited to oral and parenteral routes, such as intravenous (iv), intratumoral (it), intraperitoneal (ip), rectal, topical, ophthalmic, nasal, subcutaneous, and transdermal. Formulations for these dosage forms are described herein.

An effective amount of a subject compound will depend, at least, on the particular method of use, the subject being treated, the severity of the affliction, and the manner of administration of the therapeutic composition. A "therapeutically effective amount" of a composition is a quantity of a specified compound sufficient to achieve a desired effect in a subject (host) being treated.

Therapeutically effective doses of a subject compound or pharmaceutical composition can be determined by one of skill in the art, with a goal of achieving local (e.g., tissue, cellular) concentrations that are at least as high as the $IC_{50}$ of an applicable compound disclosed herein.

The specific dose level and frequency of dosage for any particular subject may be varied and will depend upon a variety of factors, including the activity of the subject compound, the metabolic stability and length of action of that compound, the age, body weight, general health, metabolic genotype, kidney/liver health, sex and diet of the subject, mode and time of administration, rate of excretion, drug combination, and severity of the condition of the host undergoing therapy.

Conversion of an animal dose to human equivalent doses (HED) may, in some instances, be performed using the conversion table and/or algorithm provided by the U.S. Department of Health and Human Services, Food and Drug Administration, Center for Drug Evaluation and Research (CDER) in, e.g., *Guidance for Industry: Estimating the Maximum Safe Starting Dose in Initial Clinical Trials for Therapeutics in Adult Healthy Volunteers* (2005) Food and Drug Administration, 5600 Fishers Lane, Rockville, MD 20857, the disclosure of which is incorporated herein by reference).

A pharmaceutical composition comprising a subject compound (i.e., a GPAT inhibitory agent or a combination thereof) may be administered to a patient alone, or in combination with other supplementary active agents. The pharmaceutical compositions may be manufactured using any of a variety of processes, including, without limitation, conventional mixing, dissolving, granulating, degree-making, levigating, emulsifying, encapsulating, entrapping, and lyophilizing. The pharmaceutical composition can take any of a variety of forms including, without limitation, a sterile solution, suspension, emulsion, lyophilisate, tablet, pill, pellet, capsule, powder, syrup, elixir or any other dosage form suitable for administration.

A subject compound may be administered to the host using any convenient means capable of resulting in the desired reduction in disease condition or symptom. Thus, a subject compound can be incorporated into a variety of formulations for therapeutic administration. More particularly, a subject compound can be formulated into pharmaceutical compositions by combination with appropriate pharmaceutically acceptable carriers or diluents, and may be formulated into preparations in solid, semi-solid, liquid or gaseous forms, such as tablets, capsules, powders, granules, ointments, solutions, suppositories, injections, inhalants and aerosols.

Formulations for pharmaceutical compositions are well known in the art. For example, Remington's Pharmaceutical Sciences, by E. W. Martin, Mack Publishing Co., Easton, Pa., 19th Edition, 1995, describes exemplary formulations (and components thereof) suitable for pharmaceutical delivery of disclosed compounds. Pharmaceutical compositions comprising at least one of the subject compounds can be formulated for use in human or veterinary medicine. Particular formulations of a disclosed pharmaceutical composition may depend, for example, on the mode of administration and/or on the location of the infection to be treated. In some embodiments, formulations include a pharmaceutically acceptable carrier in addition to at least one active ingredient, such as a subject compound. In other embodiments, other medicinal or pharmaceutical agents, for example, with similar, related or complementary effects on the affliction being treated can also be included as active ingredients in a pharmaceutical composition.

Pharmaceutically acceptable carriers useful for the disclosed methods and compositions are conventional in the art. The nature of a pharmaceutical carrier will depend on the particular mode of administration being employed. For example, parenteral formulations usually comprise injectable fluids that include pharmaceutically and physiologically acceptable fluids such as water, physiological saline, balanced salt solutions, aqueous dextrose, glycerol or the like as a vehicle. For solid compositions (e.g., powder, pill, tablet, or capsule forms), conventional non-toxic solid carriers can include, for example, pharmaceutical grades of mannitol, lactose, starch, or magnesium stearate. In addition to biologically neutral carriers, pharmaceutical compositions to be administered can optionally contain minor amounts of non-toxic auxiliary substances (e.g., excipients), such as wetting or emulsifying agents, preservatives, and pH buffering agents and the like; for example, sodium acetate or sorbitan monolaurate. Other non-limiting excipients include, nonionic solubilizers, such as cremophor, or proteins, such as human serum albumin or plasma preparations.

Some examples of materials which can serve as pharmaceutically-acceptable carriers include: (1) sugars, such as lactose, glucose and sucrose; (2) starches, such as corn starch and potato starch; (3) cellulose, and its derivatives, such as sodium carboxymethyl cellulose, ethyl cellulose and cellulose acetate; (4) powdered tragacanth; (5) malt; (6) gelatin; (7) talc; (8) excipients, such as cocoa butter and suppository waxes; (9) oils, such as peanut oil, cottonseed oil, safflower oil, sesame oil, olive oil, corn oil and soybean oil; (10) glycols, such as propylene glycol; (II) polyols, such as glycerin, sorbitol, mannitol, and polyethylene glycol; (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) pH buffered solutions; (21) polyesters, polycarbonates and/or polyanhydrides; and (22) other non-toxic compatible substances employed in pharmaceutical formulations.

The disclosed pharmaceutical compositions may be formulated as a pharmaceutically acceptable salt of a disclosed compound. Pharmaceutically acceptable salts are non-toxic salts of a free base form of a compound that possesses the desired pharmacological activity of the free base. These salts may be derived from inorganic or organic acids. Non-limiting examples of suitable inorganic acids are hydrochloric acid, nitric acid, hydrobromic acid, sulfuric acid, hydroiodic acid, and phosphoric acid. Non-limiting examples of suitable organic acids are acetic acid, propionic acid, glycolic acid, lactic acid, pyruvic acid, malonic acid, succinic acid, malic acid, maleic acid, fumaric acid, tartaric acid, citric acid, benzoic acid, cinnamic acid, mandelic acid, methanesulfonic acid, ethanesulfonic acid, p-toluenesulfonic acid, methyl sulfonic acid, salicylic acid, formic acid, trichloroacetic acid, trifluoroacetic acid, gluconic acid, asparagic acid, aspartic acid, benzenesulfonic acid, p-toluenesulfonic acid, naphthalenesulfonic acid, and the like. Lists of other suitable pharmaceutically acceptable salts are found in Remington's Pharmaceutical Sciences, 17th Edition, Mack Publishing Company, Easton, Pa., 1985. A pharmaceutically acceptable salt may also serve to adjust the osmotic pressure of the composition.

A subject compound can be used alone or in combination with appropriate additives to make tablets, powders, granules or capsules, for example, with conventional additives, such as lactose, mannitol, corn starch or potato starch; with binders, such as crystalline cellulose, cellulose derivatives, acacia, corn starch or gelatins; with disintegrators, such as corn starch, potato starch or sodium carboxymethylcellulose; with lubricants, such as talc or magnesium stearate; and if desired, with diluents, buffering agents, moistening agents, preservatives and flavoring agents. Such preparations can be used for oral administration.

A subject compound can be formulated into preparations for injection by dissolving, suspending or emulsifying them in an aqueous or nonaqueous solvent, such as vegetable or other similar oils, synthetic aliphatic acid glycerides, esters of higher aliphatic acids or propylene glycol; and if desired, with conventional additives such as solubilizers, isotonic agents, suspending agents, emulsifying agents, stabilizers and preservatives. The preparation may also be emulsified, or the active ingredient encapsulated in liposome vehicles. Formulations suitable for injection can be administered by an intravitreal, intraocular, intramuscular, subcutaneous, sublingual, or other route of administration, e.g., injection into the gum tissue or other oral tissue. Such formulations are also suitable for topical administration including hydrogels, PEGs, cyclodextrins, oils and water.

In some embodiments, a subject compound can be delivered by a continuous delivery system. The term "continuous delivery system" is used interchangeably herein with "controlled delivery system" and encompasses continuous (e.g., controlled) delivery devices (e.g., pumps) in combination with catheters, injection devices, and the like, a wide variety of which are known in the art.

A subject compound can be utilized in aerosol formulation to be administered via inhalation. A subject compound can be formulated into pressurized acceptable propellants such as dichlorodifluoromethane, propane, nitrogen and the like.

Furthermore, a subject compound can be made into suppositories by mixing with a variety of bases such as emulsifying bases or water-soluble bases. A subject compound can be administered rectally via a suppository. The suppository can include vehicles such as cocoa butter, carbowaxes and polyethylene glycols, which melt at body temperature, yet are solidified at room temperature.

The term "unit dosage form," as used herein, refers to physically discrete units suitable as unitary dosages for human and animal subjects, each unit containing a predetermined quantity of a subject compound calculated in an amount sufficient to produce the desired effect in association with a pharmaceutically acceptable diluent, carrier or vehicle. The specifications for a subject compound depend on the particular compound employed and the effect to be achieved, and the pharmacodynamics associated with each compound in the host.

The dosage form of a disclosed pharmaceutical composition will be determined by the mode of administration chosen. For example, in addition to injectable fluids, topical or oral dosage forms may be employed. Topical preparations may include eye drops, ointments, sprays and the like. In some instances, a topical preparation of a medicament useful in the methods described herein may include, e.g., an ointment preparation that includes one or more excipients including, e.g., mineral oil, paraffin, propylene carbonate, white petrolatum, white wax and the like, in addition to one or more additional active agents.

Oral formulations may be liquid (e.g., syrups, solutions or suspensions), or solid (e.g., powders, pills, tablets, or capsules). Methods of preparing such dosage forms are known, or will be apparent, to those skilled in the art.

Certain embodiments of the pharmaceutical compositions comprising a subject compound may be formulated in unit dosage form suitable for individual administration of precise dosages. The amount of active ingredient administered will depend on the subject being treated, the severity of the affliction, and the manner of administration, and is known to those skilled in the art. Within these bounds, the formulation to be administered will contain a quantity of the extracts or compounds disclosed herein in an amount effective to achieve the desired effect in the subject being treated.

Each therapeutic compound can independently be in any dosage form, such as those described herein, and can also be administered in various ways, as described herein. For example, the compounds may be formulated together, in a single dosage unit (that is, combined together in one form such as capsule, tablet, powder, or liquid, etc.) as a combination product. Alternatively, when not formulated together in a single dosage unit, an individual subject compound may be administered at the same time as another therapeutic compound or sequentially, in any order thereof.

Exemplary treatment regimens include, but are not limited to, administration via injection to achieve a dose of from about 0.1 µg/kg to about 100 mg/kg or from about 1 Qg/kg to about 10 mg/kg of the compound of the present disclosure. Other exemplary treatment regimens include, but are not limited to, administration via injection to achieve a dose of from about 1 µg/day to about 100 mg/day or from about 500 µg/day to about 2000 mg/day of the compound of the present disclosure in a single or divided dose. Still other exemplary treatment regimens include, but are not limited to, dermal or topical/spray application, pulmonary administration; nasal administration; and buccal administration. An initial target plasma concentration may range from about 1 pM to about 1000 pM. Guidance as to particular dosages and methods of delivery is generally available to practitioners in the art and is provided herein.

Methods of Use

The GPAT inhibitors described herein find use in the treatment of cancer. Methods of treating a subject may include administering to the subject an effective amount of the GPAT inhibitor compound. In some embodiments the cancer is a MYC-driven cancer. In some embodiments a subject is pre-screened to determine if the cancer is lipogenesis-dependent, for example by comparing a lipogenesis profile obtained from a subject having a neoplasm with a reference lipogenesis profile to classify whether the neoplasm is lipogenesis-dependent.

The provided methods may find use with subjects having a variety of different neoplasms. Relevant cancers include tumors (e.g., solid tumors (e.g., sarcomas and carcinomas) and blood cancers. Non-limited examples of various cancers to which the subject methods may be applied include: Acute Lymphoblastic Leukemia (ALL), Acute Myeloid Leukemia (AML), Adrenocortical Carcinoma, AIDS-Related Cancers (e.g., Kaposi Sarcoma, Lymphoma, etc.), Anal Cancer, Appendix Cancer, Astrocytomas, Atypical Teratoid/Rhabdoid Tumor, Basal Cell Carcinoma, Bile Duct Cancer (Extrahepatic), Bladder Cancer, Bone Cancer (e.g., Ewing Sarcoma, Osteosarcoma and Malignant Fibrous Histiocytoma, etc.), Brain Stem Glioma, Brain Tumors (e.g., Astrocytomas, Central Nervous System Embryonal Tumors, Central Nervous System Germ Cell Tumors, Craniopharyngioma, Ependymoma, etc.), Breast Cancer (e.g., female breast cancer, male breast cancer, childhood breast cancer, etc.), Bronchial Tumors, Burkitt Lymphoma, Carcinoid Tumor (e.g., Childhood, Gastrointestinal, etc.), Carcinoma of Unknown Primary, Cardiac (Heart) Tumors, Central Nervous System (e.g., Atypical Teratoid/Rhabdoid Tumor, Embryonal Tumors, Germ Cell Tumor, Lymphoma, etc.), Cervical Cancer, Childhood Cancers, Chordoma, Chronic Lymphocytic Leukemia (CLL), Chronic Myelogenous Leukemia (CML), Chronic Myeloproliferative Neoplasms, Colon Cancer, Colorectal Cancer, Craniopharyngioma, Cutaneous T-Cell Lymphoma, Duct (e.g., Bile Duct, Extrahepatic, etc.), Ductal Carcinoma In Situ (DCIS), Embryonal Tumors, Endometrial Cancer, Ependymoma, Esophageal Cancer, Esthesioneuroblastoma, Ewing Sarcoma, Extracranial Germ Cell Tumor, Extragonadal Germ Cell Tumor, Extrahepatic Bile Duct Cancer, Eye Cancer (e.g., Intraocular Melanoma, Retinoblastoma, etc.), Fibrous Histiocytoma of Bone (e.g., Malignant, Osteosarcoma, etc.), Gallbladder Cancer, Gastric (Stomach) Cancer, Gastrointestinal Carcinoid Tumor, Gastrointestinal Stromal Tumors (GIST), Germ Cell Tumor (e.g., Extracranial, Extragonadal, Ovarian, Testicular, etc.), Gestational Trophoblastic Disease, Glioma, Hairy Cell Leukemia, Head and Neck Cancer, Heart Cancer, Hepatocellular (Liver) Cancer, Histiocytosis (e.g., Langerhans Cell, etc.), Hodgkin Lymphoma, Hypopharyngeal Cancer, Intraocular Melanoma, Islet Cell Tumors (e.g., Pancreatic Neuroendocrine Tumors, etc.), Kaposi Sarcoma, Kidney Cancer (e.g., Renal Cell, Wilms Tumor, Childhood Kidney Tumors, etc.), Langerhans Cell Histiocytosis, Laryngeal Cancer, Leukemia (e.g., Acute Lymphoblastic (ALL), Acute Myeloid (AML), Chronic Lymphocytic (CLL), Chronic Myelogenous (CML), Hairy Cell, etc.), Lip and Oral Cavity Cancer, Liver Cancer (Primary), Lobular Carcinoma In Situ (LCIS), Lung Cancer (e.g., Non-Small Cell, Small Cell, etc.), Lymphoma (e.g., AIDS-Related, Burkitt, Cutaneous T-Cell, Hodgkin, Non-Hodgkin, Primary Central Nervous System (CNS), etc.), Macroglobulinemia (e.g., Waldenström, etc.), Male Breast Cancer, Malignant Fibrous Histiocytoma of Bone and Osteosarcoma, Melanoma, Merkel Cell Carcinoma, Mesothelioma, Metastatic Squamous Neck Cancer with Occult Primary, Midline Tract Carcinoma Involving NUT Gene, Mouth Cancer, Multiple Endocrine Neoplasia Syndromes, Multiple Myeloma/Plasma Cell Neoplasm, Mycosis Fungoides, Myelodysplastic Syndromes, Myelodysplastic/Myeloproliferative Neoplasms, Myelogenous Leukemia (e.g., Chronic (CML), etc.), Myeloid Leukemia (e.g., Acute (AML), etc.), Myeloproliferative Neoplasms (e.g., Chronic, etc.), Nasal Cavity and Paranasal Sinus Cancer, Nasopharyngeal Cancer, Neuroblastoma, Non-Hodgkin Lymphoma, Non-Small Cell Lung Cancer, Oral Cancer, Oral Cavity Cancer (e.g., Lip, etc.), Oropharyngeal Cancer, Osteosarcoma and Malignant Fibrous Histiocytoma of Bone, Ovarian Cancer (e.g., Epithelial, Germ Cell Tumor, Low Malignant Potential Tumor, etc.), Pancreatic Cancer, Pancreatic Neuroendocrine Tumors (Islet Cell Tumors), Papillomatosis, Paraganglioma, Paranasal Sinus and Nasal Cavity Cancer, Parathyroid Cancer, Penile Cancer, Pharyngeal Cancer, Pheochromocytoma, Pituitary Tumor, Pleuropulmonary Blastoma, Primary Central Nervous System (CNS) Lymphoma, Prostate Cancer, Rectal Cancer, Renal Cell (Kidney) Cancer, Renal Pelvis and Ureter, Transitional Cell Cancer, Retinoblastoma, Rhabdomyosarcoma, Salivary Gland Cancer, Sarcoma (e.g., Ewing, Kaposi, Osteosarcoma, Rhabdomyosarcoma, Soft Tissue, Uterine, etc.), Sézary Syndrome, Skin Cancer (e.g., Childhood, Melanoma, Merkel Cell Carcinoma, Nonmelanoma, etc.), Small Cell Lung Cancer, Small Intestine Cancer, Soft Tissue Sarcoma, Squamous Cell Carcinoma, Squamous Neck Cancer (e.g., with Occult Primary, Metastatic, etc.), Stomach (Gastric) Cancer, T-Cell Lymphoma, Testicular Cancer, Throat Cancer, Thymoma and Thymic Carcinoma, Thyroid Cancer, Transitional Cell Cancer of the Renal Pelvis and Ureter, Ureter and Renal Pelvis Cancer, Urethral Cancer, Uterine Cancer (e.g., Endometrial, etc.), Uterine Sarcoma, Vaginal Cancer, Vulvar Cancer, Waldenström Macroglobulinemia, Wilms Tumor, and the like.

In some instances, a subject to which the provided methods may be applied may be a subject having a hematological (i.e., blood) cancer, e.g., a leukemia or a lymphoma. Non-limiting examples of hematological cancers include: Acute Lymphoblastic Leukemia, Adult; Acute Lymphoblastic Leukemia, Childhood; Acute Myeloid Leukemia, Adult; Acute Myeloid Leukemia, Childhood; Chronic Lymphocytic Leukemia; Chronic Myelogenous Leukemia; Hairy Cell Leukemia; AIDS-Related Lymphoma; Cutaneous T-Cell Lymphoma (see Mycosis Fungoides and the Sézary Syndrome); Hodgkin Lymphoma, Adult; Hodgkin Lymphoma, Childhood; Hodgkin Lymphoma During Pregnancy; Mycosis Fungoides; Non-Hodgkin Lymphoma, Adult; Non-Hodgkin Lymphoma, Childhood; Non-Hodgkin Lymphoma During Pregnancy; Primary Central Nervous System Lymphoma; Sszary Syndrome; T-Cell Lymphoma, Cutaneous (see Mycosis Fungoides and the Sézary Syndrome); Waldenström Macroglobulinemia (see Non-Hodgkin Lymphoma) Chronic Myeloproliferative Neoplasms; Langerhans Cell Histiocytosis; Multiple Myeloma/Plasma Cell Neoplasm; Myelodysplastic Syndromes; Myelodysplastic/Myeloproliferative Neoplasms; and the like.

In some instances, a subject to which the provided methods may be applied may be a subject having a carcinoma (e.g., an adenocarcinoma or a squamous cell carcinoma). Non-limiting examples of carcinomas include: acinar carcinoma, acinic cell carcinoma, acinous carcinoma, adenocystic carcinoma, adenoid cystic carcinoma, adenosquamous carcinoma, adnexal carcinoma, adrenocortical carcinoma, alveolar carcinoma, ameloblastic carcinoma, apocrine carcinoma, basal cell carcinoma, bronchioloalveolar carcinoma, bronchogenic carcinoma, cholangiocellular carcinoma, chorionic carcinoma, clear cell carcinoma, colloid carcinoma, colorectal carcinoma, cribriform carcinoma, ductal carcinoma in situ, embryonal carcinoma, carcinoma en cuirasse, endometrioid carcinoma, epidermoid carcinoma, carcinoma ex mixed tumor, carcinoma ex pleomorphic adenoma, follicular carcinoma of thyroid gland, hepatocellular carcinoma, carcinoma in situ, intraductal carcinoma, Hurthle cell carcinoma, inflammatory carcinoma of the breast, large cell carcinoma, invasive lobular carcinoma, lobular carcinoma, lobular carcinoma in situ (LCIS), medullary carcinoma, meningeal carcinoma, Merkel cell carcinoma, mucinous carcinoma, mucoepidermoid carcinoma, nasopharyngeal carcinoma, non-small cell carcinoma, non-small cell lung carcinoma (NSCLC), oat cell carcinoma, papillary carcinoma, renal cell carcinoma, scirrhous carcinoma, sebaceous carcinoma, carcinoma simplex, signet-ring cell carcinoma, small cell carcinoma, small cell lung carcinoma, spindle cell carcinoma, squamous cell carcinoma, terminal duct carcinoma, transitional cell carcinoma, tubular carcinoma, verrucous carcinoma, and the like.

Methods of the present disclosure may find use in analyzing and/or treating various cancers including but not limited to e.g., liver cancers, kidney cancers, blood cancer (e.g., lymphoma), lung cancers, etc. In some instances, the subject methods find use in analyzing and/or treating MYC-induced renal cell carcinoma (RCC). In some instances, the subject methods find use in analyzing and/or treating MYC-induced T-cell lymphoma (T-ALL). In some instances, the subject methods find use in analyzing and/or treating MYC-induced lung cell carcinoma. In some instances, the subject methods find use in analyzing and/or treating MYC-induced hepatocellular carcinoma (HCC). In some instances, the subject cancers may be MYC driven cancers. In some instances, the cancers may be cancers in which MYC induces fatty acid synthesis and/or the expression of fatty acid synthesis genes.

In other embodiments, methods are provided for treatment of conditions relating to obesity and metabolic syndrome, including without limitation Type II diabetes mellitus, metabolic syndrome, hyperlipidemia and fatty liver disease. An effective dose of a GPAT inhibitor is administered to achieve a reduction in the symptoms of the disease.

Type II diabetes mellitus is characterized by insulin resistance and hyperglycemia, which in turn can cause retinopathy, nephropathy, neuropathy, or other morbidities. Additionally, diabetes is a well-known risk factor for atherosclerotic cardiovascular disease. Metabolic syndrome refers to a group of factors, including hypertension, obesity, hyperlipidemia, and insulin resistance (manifesting as frank diabetes or high fasting blood glucose or impaired glucose tolerance), that raises the risk of developing heart disease, diabetes, or other health problems; (Grundy et al, Circulation. 2004; 109:433-438). There is a well-characterized progression from normal metabolic status to a state of impaired fasting glucose (IFG: fasting glucose levels greater than 100 mg/dL) or to a state of impaired glucose tolerance (IGT: two-hour glucose levels of 140 to 199 mg/dL after a 75 gram oral glucose challenge). Both IFG and IGT are considered pre-diabetic states, with over 50% of subjects with IFG progressing to frank type II diabetes within, on average, three years (Nichols, Diabetes Care 2007. (2): 228-233). The insulin resistance is caused, at least in part, by chronic low-grade inflammation (Romeo G R et al, Arterioscler Thromb Vasc Biol. 2012 32(8):1771-6; de Luca C et al, FEBS Lett. 2008 582(1):97-105; Ma K et al, Diabetes Metab Res Rev. 2012 28(5):388-94). Macrophages accumulate in obese adipose tissue, where they produce TNF and other inflammatory cytokines in response to stimulation with saturated fatty acids and circulating lipopolysaccharide (LPS) (Johnson et al, Cell 2013. 152(4):673-84; Bhargava P et al, Biochem J. 2012 442(2):253-62). Moreover, TNF inhibition can abrogate insulin resistance (Johnson et al, Cell 2013. 152(4):673-84).

Hyperlipidemia may also be treated. Hyperlipidemia involves abnormally elevated levels of any or all lipids and/or lipoproteins in the blood. The term lipids includes: cholesterol and triglycerides. There are many different types of lipid (also called lipoproteins). Blood tests can measure the levels of lipoproteins. The standard lipid blood tests include a measurement of total cholesterol, LDL (low density lipoproteins) and HDL (high density lipoproteins), and triglycerides.

Non-alcoholic fatty liver disease (NAFLD) and non-alcoholic steatohepatitis (NASH) are conditions associated with fatty infiltration of the liver. NAFLD is one cause of a fatty liver, occurring when fat is deposited (steatosis) in the liver not due to excessive alcohol use (Clark J M et al, J. American Medical Association 289 (22): 3000--4, 2003). It can be related to insulin resistance and the metabolic syndrome and may respond to treatments originally developed for other insulin-resistant states (e.g. diabetes mellitus type 2) such as weight loss, metformin and thiazolidinediones.

NAFLD is considered to cover a spectrum of disease activity. This spectrum begins as fatty accumulation in the liver (hepatic steatosis). A liver can remain fatty without disturbing liver function, but by varying mechanisms and possible insults to the liver may also progress to become NASH, a state in which steatosis is combined with inflammation and fibrosis. NASH is a progressive disease: over a 10-year period, up to 20% of patients with NASH will develop cirrhosis of the liver, and 10% will suffer death related to liver disease. NASH is the most extreme form of NAFLD, and is regarded as a major cause of cirrhosis of the liver of unknown cause (McCulough A J et al, Clinics in Liver Disease 8 (3): 521-33, 2004).

Common findings in NAFLD and NASH are elevated liver enzymes and a liver ultrasound showing steatosis. An ultrasound may also be used to exclude gallstone problems (cholelithiasis). A liver biopsy (tissue examination) is the only test widely accepted as definitively distinguishing NASH from other forms of liver disease and can be used to assess the severity of the inflammation and resultant fibrosis (Adams L A et al, Postgrad Med J 82(967):315-22, 2006). Non-invasive diagnostic tests have been developed, such as FibroTest, that estimates liver fibrosis, and SteatoTest, that estimates steatosis, however their use has not been widely adopted (McCulough A J et al, Clinics in Liver Disease 8 (3): 521-33, 2004).

In other embodiments, methods are provided for treatment of conditions relating to infectious diseases in plants and animals including humans. Infectious diseases are diseases that occur when foreign bodies such as bacteria, protozoan, helminth, fungi, and viruses appear to live in in blood, body fluids, and tissues. Infectious diseases include infections caused by protozoan parasites, helminths, fungi, mites, bacteria and viruses infesting plants, fish, reptiles, birds, and mammals, including humans. The method of the invention may be utilized to stimulate an immune response to infectious diseases, including parasitic, helminthic, fungal, yeast, bacterial, mycoplasmal and viral diseases, where a particular class of cells and/or tissues can be identified as harboring the infective entity. For example, but not by way of limitation, the cells treated may be infected with a human papilloma virus, a herpes virus such as herpes simplex or herpes zoster, a retrovirus such as human immunodeficiency virus 1 or 2, a hepatitis virus, an influenza virus, a rhinovirus, respiratory syncytial virus, cytomegalovirus, adenovirus, *Mycoplasma pneumoniae*, a bacterium of the genus *Salmonella, Staphylococcus, Streptococcus, Enterococcus, Clostridium, Escherichia, Klebsiella, Vibrio, Mycobacterium*, amoeba, a malarial parasite, *Trypanosoma cruzi*, etc.

In other embodiments, methods are provided for treatment of conditions relating to inflammatory and immune diseases in mammals including humans. Inflammatory/immune diseases include but are not limited to autoimmune diseases such as rheumatoid arthritis, MS, psoriasis, lupus, systemic sclerosis, inflammatory bowel disease/Crohn's disease, T-1 diabetes, Grave's disease, myasthenia gravis, vasculitis, contact dermatitis, osteoarthritis, gout, asthma, periodontitis sinusitis, gingivitis, HGD (transplant rejection), and GHD.

Screening Methods

In some embodiments, the methods of the present disclosure include treating a subject for a neoplasm by administering the subject an effective amount of one or more inhibitors of GPAT. The neoplasm may be screened prior to treatment to determine if the cancer is lipogenesis-dependent. In some aspects, methods of the present include the use of a lipogenesis profile. By "lipogenesis profile" is meant a representation of the lipids or a subset thereof present in a cellular sample (e.g., a cell, a population of cells, a tissue, an organ, etc.) which may or may include quantification of the absolute or relative amounts of the subject lipids or subset thereof. In some instances, a lipid profile or alipogenesis profile may be obtained for glycerophospholipids or a subset thereof. Lipogenesis profiles may be compared. In some instances, a lipogenesis profile may be compared to a control (e.g., a normal tissue, a MYC "ON" control, a MYC "OFF" control, or the like). In some instances, a lipogenesis profile may be compared to a reference lipogenesis profile, e.g., a reference lipogenesis profile obtained from a control (e.g., a normal tissue reference lipogenesis profile, a MYC "ON" control reference lipogenesis profile, a MYC "OFF" control reference lipogenesis profile, or the like). In some instances, a lipogenesis profile may be employed to assign a particular lipogenesis state to a cellular sample (e.g., a cellular sample of a neoplasm, such as an RCC). Assigning a particular lipogenesis state to a cellular sample may include classifying the cellular sample as lipogenesis-dependent, e.g., when the lipogenesis profile obtained includes increased glycerophosphoglycerols as compared to a reference lipogenesis profile or decreased glycerophosphoinositols compared to the reference lipogenesis profile.

Any convenient method may be employed for obtaining a lipogenesis profile of the present methods. In some aspects, the methods of the present disclosure may include lipogenesis profiles obtained using mass spectrometry (MS) and as such may be mass spectrometry (MS) lipogenesis profiles. Any convenient and appropriate MS technology may be employed, including but not limited to e.g., desorption electrospray ionization mass spectrometry imaging (DESI-MSI).

In some instances, methods of treating a subject may include administering to the subject an effective amount of a GPAT inhibitor, when the neoplasm of the subject is classified as lipogenesis-dependent, to treat the subject for the lipogenesis-dependent neoplasm.

In some instances, a subject method of screening may include assessing the effectiveness of the candidate agent, including e.g., measuring one or more aspect of a neoplasm contacted with the agent. For example, in some instances, the screening method may include identifying the candidate agent as a MYC-driven neoplasm therapeutic agent when the MYC-driven neoplasm regresses following contacting with the agent. In some instances, a measured decrease in lipogenesis may be observed, including e.g., a decrease in glycerophosphoglycerols. In some instances, a measured increase in lipogenesis may be observed, including e.g., an increase in in glycerophosphoinositols. Such increases and decreases may be compared to one or more controls.

Kits

Also provided are kits for use in the subject methods. The subject kits may include any combination of components (e.g., therapeutic compounds, etc.) for performing the subject methods, such as e.g., methods of treating a subject for a neoplasm and/or methods of identifying a MYC-driven neoplasm. The subject kits may include a combination of agents for use in treating a subject, i.e., a "treatment kit". The subject kits may include cell lines (e.g., cell lines for use in screening) which may include neoplastic cell lines (e.g., tumor cell lines, cancer cell lines, etc.).

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit or cell line(s), in a package insert, and the like. Yet another form of these instructions is a computer readable medium, e.g., diskette, compact disk (CD), flash drive, and the like, on which the information has been recorded. Yet another form of these instructions that may be present is a website address which may be used via the internet to access the information at a removed site.

Additional Embodiments

Additional embodiments are set forth in the following clauses.

Clause 1. A GPAT inhibitor of the formula (I):

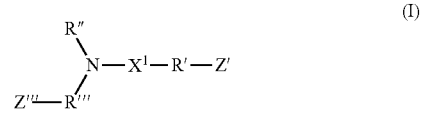

wherein:
R' and R''' are each independently selected from alkyl, substituted alkyl, alkyl alkenyl, alkyl alkynyl, cycloalkyl, cycloalkyl(alkyl), heterocycloalkyl, heterocycloalkyl(alkyl), substituted heterocycloalkyl, aryl, substituted aryl, aryl(alkyl), substituted aryl(alkyl), heteroaryl, substituted heteroaryl, and halo(alkyl);

Z' and Z''' are optional substituents selected from alkynyl, hydroxy, alkyl(hydroxy), ester, ether, nitrile/cyano, trifluoromethyl, trifluoromethyl ether, trifluoromethyl thioether, trifluoromethyl sulfoxide, trifluoromethyl sulfone, halide, polyalcohol, a straight chain or cyclic saccharide, amine, polyamine, ammonium, amide, azido, nitro, isonitrile, sulfate/sulfonic acid, sulfonate, sulfinate, sulfoxide, sulfone, carboxylate, carboxyl ester, ketone, aldehyde, carboxyl amide, lactone, amidine, sulfonamide, phosphate, phosphonate, phosphinate, boronic acid, boronate ester, amide, thiolate/thiol, thioester, and a carboxy isostere, wherein Z' or Z''' optionally forms a bond to a second compound of formula (I);

R'' is selected from hydrogen, alkyl, substituted alkyl, $OR^{1a}$, $NR^{1a_2}$ and $SR^{1a}$;

$R^{1a}$ is selected H, $COR^{2a}$, $SO_2R^{2a}$, $NHR^{2a}$, and $NHCOR^{2a}$, wherein each $R^{2a}$ are independently selected from alkyl, substituted alkyl, alkyl alkenyl, alkyl alkynyl, cycloalkyl, cycloalkyl(alkyl), heterocycloalkyl, heterocycloalkyl(alkyl), substituted heterocycloalkyl, aryl, substituted aryl, aryl(alkyl), substituted aryl(alkyl), heteroaryl, substituted heteroaryl, and halo(alkyl);

or R'' and Z' or Z''' together with the atoms to which they are attached form a cyclic group selected from heterocycloalkyl, or substituted heterocycloalkyl; and $X^1$ is selected from sulfonyl, sulfinyl, sulfonimidoyl, phosphonyl, phosphinate, thiophosphonyl, thiophosphinate, and phosphonamidate, or a pharmaceutically acceptable salt or solvate thereof.

Clause 2. The GPAT inhibitor of clause 1, wherein at least one of R' and R''' is selected from substituted aryl, and substituted heteroaryl.

Clause 3. The GPAT inhibitor of clause 1 or 2, wherein the compound includes at least one of R'-Z' or R'''—Z'''.

Clause 4. The GPAT inhibitor of clause 3, wherein Z' or Z''' is a water soluble group.

Clause 5. The GPAT inhibitor of clause 1, described by formula (IIA) or (IIB):

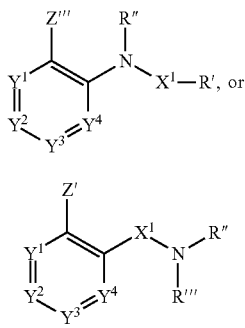

(IIA)

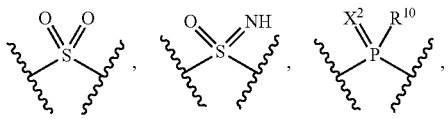

(IIB)

wherein:

X¹ is selected from

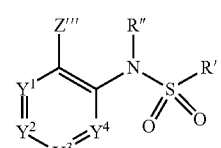

wherein X² is O or S, R¹⁰ is selected from SR$^{10a}$, OR$^{10a}$, and N(R$^{10a}$)$_2$;

each R$^{10a}$ is independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), Na⁺, K⁺, and NH$_4^+$;

Z' and Z''' are each independently selected from hydrogen, —CO$_2$R$^a$, —(CH$_2$)$_n$OR$^a$, —(CH$_2$)$_m$OC(O)R, —CO$_2$R$^a$CO$_2$R$^a$—, a carboxy isostere, nitrile, halogen, trifluoromethyl, —P(O)(OR$^a$)$_2$, SO$_2$OR$^a$, B(OR$^a$)$_2$, SO$_2$CF$_3$, SOCF$_3$, S(O)OR$^a$, and SF$_5$, wherein R$^a$ are each independently selected from hydrogen, alkyl, substituted alkyl, aryl, substituted aryl, cycloalkyl, substituted cycloalkyl, heterocycle, substituted heterocycle, heteroaryl, and substituted heteroaryl;

R' and R''' are each independently selected from alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl);

R'' is selected from hydrogen, alkyl, substituted alkyl, OR$^{1a}$, NR$^{1a2}$ and SR$^{1a}$; R$^{1a}$ is selected H, COR$^{2a}$, NHR$^{2a}$, and NHCOR$^{2a}$, wherein each R$^{2a}$ are independently selected from alkyl, substituted alkyl, alkyl alkenyl, alkyl alkynyl, cycloalkyl, cycloalkyl(alkyl), heterocycloalkyl, heterocycloalkyl(alkyl), substituted heterocycloalkyl, aryl, substituted aryl, aryl(alkyl), substituted aryl(alkyl), heteroaryl, substituted heteroaryl, and halo(alkyl);

Y¹ is selected from CR¹ and N;
Y² is selected from CR² and N;
Y³ is selected from CR³ and N;
Y⁴ is selected from CR⁴ and N; and
R¹-R⁴ are independently selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), SF$_5$, NR$^5_3$*, azido, cyano, —OR⁵, —SR⁵, —NR⁵R⁶, halogen, nitro, SCH$_3$, OCF$_3$, SO$_2$CH$_3$, SCF$_3$, SO$_2$CF$_3$, CF$_3$, —SO$_2$OR⁵, —OSO$_2$R⁵, CCl$_3$, —C(=O)R⁵, SF$_5$, NR$^5_{3'}$, azido, cyano, —OR⁵, —SR⁵, —NR⁵R⁶, halogen, nitro, SCH$_3$, OCF$_3$, SO$_2$CH$_3$, SCF$_3$, SO$_2$CF$_3$, CF$_3$, —SO$_2$OR⁵, —OSO$_2$R⁵, CCl$_3$, —C(=O)R⁵, —C(=O)OR⁵; —C(=O)NR⁵R⁶, —O C(=O)R⁵, —CHO, —C=NR⁵; where R⁵ and R⁶ are independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl.

Clause 6. The GPAT inhibitor of clause 5, described by the formula (IIAa):

(IIAa)

wherein:

Z''' is selected from hydrogen, —CO$_2$R$^a$, —(CH$_2$)$_n$OR$^a$, —(CH$_2$)$_m$OC(O)R, a carboxy isostere, nitrile, halogen, trifluoromethyl, —P(O)(OR$^a$)$_2$, SO$_2$OR$^a$, B(OR$^a$)$_2$, SO$_2$CF$_3$, SOCF$_3$, S(O)OR$^a$, or SF$_5$ wherein R$^a$ are each independently selected from hydrogen, alkyl, substituted alkyl, aryl, substituted aryl, cycloalkyl, substituted cycloalkyl, heterocycle, substituted heterocycle, heteroaryl, and substituted heteroaryl;

R' is selected from alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl), wherein alkyl moieties are optionally substituted with a group selected from, alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), SF$_5$, NR$^5_3^+$, azido, cyano, —OR⁵, —SR⁵, —NR⁵R⁶, halogen, nitro, SCH$_3$, OCF$_3$, SO$_2$CH$_3$, SCF$_3$, SO$_2$CF$_3$, CF$_3$, —SO$_2$OR⁵, —OSO$_2$R⁵, CCl$_3$, —C(=O)R⁵, —C(=O) OR⁵, —C(=O)NR⁵R⁶, —OC(=O)R⁵, —CHO, and —C=NR⁵;

R'' is selected from hydrogen, alkyl, substituted alkyl, OR$^{1a}$, NR$^{1a2}$ and SR$^{1a}$;

R$^{1a}$ is selected H, COR$^{2a}$, NHR$^{2a}$, and NHCOR$^{2a}$, wherein each R$^{2a}$ are independently selected from alkyl, substituted alkyl, alkyl alkenyl, alkyl alkynyl, cycloalkyl, cycloalkyl(alkyl), heterocycloalkyl, heterocycloalkyl(alkyl), substituted heterocycloalkyl, aryl, substituted aryl, aryl(alkyl), substituted aryl(alkyl), heteroaryl, substituted heteroaryl, and halo(alkyl);

Y¹ is selected from CR¹ and N;
Y² is selected from CR² and N;
Y³ is selected from CR³ and N;
Y⁴ is selected from CR⁴ and N; and
R¹-R⁴ are independently selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), SF$_5$, NR$^5_3$*, azido, cyano, —OR⁵, —SR⁵, —NR⁵R⁶, halogen, nitro, SCH$_3$, OCF$_3$, SO$_2$CH$_3$, SCF$_3$, SO$_2$CF$_3$, CF$_3$, —SO$_2$OR⁵, —OSO$_2$R⁵, CCl$_3$, —C(=O)R⁵, —C(=O)OR⁵; —C(=O)NR⁵R⁶, —O C(=O)R⁵, —CHO,-C=NR⁵; where R⁵ and R⁶ are independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl).

Clause 7. The GPAT inhibitor of any one of the preceding clauses wherein, X' is —SO₂—, and Z'" is —CO₂Rᵃ, and at least one of Y¹-Y⁴ is N.

Clause 8. The GPAT inhibitor of clause 5, described by the formula (IIAb):

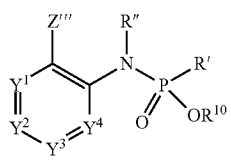

(IIAb)

wherein:
Z'" is selected from hydrogen, —CO₂Rᵃ, —(CH₂), ORᵃ, —(CH2)ₘOC(O)R, a carboxy isostere, nitrile, halogen, trifluoromethyl, —P(O)(ORᵃ)₂, SO₂ORᵃ, B(ORᵃ)₂, SO₂CF₃, SOCF₃, S(O)ORᵃ, or SF₅ wherein Rᵃ are each independently selected from hydrogen, alkyl, substituted alkyl, aryl, substituted aryl, cycloalkyl, substituted cycloalkyl, heterocycle, substituted heterocycle, heteroaryl, and substituted heteroaryl;

R¹⁰ is selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), Na⁺, K⁺ and NH₄⁺;

R' is selected from alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), wherein alkyl moieties are optionally substituted with a group selected from, alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), SF₅, NR⁵3⁺, azido, cyano, —OR⁵, —SR⁵, —NR⁵R⁶, halogen, nitro, SCH₃, OCF₃, SO₂CH₃, SCF₃, SO₂CF₃, CF₃, —SO₂OR⁵, —OSO₂R⁵, CCl₃, —C(=O)R⁵, —C(=O)OR⁵; —C(=O)NR⁵R⁶, —OC(=O)R⁵,-CHO, and —C=NR⁵;

R" is selected from hydrogen, alkyl, substituted alkyl, OR¹ᵃ, NR¹ᵃ² and SR¹ᵃ;

R¹ᵃ is selected H, COR²ᵃ, NHR²ᵃ, and NHCOR²ᵃ, wherein each R²ᵃ are independently selected from alkyl, substituted alkyl, alkyl alkenyl, alkyl alkynyl, cycloalkyl, cycloalkyl(alkyl), heterocycloalkyl, heterocycloalkyl(alkyl), substituted heterocycloalkyl, aryl, substituted aryl, aryl(alkyl), substituted aryl(alkyl), heteroaryl, substituted heteroaryl, and halo(alkyl);

Y¹ is selected from CR¹ and N;
Y² is selected from CR² and N;
Y³ is selected from CR³ and N;
Y⁴ is selected from CR⁴ and N; and
R¹-R⁴ are independently selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), SF₅, NR⁵3⁺, azido, cyano, —OR⁵, —SR⁵, —NR⁵R⁶, halogen, nitro, SCH₃, OCF₃, SO₂CH₃, SCF₃, SO₂CF₃, CF₃, —SO₂OR⁵, —OSO₂R⁵, CCl₃, —C(=O)R⁵, —C(=O)OR⁵; —C(=O)NR⁵R⁶, —O C(=O)R⁵, —CHO, —C=NR⁵; where R⁵ and R⁶ are independently selected from hydrogen, alkyl, substituted alkyl, alkyl alkenyl, alkyl alkynyl, cycloalkyl, cycloalkyl (alkyl), heterocycloalkyl, heterocycloalkyl(alkyl), aryl, substituted aryl, aryl(alkyl), substituted aryl(alkyl), heteroaryl, substituted heteroaryl, and halo(alkyl).

Clause 9. The GPAT inhibitor of clause 5, described by the formula (IIBa):

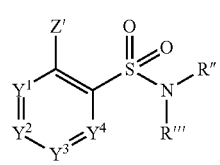

(IIBb)

wherein:
Z' is selected from hydrogen, —CO₂Rᵃ, —(CH₂)ₙORᵃ, —(CH₂)ₘOC(O)R, a carboxy isostere, nitrile, halogen, trifluoromethyl, —P(O)(ORᵃ)₂, SO₂ORᵃ, B(ORᵃ)₂, SO₂CF₃, SOCF₃, S(O)ORᵃ, or SF₅ wherein Rᵃ are each independently selected from hydrogen, alkyl, substituted alkyl, aryl, substituted aryl, cycloalkyl, substituted cycloalkyl, heterocycle, substituted heterocycle, heteroaryl, and substituted heteroaryl;

R'" is selected from alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl), wherein alkyl moieties are optionally substituted with a group selected from, alkyl, alkenyl, alkynyl, cycloalkyl, cycloalkyl (alkyl), heterocycloalkyl, heterocycloalkyl(alkyl), aryl, substituted aryl, aryl(alkyl), substituted aryl(alkyl), heteroaryl, substituted heteroaryl, halo(alkyl), SF₅, NR⁵3*, azido, cyano, —OR⁵, —SR⁵, —NR⁵R⁶, halogen, nitro, SCH₃, OCF₃, SO₂CH₃, SCF₃, SO₂CF₃, CF₃, —SO₂OR⁵, —OSO₂R⁵, CCl₃, —C(=O)R⁵, —C(=O)OR⁵; —C(=O)NR⁵R⁶, —OC(=O)R⁵,-CHO, and —C=NR⁵;

R" is selected from hydrogen, alkyl, substituted alkyl, OR¹ᵃ, NR¹ᵃ₂ and SR¹ᵃ; Rᶦᵃ is selected H, COR²ᵃ, NHR²ᵃ, and NHCOR²ᵃ, wherein each R²ᵃ are independently selected from alkyl, substituted alkyl, alkyl alkenyl, alkyl alkynyl, cycloalkyl, cycloalkyl(alkyl), heterocycloalkyl, heterocycloalkyl(alkyl), substituted heterocycloalkyl, aryl, substituted aryl, aryl(alkyl), substituted aryl(alkyl), heteroaryl, substituted heteroaryl, and halo(alkyl);

Y¹ is selected from CR¹ and N;
Y² is selected from CR² and N;
Y³ is selected from CR³ and N;
Y⁴ is selected from CR⁴ and N; and
R¹-R⁴ are independently selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), SF₅, NRY₃, azido, cyano, —OR⁵, —SR⁵, —NR⁵R⁶, halogen, nitro, SCH$_3$, OCF$_3$, SO$_2$CH$_3$, SCF$_3$, SO$_2$CF$_3$, CF$_3$, —SO$_2$OR$^5$, —OSO$_2$R$^5$, CCl$_3$, —C(=O)R$^5$, —C(=O)OR$^5$; —C(=O)NR$^5$R$^6$, —O C(=O)R$^5$, —CHO, —C=NR$^5$; where R$^5$ and R$^6$ are independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl).

Clause 10. The GPAT inhibitor of clause 5, described by the formula (IIBb):

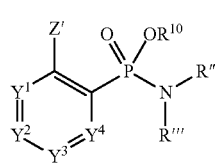
(IIBb)

wherein:
Z' is selected from hydrogen, —CO$_2$R$^a$, —(CH$_2$)$_n$OR$^a$, —(CH$_2$)$_m$OC(O)R, a carboxy isostere, nitrile, halogen, trifluoromethyl, —P(O)(OR$^a$)$_2$, SO$_2$OR$^a$, B(OR$^a$)$_2$, SO$_2$CF$_3$, SOCF$_3$, S(O)OR$^a$, or SF$_5$ wherein R$^a$ are each independently selected from hydrogen, alkyl, substituted alkyl, aryl, substituted aryl, cycloalkyl, substituted cycloalkyl, heterocycle, substituted heterocycle, heteroaryl, and substituted heteroaryl;

R$^{10}$ is selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), Na$^+$, K$^+$ and NH$_4^+$;

R''' is selected from alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl), wherein alkyl moieties are optionally substituted with a group selected from, alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), SF$_5$, NR$^5_3{}^+$, azido, cyano, —OR$^5$, —SR$^5$, —NR$^5$R$^6$, halogen, nitro, SCH$_3$, OCF$_3$, SO$_2$CH$_3$, SCF$_3$, SO$_2$CF$_3$, CF$_3$, —SO$_2$OR$^5$, —OSO$_2$R$^5$, CCl$_3$, —C(=O)R$^5$, —C(=O)OR$^5$; —C(=O)NR$^5$R$^6$, —OC(=O)R$^5$, —CHO, and —C=NR$^5$;

R'' is selected from hydrogen, alkyl, substituted alkyl, OR$^{18}$, NR$^{1a_2}$ and SR$^{1a}$;

R$^{1a}$ is selected H, COR$^{2a}$, NHR$^{2a}$, and NHCOR$^{2a}$, wherein each R$^{21}$ are independently selected from alkyl, substituted alkyl, alkyl alkenyl, alkyl alkynyl, cycloalkyl, cycloalkyl(alkyl), heterocycloalkyl, heterocycloalkyl(alkyl), substituted heterocycloalkyl, aryl, substituted aryl, aryl(alkyl), substituted aryl(alkyl), heteroaryl, substituted heteroaryl, and halo(alkyl);

Y$^1$ is selected from CR$^1$ and N;
Y$^2$ is selected from CR$^2$ and N;
Y$^3$ is selected from CR$^3$ and N;
Y$^4$ is selected from CR$^4$ and N; and
R$^1$-R$^4$ are independently selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), SF$_5$, NR$^5_3{}^*$, azido, cyano, —OR$^5$, —SR$^5$, —NR$^5$R$^6$, halogen, nitro, SCH$_3$, OCF$_3$, SO$_2$CH$_3$, SCF$_3$, SO$_2$CF$_3$, CF$_3$, —SO$_2$OR$^5$, —OSO$_2$R$^5$, CCl$_3$, —C(=O)R$^5$, —C(=O?)OR$^5$; —C(=O)NR$^5$R$^6$, —O C(=O)R$^5$, —CHO, —C=NR$^5$; where R$^5$ and R$^6$ are independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl).

Clause 11. The GPAT inhibitor of clause 1, described by formula (IIC) or (IID):

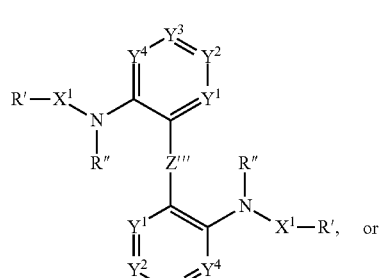
(IIC)

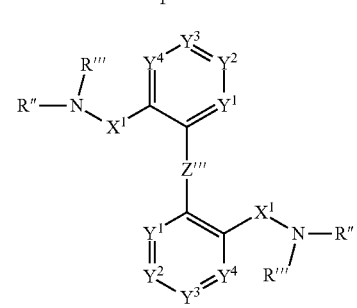
(IID)

wherein:
X$^1$ is selected from

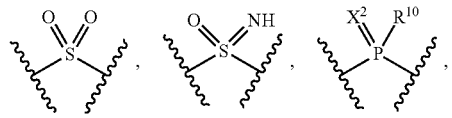

wherein X$^2$ is O or S, R$^{10}$ is selected from SR$^{10a}$, OR$^{10a}$, and N(R$^{10a}$)$_2$;

Z' and Z''' are each independently selected from —(CH$_2$)$_n$OR$^a$O(CH$_2$)n-, —(CH$_2$)$_m$OC(O)R$^a$—, —C(O)OR$^a$OC(O)—, —P(O)(OR$^a$)$_2$-, —SO$_2$OR$^a$OSO$_2$—, —S(O)OR$^a$OS(O)-, wherein R$^a$ are each independently selected from alkyl, substituted alkyl, aryl, substituted aryl, cycloalkyl, substituted cycloalkyl, heterocycle, substituted heterocycle, heteroaryl, and substituted heteroaryl;

each R$^{10a}$ is independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), Na$^+$, K$^+$, and NH$_4^+$;

R' and R''' are each independently selected from alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl);

R'' is selected from hydrogen, alkyl, substituted alkyl, $OR^{1a}$, $NR^{1a}_2$ and $SR^{1a}$;

$R^{1a}$ is selected H, $COR^{2a}$, $NHR^{2a}$, and $NHCOR^{2a}$, wherein each $R^{2a}$ are independently selected from alkyl, substituted alkyl, alkyl alkenyl, alkyl alkynyl, cycloalkyl, cycloalkyl(alkyl), heterocycloalkyl, heterocycloalkyl(alkyl), substituted heterocycloalkyl, aryl, substituted aryl, aryl(alkyl), substituted aryl(alkyl), heteroaryl, substituted heteroaryl, and halo(alkyl);

$Y^1$ is selected from $CR^1$ and N;
$Y^2$ is selected from $CR^2$ and N;
$Y^3$ is selected from $CR^3$ and N;
$Y^4$ is selected from $CR^4$ and N; and $R^1$-$R^4$ are independently selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), $SF_5$, $NR^5_3{}^+$, azido, cyano, $-OR^5$, $-SR^5$, $-NR^5R^6$, halogen, nitro, $SCH_3$, $OCF_3$, $SO_2CH_3$, $SCF_3$, $SO_2CF_3$, $CF_3$, $-SO_2OR^5$, $-OSO_2R^5$, $CCl_3$, $-C(=O)R^5$, $-C(=O)OR^5$; $-C(=O)NR^5R^6$, $-O-C(=O)R^5$, $-CHO$, $-C=NR^5$; where $R^5$ and $R^6$ are independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl).

Clause 12. The GPAT inhibitor of clause 11, described by formula (IICa) or (IIDa):

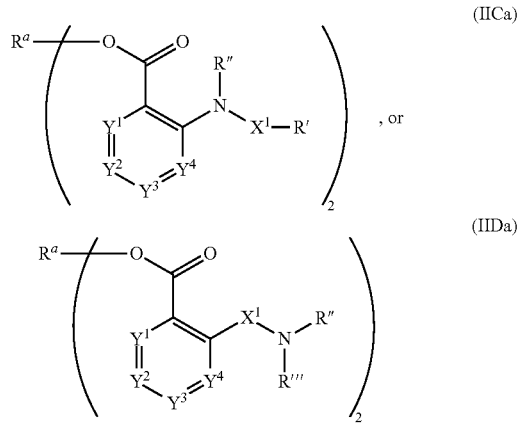

wherein:
$X^1$ is selected from

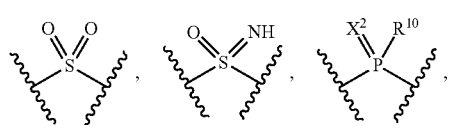

wherein $X^2$ is O or S, $R^{10}$ is selected from $SR^{10a}$, $OR^{10a}$, and $N(R^{10a})_2$;

$R^a$ are each independently selected from alkyl, substituted alkyl, aryl, substituted aryl, cycloalkyl, substituted cycloalkyl, heterocycle, substituted heterocycle, heteroaryl, and substituted heteroaryl;

each $R^{10a}$ is independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), $Na^+$, $K^+$, and $NH_4{}^+$;

R' and R''' are each independently selected from alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl);

R'' is selected from hydrogen, alkyl, substituted alkyl, $OR^{1a}$, $NR^{1a2}$ and $SR^1$;

$R^{1a}$ is selected H, $COR^{2a}$, $NHR^{2a}$, and $NHCOR^{2a}$, wherein each $R^{21}$ are independently selected from alkyl, substituted alkyl, alkyl alkenyl, alkyl alkynyl, cycloalkyl, cycloalkyl(alkyl), heterocycloalkyl, heterocycloalkyl(alkyl), substituted heterocycloalkyl, aryl, substituted aryl, aryl(alkyl), substituted aryl(alkyl), heteroaryl, substituted heteroaryl, and halo(alkyl);

$Y^1$ is selected from $CR^1$ and N;
$Y^2$ is selected from $CR^2$ and N;
$Y^3$ is selected from $CR^3$ and N;
$Y^4$ is selected from $CR^4$ and N; and $R^1$-$R^4$ are independently selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), $SF_5$, $NR^5_3{}^+$, azido, cyano, $-OR^5$, $-SR^5$, $-NR^5R^6$, halogen, nitro, $SCH_3$, $OCF_3$, $SO_2CH_3$, $SCF_3$, $SO_2CF_3$, $CF_3$, $-SO_2OR^5$, $-OSO_2R^5$, $CCl_3$, $-C(=O)R^5$, $-C(=O)OR^5$; $-C(=O)NR^5R^6$, $-O-C(=O)R^5$, $-CHO$, $-C=NR^5$; where $R^5$ and $R^6$ are independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl).

Clause 13. The GPAT inhibitor of clause 12, wherein $R^a$ is selected from the following structures:

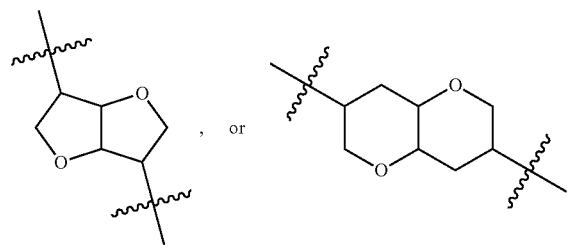

Clause 14. The GPAT inhibitor of clause 1, described by any of formula (IIIA) or (IIIB)

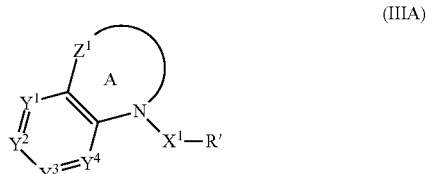

-continued (IIIB)

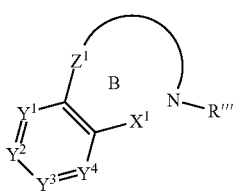

wherein:
$Z^1$ and $Z^2$ are each independently selected from carboxylato, alkoxy, alkoxycarbonyl, imine, amino, amido, acyl, thio, and alkylthio;
ring A and B are each independently selected from a 5-10 membered cyclic group selected from heterocycle, and substituted heterocycle;
$X^1$ is selected from

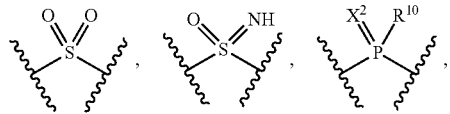

wherein $X^2$ is O or S, $R^{10}$ is selected from $SR^{10a}$, $OR^{10a}$, and $N(R^{10a})_2$;

each $R^{1O}a$ is independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), $Na^+$, $K^+$, and $NH_4^+$;

R' and R''' are each independently selected from alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo (alkyl);

$Y^1$ is selected from $CR^1$ and N;
$Y^2$ is selected from $CR^2$ and N;
$Y^3$ is selected from $CR^3$ and N;
$Y^4$ is selected from $CR^4$ and N; and $R^1$-$R^4$ are independently selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), $SF_5$, $NR^5{}_3{}^+$, azido, cyano, —$OR^5$, —$SR^5$, —$NR^5R^6$, halogen, nitro, $SCH_3$, $OCF_3$, $SO_2CH_3$, $SCF_3$, $SO_2CF_3$, $CF_3$, —$SO_2OR^5$, —$OSO_2R^5$, $CCl_3$, —C(=O)$R^5$, —C(=O)O$R^5$; —C(=O)N$R^5R^6$,-O C(=O)$R^5$, —CHO, —C=N$R^5$; where $R^5$ and $R^6$ are independently selected from hydrogen, alkyl, substituted alkyl, alkyl alkenyl, alkyl alkynyl, cycloalkyl, cycloalkyl (alkyl), heterocycloalkyl, heterocycloalkyl(alkyl), aryl, substituted aryl, aryl(alkyl), substituted aryl(alkyl), heteroaryl, substituted heteroaryl, and halo(alkyl).

Clause 15. The GPAT inhibitor of clause 14, wherein $Z'$ and $Z^2$ are each independently selected from —$(CH_2)_n$O—, —C(NH)—, —$(CH_2)_m$OC(O)— and —$CO_2$—, wherein n and m are each independently an integer from 1-5.

Clause 16. The GPAT inhibitor of clause 15, of the formula (IIIAa), (IIIAb), or (IIIBa):

(IIIAa)

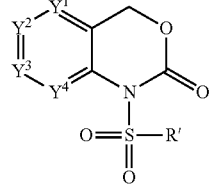

(IIIAb)

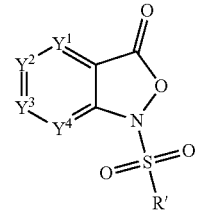

(IIIBa)

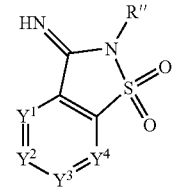

wherein:
R' and R''' are each independently selected from alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo (alkyl);
$Y^1$ is selected from $CR^1$ and N;
$Y^2$ is selected from $CR^2$ and N;
$Y^3$ is selected from $CR^3$ and N;
$Y^4$ is selected from $CR^4$ and N; and
$R^1$-$R^4$ are independently selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), $SF_5$, $NR^5{}_3{}^+$, azido, cyano, —$OR^5$, —$SR^5$, —$NR^5R^6$, halogen, nitro, $SCH_3$, $OCF_3$, $SO_2CH_3$, $SCF_3$, $SO_2CF_3$, $CF_3$, —$SO_2OR^5$, —$OSO_2R^5$, $CCl_3$, —C(=O)$R^5$, —C(=O)O$R^5$; —C(=O)N$R^5R^6$,-O C(=O)$R^5$, —CHO,-C=N$R^5$; where $R^5$ and $R^6$ are independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl).

Clause 17. The GPAT inhibitor of any one of clauses 5-16, wherein:
$Y^1$ is $CR^1$; $Y^2$ is $CR^2$; $Y^3$ is $CR^3$; and $Y^4$ is $CR^4$; where $R^1$, $R^2$, $R^3$ and $R^4$ are independently selected from hydrogen, alkyl, substituted alkyl, alkenyl, alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, halo(alkyl), $SF_5$, $NR^5{}_3{}^+$, azido, cyano, —$OR^5$, —$SR^5$, —$NR^5R^6$, halogen, nitro, $SCH_3$, $OCF_3$, $SO_2CH_3$, $SCF_3$, $SO_2CF_3$, $CF_3$, —$SO_2OR^5$, —$OSO_2R^5$, $CCl_3$, —C(=O)$R^5$, —C(=O)O$R^5$; —C(=O)N$R^5R^6$, —OC(=O)$R^5$,-CHO, and —C=N$R^5$;

wherein R[5] and R[6] are independently selected from hydrogen, alkyl, substituted alkyl, alkyl alkenyl, alkyl alkynyl, cycloalkyl, cycloalkyl(alkyl), heterocycloalkyl, heterocycloalkyl(alkyl), aryl, substituted aryl, aryl(alkyl), substituted aryl(alkyl), heteroaryl, substituted heteroaryl, and halo(alkyl).

Clause 18. The GPAT inhibitor of any one of clauses 5-16, wherein one of Y[1]—Y[4] is N.

Clause 19. The GPAT inhibitor of any one of clauses 5-16, wherein two or more of Y[1]-Y[4] are N.

Clause 20. The GPAT inhibitor of any one of clauses 1-10, wherein Z' or Z''' is selected from hydrogen, —CO$_2$H, —CH$_2$OH, —CN, —Cl, —F, —I, —Br, tetrazole, 1,2,4-oxadiazol-3(2H)-one, —CO$_2$R[11], —C(O)NHS(O)$_2$R[12], wherein R" is selected from alkyl, substituted alkyl, heterocycle, substituted heterocycle, and R[12] is selected from alkyl, substituted alkyl, and trifluoromethyl.

Clause 21. The GPAT inhibitor of clause 1, of any one of the following structures:

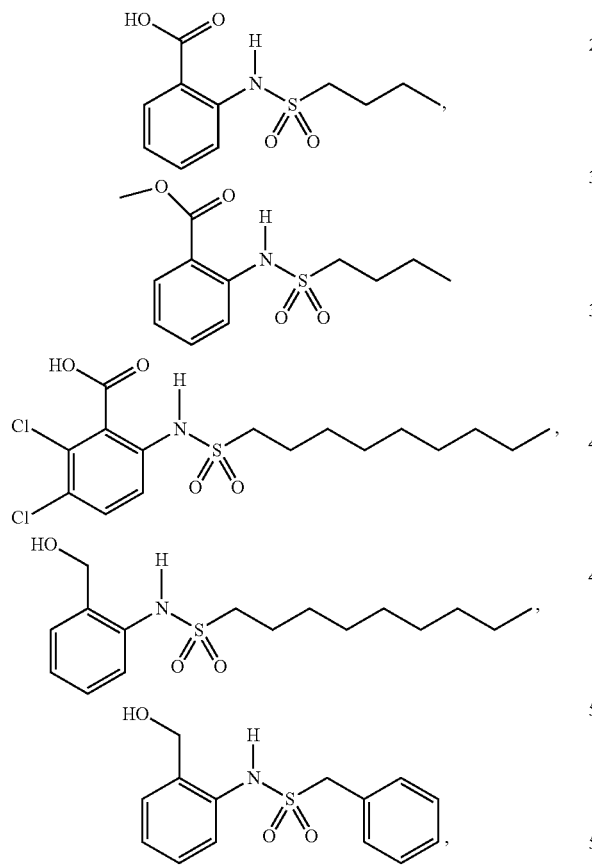
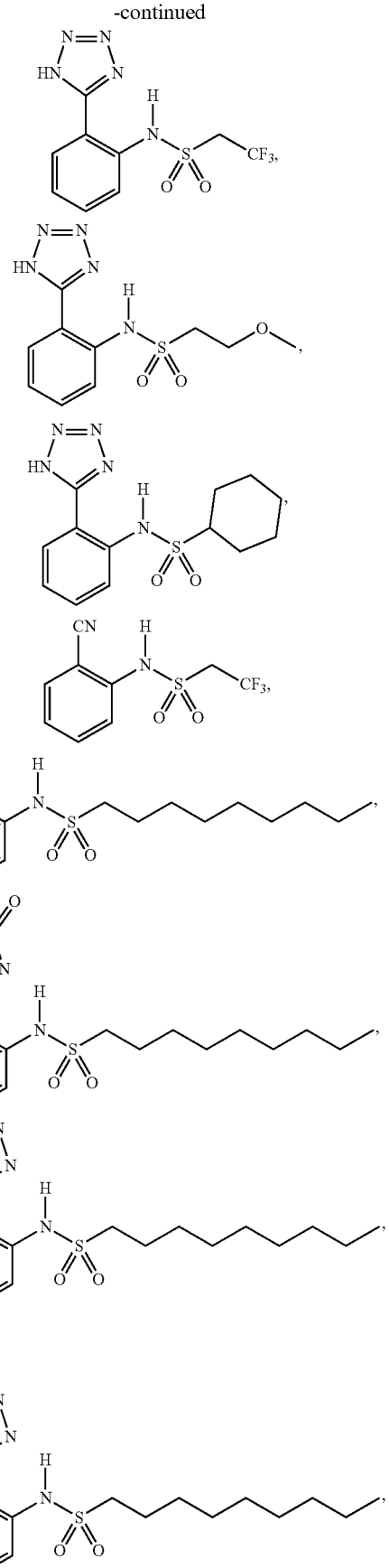

-continued
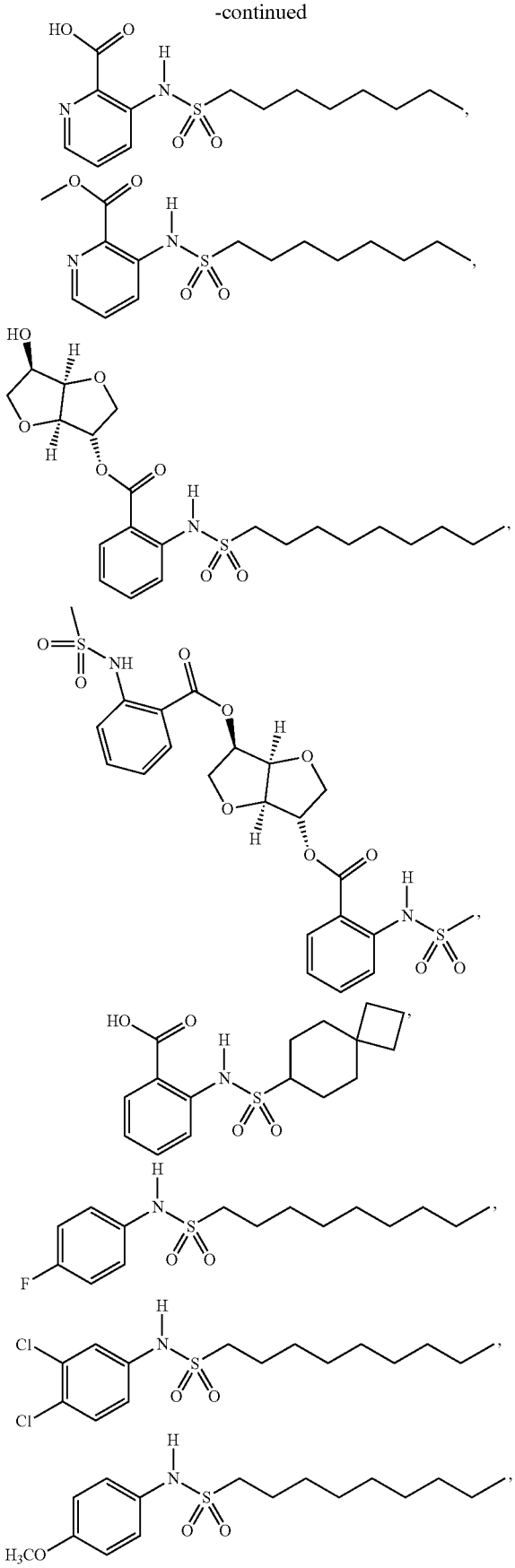
-continued
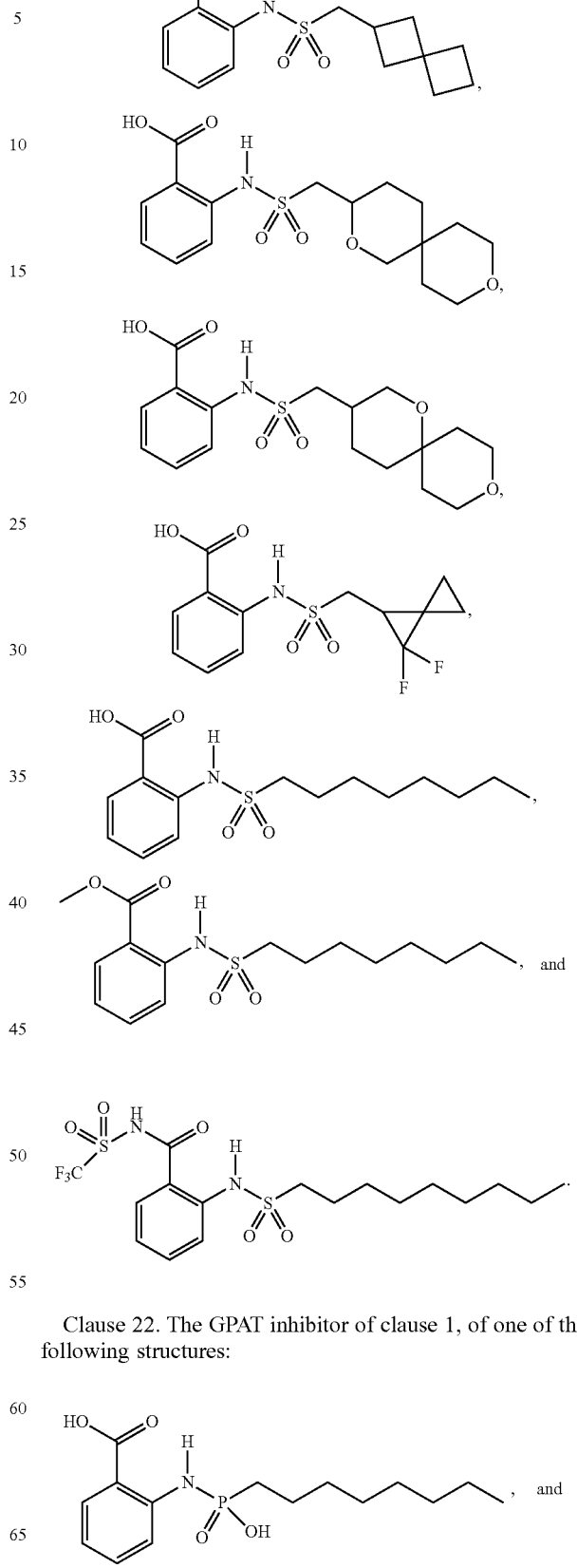
Clause 22. The GPAT inhibitor of clause 1, of one of the following structures:
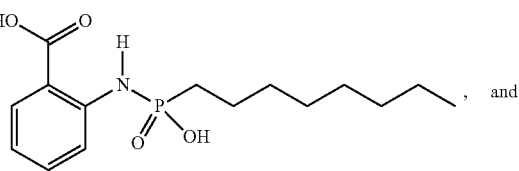

-continued

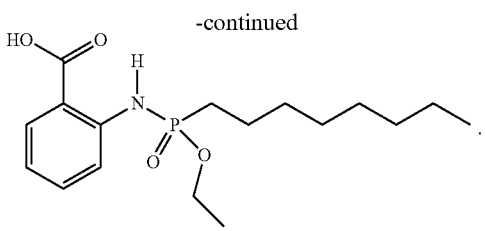

Clause 23. The GPAT inhibitor of any one of the preceding clauses, wherein the compound includes one or more chiral centers, and wherein each chiral center is independently of R-configuration, S-configuration or a mixture thereof.

Clause 24. A pharmaceutical composition; comprising:
a GPAT inhibitor of any one of claims 1-23; and
a pharmaceutically acceptable excipient.

Clause 25. A method of treating a subject for cancer, the method comprising:
administering an effective dose of a GPAT inhibitor according to any of clauses 1-23 for a period of time sufficient to inhibit growth of the cancer.

Clause 26. The method of clause 25, wherein the cancer is a MYC-dependent cancer.

Clause 27. The method of clauses 25 or 26, wherein the cancer is selected from renal cell carcinoma, hepatocellular carcinoma, and lymphoma.

Clause 28. The method of clause 25 or 26, wherein the cancer is a hepatic cancer.

Clause 29. The method of clause 25, wherein the cancer is a lipogenesis-dependent neoplasm.

Clause 30. The method of clause 25, comprising:
comparing a lipogenesis profile obtained from a subject having a neoplasm with a reference lipogenesis profile to classify whether the neoplasm is lipogenesis-dependent; and
administering to the subject an effective amount of a GPAT inhibitor of any one of claims 1-23, when the neoplasm is classified as lipogenesis-dependent, to treat the subject for the lipogenesis-dependent neoplasm.

Clause 31. The method of any one of clauses 25 to 30 wherein the subject is a mammal.

Clause 32. The method of clause 31, wherein the mammal is a human.

Clause 33. A method of treating a metabolic syndrome related disease, the method comprising:
administering to a subject an effective dose of a GPAT inhibitor according to any of clauses 1-23 for a period of time sufficient to reduce symptoms of the disease in the subject.

Clause 34. The method of clause 33, wherein the disease is selected from hyperlipidemia, metabolic syndrome, type 2 diabetes, fatty liver disease and obesity.

Clause 35. The method of clause 34, wherein the disease is obesity.

Clause 36. The method of any one of clauses 33 to 35, wherein the subject is a mammal.

Clause 37. The method of clause 36, wherein the mammal is a human.

Clause 38. A method of treating an infectious disease, the method comprising: administering to a subject an effective dose of a GPAT inhibitor according to any of claims 1-23 for a period of time sufficient to cure or reduce symptoms of the disease in the subject.

Clause 39. The method of clause 38, wherein the infectious disease is selected from infections caused by protozoan parasites, helminths, fungi, mites, bacteria and viruses.

Clause 40. The method of clause 38 or 39, wherein the subject is a plant, fish, reptile, bird, or mammal.

Clause 41. The method of clause 40, wherein the mammal is a human.

Clause 42. A method of treating inflammatory or immune diseases, the method comprising:
administering to a subject an effective dose of a GPAT inhibitor according to any of clauses 1-23 for a period of time sufficient to cure or reduce symptoms of the disease in the subject.

Clause 43. The method of clause 42, wherein the disease is an autoimmune disease selected from rheumatoid arthritis, MS, psoriasis, lupus, systemic sclerosis, inflammatory bowel disease, Crohn's disease, T-1 diabetes, Grave's disease, myasthenia gravis, vasculitis, contact dermatitis, osteoarthritis, gout, asthma, periodontitis sinusitis, HGD (transplant rejection), and GHD.

Clause 44. The method of clause 42 or 43, wherein the subject is a mammal.

Clause 45. The method of clause 44, wherein the mammal is a human.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric. Standard abbreviations may be used, e.g., room temperature (RT); base pairs (bp); kilobases (kb); picoliters (pl); seconds (s or sec); minutes (m or min); hours (h or hr); days (d); weeks (wk or wks); nanoliters (n); microliters (ul); milliliters (ml); liters (L); nanograms (ng); micrograms (ug); milligrams (mg); grams ((g), in the context of mass); kilograms (kg); equivalents of the force of gravity ((g), in the context of centrifugation); nanomolar (nM); micromolar (uM), millimolar (mM); molar (M); amino acids (aa); kilobases (kb); base pairs (bp); nucleotides (nt); intramuscular (i.m.); intraperitoneal (i.p.); subcutaneous (s.c.); DCM=dichloromethane, TEA=triethylamine, DMF=dimethylformamide, DCE=1,2-dichloroethane, CAN=acetonitrile, TMS=trimethylsilyl, THF=tetrahydrofuran, and the like.

Example 1—Exemplary Synthetic Schemes and Procedures

Example 1.1: Synthesis of N-(2-(hydroxymethyl)phenyl)nonane-1-sulfonamide

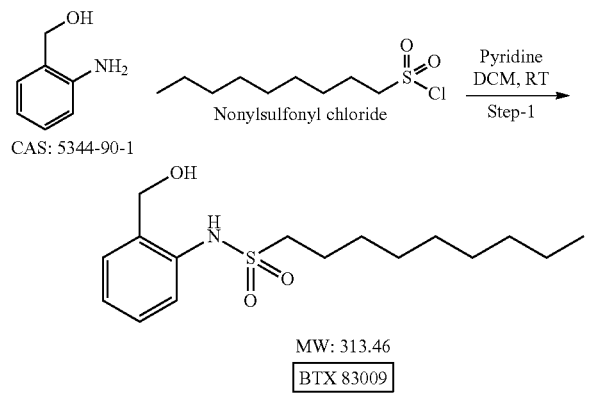

To a solution of (2-aminophenyl) methanol (86 mg, 0.70 mmol) and nonylsulfonyl chloride (200 mg, 0.88 mmol) in DCM (4 ml), pyridine (0.21 ml, 2.64 mmol) was added at room temperature and stirred at room temperature for overnight. After completion of reaction as indicated by TLC, reaction mixture was poured into 1 N HCl and extracted with ethyl acetate (3×15 ml). The combined organic layer was washed with brine, dried over anhydrous sodium sulphate and evaporated under vacuum. The crude was purified by silica gel column chromatography (Ethyl acetate/Hexane) to obtain title compound as off-white solid (120 mg, 55%). $^1$H NMR (DMSO-d6) δ: 8.93 (s, 1H), 7.41 (dd, J=7.2 Hz, 1H), 7.28-7.17 (m, 3H), 5.32(bs, 1H), 4.60 (s, 2H), 3.08(t, 7.6 Hz, 2H), 1.67 (dt, J=7.6 Hz, 2H), 1.34-1.21 (m, 12H), 0.84(t, J=6.8 Hz, 3H). MS observed: 312.4(M-H).

Example 1.2: Synthesis of N-(2-(hydroxymethyl)phenyl)cyclohexanesulfonamide

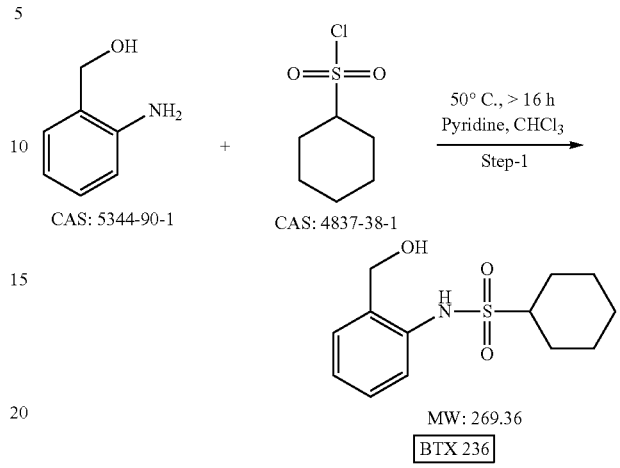

To a solution of (2-aminophenyl) methanol (108 mg, 0.88 mmol) and cyclohexylsulfonyl chloride (200 mg, 1.09 mmol) in chloroform (4 ml), pyridine (0.6 ml, 7.60 mmol) was added at room temperature. The resulting reaction mixture was heated at 50° C. for overnight. The reaction mixture was quenched with aqueous HCl and extracted with DCM (3×10 ml). The combined organic layer was washed with brine, dried over anhydrous sodium sulphate and evaporated under vacuum. The crude was purified by silica gel column chromatography (30% Ethyl acetate/Hexane) to obtain title compound as colorless oil (100 mg, 42%). $^1$H NMR (400 MHz, DMSO-d6) δ 8.88 (bs, 1H), 7.40 (d, J=7.3 Hz, 1H), 7.35-7.15(m, 3H), 5.40 (bs, 1H), 4.62 (s, 2H), 3.09-2.95 (m, 1H), 2.06 (d, J=11.5 Hz, 2H), 1.76 (d, J=12.7 Hz, 2H), 1.60 (d, J=12.0 Hz, 1H), 1.48-1.05 (m, 5H). MS observed: 268.2(M-H).

The following compounds were prepared by following similar procedures as described for Examples 1.1-1.2.

TABLE 1

| No | Structure | Code | Analytical data |
|---|---|---|---|
| 1 | (structure) | BTX 83000 | $^1$H NMR (400 MHz, Acetone-d6) δ 8.37 (bs, 1H), 7.51 (dd, J = 8.0, 0.8 Hz, 1H), 7.35-7.24 (m, 2H), 7.11 (td, J = 7.5, 1.2 Hz, 1H), 4.80 (s, 2H), 3.24-3.10 (m, 2H), 1.86-1.70 (m, 2H), 1.47-1.12 (m, 10H), 0.85 (t, J = 6.9 Hz, 3H). MS observed: 298.4 (M − H) |
| 2 | (structure) | BTX 931 | $^1$H NMR (400 MHz, DMSO-d6) δ 8.95 (bs, 1H), 7.44 (d, J = 6.8 Hz, 1H), 7.36-7.10 (m, 3H), 5.29 (bs, 1H), 4.61 (s, 2H), 2.98 (s, 3H). MS observed: 200.1 (M − H) |
| 3 | (structure) | BTX 932 | $^1$H NMR (400 MHz, DMSO-d6) δ 8.97 (bs, 1H), 7.43 (d, J = 7.1 Hz, 1H), 7.33-7.10 (m, 3H), 5.35 (bs, 1H), 4,61 (s, 2H), 3.14-3.01 (m, 2H), 1.74-1.58 (m, 2H), 1.43-1.29 (m, 2H), 0.85 (t, J = 7.3 Hz, 3H). MS observed: 244.5 (M + H) |

TABLE 1-continued

| No | Structure | Code | Analytical data |
|---|---|---|---|
| 4 | (2-hydroxymethylphenyl)-N-isopropylsulfonamide structure | BTX934 | $^1$H NMR (400 MHz, DMSO-d6) δ 8.91 (s, 1H), 7.41 (d, J = 7.3 Hz, 1H), 7.33-7.27 (m, 1H), 7.20 (m, 2H), 5.39 (t, J = 5.4 Hz, 1H), 4.62 (d, J = 5.4 Hz, 2H), 3.28 (hept, J = 6.8 Hz, 1H), 1.26 (d, J = 6.8 Hz, 6H).<br>MS observed: 230.51 (M + H) |
| 5 | (2-hydroxymethylphenyl)-N-isobutylsulfonamide structure | BTX 235 | $^1$H NMR (400 MHz, DMSO-d6) δ 8.96 (bs, 1H), 7.43 (d, J = 7.2 Hz, 1H), 7.31-7.15 (m, 3H), 5.33 (bs, 1H), 4.60 (s, 2H), 2.99 (d, J = 6.5 Hz, 2H), 2.12 (m, 1H), 1.00 (d, J = 6.7 Hz, 6H).<br>MS observed: 244.4 (M + H) |
| 6 | (2-hydroxymethylphenyl)-N-cyclohexylsulfonamide structure | BTX 236 | $^1$H NMR (400 MHz, DMSO-d6) δ 8.92 (bs, 1H), 7.40 (d, J = 7.4 Hz, 1H), 7.29 (t, J = 7.9 Hz, 1H), 7.27-7.06 (m, 2H), 5.40 (bs, 1H), 4.62 (s, 2H), 3.08-2.92 (m, 1H), 2.06 (d, J = 11.2 Hz, 2H), 1.76 (d, J = 12.6 Hz, 2H), 1.59 (d, J = 12.1 Hz, 1H), 1.46-1.01 (m, 5H).<br>MS observed: 268.2 (M + H) |
| 7 | (2-hydroxymethylphenyl)-N-(2-ethoxyethyl)sulfonamide structure | BTX 237 | $^1$H NMR (400 MHz, DMSO-d6) δ 8.96 (bs, 1H), 7.42 (d, J = 7.2 Hz, 1H), 7.36-7.29 (m, 1H), 7.28-7.13 (m, 2H), 5.33 (bs, 1H), 4.61 (s, 2H), 3.71 (t, J = 6.3 Hz, 2H), 3.46-3.34 (m, 4H), 1.06 (t, J = 7.0 Hz, 3H).<br>MS observed: 258.26 (M − H) |
| 8 | (2-hydroxymethylphenyl)-N-(2,2,2-trifluoroethyl)sulfonamide structure | BTX 238 | $^1$H NMR (400 MHz, DMSO-d6) δ 9.65 (s, 1H), 7.56-7.39 (m, 1H), 7.39-7.10 (m, 3H), 5.31 (bs, 1H), 4.59 (bs, 2H), 4.56 (dd, J = 9.7 Hz, 2H).<br>MS observed: 268.3 (M − H) |
| 9 | (2-hydroxymethylphenyl)-N-benzylsulfonamide structure | BTX 239 | $^1$H NMR (400 MHz, DMSO-d6) δ 7.76-6.89 (m, 11H), 4.53 (s, 2H), 4.45 (s, 2H).<br>MS observed: 276.3 (M − H) |

Example 1.3: Synthesis of 2-(nonylsulfonamido)benzoic acid

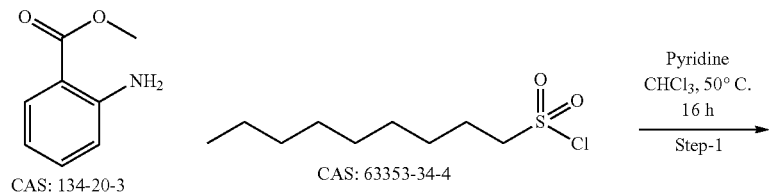

CAS: 134-20-3

CAS: 63353-34-4

Pyridine
CHCl$_3$, 50° C.
16 h
Step-1

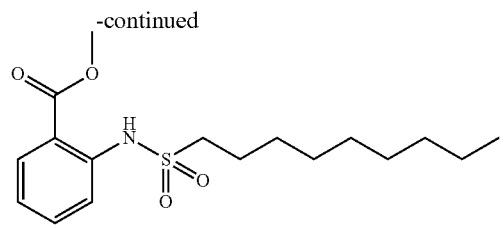

MW: 341.47
BTX 550

↓ LiOH·H₂O
THF/MeOH/Water
Step-2

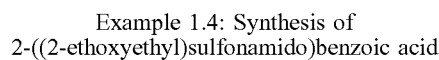

MW: 327.44
BTX 100

Step-1: Synthesis of methyl 2-(nonylsulfonamido)benzoate: To a solution of methyl 2-aminobenzoate (267 mg, 1.76 mmol) and nonylsulfonylchloride (500 mg, 2.21 mmol) in chloroform (5 ml) pyridine (0.262 ml, 3.32 mmol) was added at room temperature and stirred at 50° C. for 16 h. The reaction mixture was poured in to 50% HCl and extracted with ethyl acetate (3×10 ml). The combined organic layer was washed with water, dried over sodium sulphate and evaporated under vacuum. The crude was purified by silica gel column chromatography (10% EA/Hexane) to obtain title compound as pale yellow gummy solid (215 mg, 35%). $^{1}$H NMR (400 MHz, CDCl$_3$) δ 10.45 (s, 1H), 8.07 (dd, J=8.0, 1.5 Hz, 1H), 7.77 (dd, J=8.4, 0.8 Hz, 1H), 7.60-7.52 (m, 1H), 7.12 (ddd, J=8.3, 7.4, 1H), 3.95 (s, 3H), 3.15 (dd, J=6.8 Hz, 2H), 1.91-1.75 (m, 2H), 1.45-1.14 (m, 12H), 0.88 (t, J=6.9 Hz, 3H). MS observed: 340.4(M-H).

Step-2: Synthesis of 2-(nonylsulfonamido)benzoic acid: To a stirred solution of methyl 2-(nonylsulfonamido)benzoate (200 mg, 0.59 mmol) in MeOH:THF (1:1, 14 ml), lithium hydroxide (36 mg, 0.86 mmol) in water (4 ml) was added and stirred at 50° C. After completion of reaction as indicated by TLC, reaction mixture was evaporated under vacuum. The reaction mixture was acidified with dilute HCl (pH=2) and extracted the product with ethyl acetate (3×10 ml). The combined organic layer was washed with brine, dried over sodium sulphate and evaporated under vacuum. The crude was purified by column chromatography (20% EA/Hexane) to obtain title compound as off-white solid (125 mg, 65%). $^{1}$H NMR (DMSO-d6) δ: 14.04 (bs, 1H), 11.26(bs, 1H), 7.80 (d, J=7.2 Hz, 1H), 7.60-7.56(m, 2H), 7.16-7.12 (m, 1H), 3.25 (t, J=7.6 Hz, 2H), 1.60 (p, J=7.6 Hz, 2H), 1.30-1.14 (m, 12H), 0.83(t, 3H, J=6.8 Hz, 3H). MS observed: 326(M-H).

Example 1.4: Synthesis of 2-((2-ethoxyethyl)sulfonamido)benzoic acid

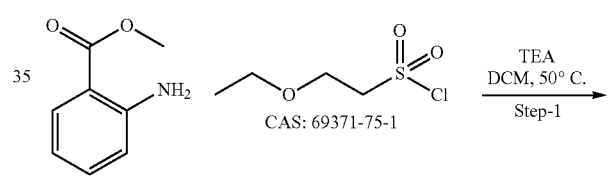

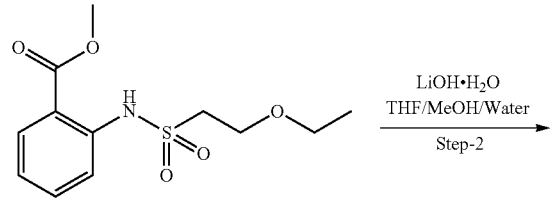

MW: 287.33
BTX 558

↓ LiOH·H₂O
THF/MeOH/Water
Step-2

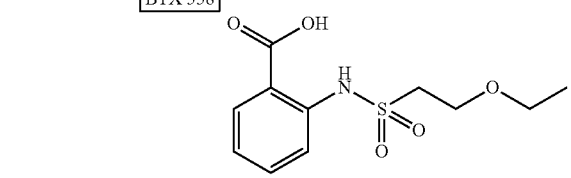

MW: 273.30
BTX 108

Step-1: Synthesis of methyl 2-((2-ethoxyethyl)sulfonamido)benzoate: To a solution of methyl 2-aminobenzoate (78 mg, 0.52 mmol) and TEA (0.28 ml, 1.82 mmol) in DCM (2 ml), 2-ethoxyethane-1-sulfonyl chloride (90 mg, 0.52 mmol) in DCM was added drop-wise and stirred at 50° C. for 16 h. The reaction mixture was poured in to 1 N HCl and extracted with DCM (3×10 ml). The combined organic layer was washed with 50% HCl, dried over anhydrous sodium sulphate and evaporated under vacuum. The crude was purified by column chromatography (18% EA/Hexane) to obtain title compound as white solid (83 mg, 53%). ¹H NMR (400 MHz, DMSO-d6) δ 10.26 (s, 1H), 7.97 (d, J=7.7 Hz, 1H), 7.73-7.57 (m, 2H), 7.18 (td, J=6.9, 4.1 Hz, 1H), 3.87 (s, 3H), 3.67 (t, J=5.5 Hz, 2H), 3.55 (t, J=5.5 Hz, 2H), 3.27 (q, J=7.0 Hz, 2H), 0.91 (t, J=7.0 Hz, 3H). MS observed: 288(M⁺H).

Step-2: 2-((2-ethoxyethyl)sulfonamido)benzoic acid: To a stirred solution of methyl 2-((2-ethoxyethyl)sulfonamido) benzoate (25 mg, 0.087 mmol mmol) in MeOH:THF (1:1, 4 ml), lithium hydroxide (5 mg, 0.13 mmol) in water (1 ml) was added and stirred at 50° C. for 16 h. After completion of reaction as indicated by TLC, reaction mixture was evaporated under vacuum. The reaction mixture was evaporated under vacuum and acidified with dilute HCl (pH=2) and extracted the product with ethyl acetate (3×10 ml). The combined organic layer was washed dried over anhydrous sodium sulphate and evaporated under vacuum to obtain title compound as off-white solid (20 mg, 84%). ¹H NMR (400 MHz, DMSO-d6) δ 13.78(bs, 1H), 10.99 (bs, 1H), 7.99 (d, J=7.8 Hz, 1H), 7.74-7.50 (m, 2H), 7.22-7.05 (m, 1H), 3.67 (t, J=5.1 Hz, 2H), 3.52 (t, 2H), 3.27 (q, J=6.8 Hz, 2H), 0.91 (t, J=6.8 Hz, 3H). MS observed: 273.8(M⁺H).

Example 1.5: Synthesis of 2-(spiro[3.5]nonane-7-sulfonamido)benzoic acid

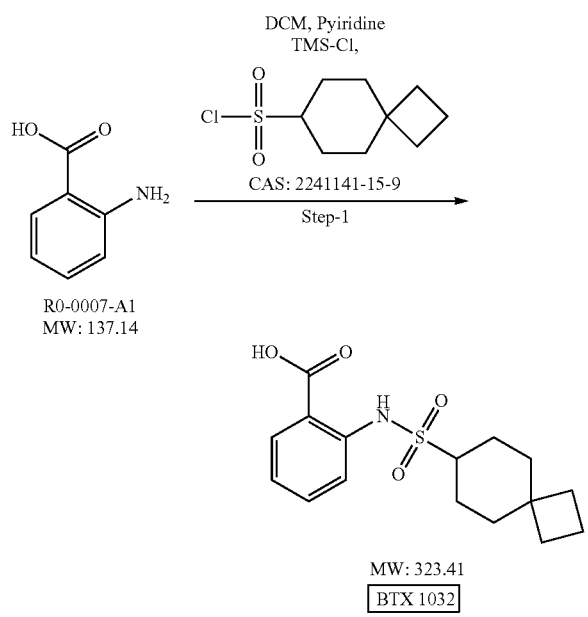

Method-A: To a solution of 2-aminobenzoic acid (72 mg, 0.56 mmol) and spiro[3.5]nonane-7-sulfonyl chloride(100 mg, 0.45 mmol) and pyridine(0.2 ml, 2.5 mmol) in DCM (2 ml), TMS-CI (0.2 ml, 1.34 mmol) was added at room temperature. The reaction mixture was stirred at room temperature for overnight. The reaction mixture was quenched with 50% HCl and extracted with DCM and the combined organic layer was evaporated under vacuum. The crude was purified by prep HPLC (Heptane/IPA: ACN, 7:3) to obtain time compound as pale yellow solid (4 mg, 3%).

Method-B: To a suspension of 2-aminobenzoic acid (36 mg, 0.26 mmol) and spiro[3.5]nonane-7-sulfonyl chloride (60 mg, 0.26 mmol) in acetonitrile: water(1:1, 2 ml) was added aqueous solution of sodium carbonate adjusting the pH=8. Stirred the resulting reaction mixture for overnight at room temperature. The reaction mixture was quenched with 50% HCl and extracted with ethyl acetate (3×10 ml). The combined organic layer evaporated under vacuum. The crude was purified by reverse phase prep HPLC (acetonitrile/0.1% Formic acid-water) to obtain title compound as off white solid (5 mg, 6%). ¹H NMR (400 MHz, DMSO-d6) δ 7.99 (d, J=7.6 Hz, 1H), 7.67-7.48 (m, 2H), 7.14-7.04 (m, 1H), 3.18-3.06 (m, 1H), 1.89-1.54 (m, 8H), 1.50-1.13 (m, 6H). MS observed: 322.5(M-H).

Synthesis of 2-(((1,9-dioxaspiro[5.5]undecan-4-yl) methyl)sulfonamido)benzoic acid

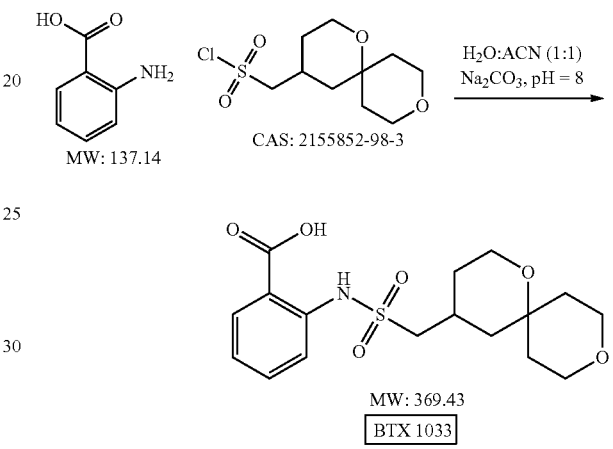

To a suspension of 2-aminobenzoic acid (54 mg, 0.39 mmol) and (1,9-dioxaspiro[5.5]undecan-4-yl)methanesulfonyl chloride(82 mg, 0.30 mmol) in acetonitrile:water (1:1, 4 ml) was added aqueous solution of sodium carbonate adjusting the pH=8. Stirred the resulting reaction mixture for overnight at room temperature. The reaction mixture was quenched with 50% HCl and extracted with ethyl acetate (3×5 ml). The combined organic layer evaporated under vacuum. The crude was purified by reverse phase prep HPLC (acetonitrile/0.1% formic acid-water) to obtain title compound as off white solid (15 mg, 13%). ¹H NMR (400 MHz, DMSO-d6) δ 7.99 (d, J=7.9 Hz, 1H), 7.59-7.53 (m, 2H), 7.17-7.09 (m, 1H), 3.66-3.43 (m, 6H), 3.22-3.08 (m, 2H), 2.27-2.14 (m, 1H), 1.95 (d, J=13.9 Hz, 1H), 1.68 (d, J=12.9 Hz, 2H), 1.51-1.13 (m, 5H). MS observed: 368.4(M-H).

Example 1.6: Synthesis of 3-(methylsulfonamido) picolinic acid

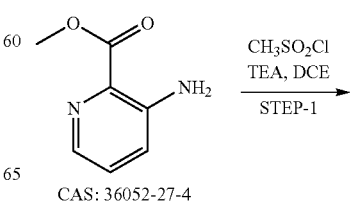

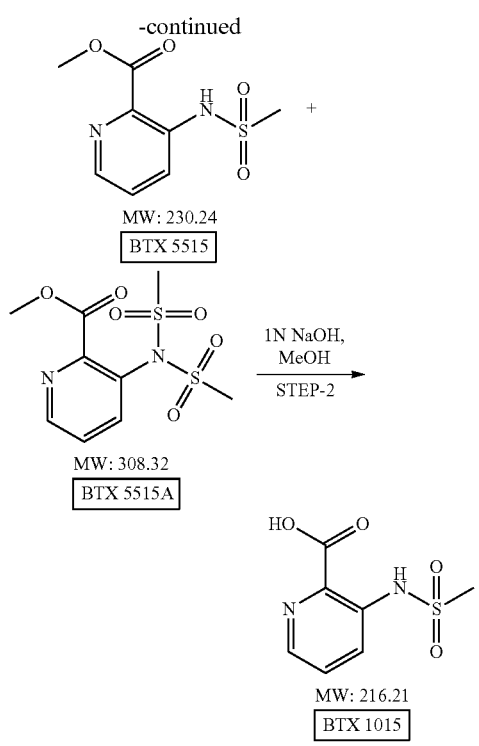

Step-1: Methyl 3-(methylsulfonamido) picolinate and Methyl 3-(N-(methylsulfonyl) methylsulfonamido)picolinate: To a solution of methyl 3-aminopicolinate (100 mg, 0.65 mmol) and methanesulfonyl chloride (75 mg, 0.65 mmol) in DCM (2 ml), TEA (0.46 ml, 3.2 mmol) was added drop-wise and stirred at room temperature. After completion of reaction as indicated by TLC, reaction mixture was quenched with 1 N HCl and extracted with ethyl acetate (3×10 ml). The combined organic layer was dried over anhydrous sodium sulphate and evaporated under vacuum. The crude was purified by silica gel column chromatography (20% EA/Hexane) to obtain following two compounds.

R5-0015-A: Methyl 3-(N-(methylsulfonyl)methylsulfonamido)picolinate(26 mg, 13%). MS observed: 309.4($M^+H$) data R5-0015: Methyl 3-(methylsulfonamido) picolinate (10 mg, 6%). $^1$H NMR (400 MHz, DMSO-d6) δ 9.99 (s, 1H), 8.43 (d, J=3.5 Hz, 1H), 7.99 (d, J=8.5 Hz, 1H), 7.65 (dd, J=8.4, 4.4 Hz, 1H), 3.89 (s, 3H), 3.19 (s, 3H). MS observed: 231.4($M^+H$).

Step-2: 3-(methylsulfonamido)picolinic acid: To a stirred solution of methyl 3-(N-(methylsulfonyl)methylsulfonamido)picolinate (26 mg, 0.084 mmol) in MeOH (2 ml), 1N NaOH (1 ml) was added and stirred at room temperature for 2 h. After completion of reaction as indicated by TLC, reaction mixture was evaporated under vacuum and acidified with dilute HCl. The product was extracted with ethyl acetate (3×10 ml) and combined organic layer was dried over anhydrous sodium sulphate and evaporated under vacuum to obtain title compound as white solid (15 mg, 82%). $^1$H NMR (400 MHz, DMSO-d6) δ 11.16 (s, 1H), 8.41 (d, J=4.6 Hz, 1H), 8.12 (d, J=8.5 Hz, 1H), 7.73 (dd, J=8.6, 4.6 Hz, 1H), 3.26 (s, 3H). MS observed: 215.2(M-H).

Example 1.7 Synthesis of 3-(nonylsulfonamido) isonicotinic acid

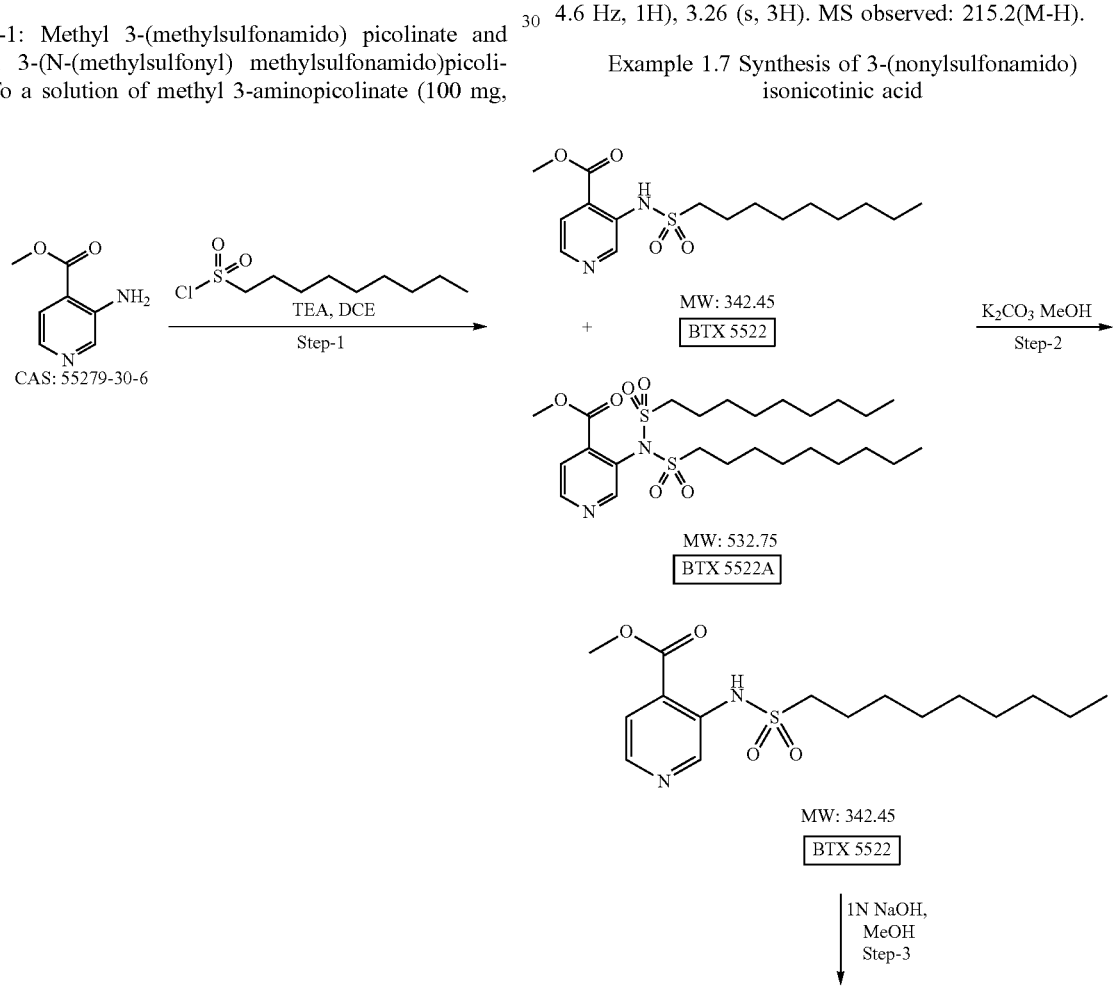

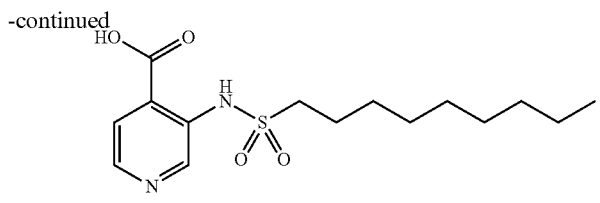

MW: 328.43
BTX 1022

Step-1: methyl 3-(nonylsulfonamido)isonicotinate

To a solution of methyl 3-aminopicolinate (100 mg, 0.65 mmol) and nonylsulfonyl chloride (146 mg, 0.65 mmol) in DCM (2 ml), TEA (0.46 ml, 3.2 mmol) was added drop-wise and stirred at room temperature. After completion of reaction as indicated by TLC, reaction mixture was quenched with 1N HCl and extracted with DCM (3×10 ml). The combined organic layer was dried over anhydrous sodium sulphate and evaporated under vacuum. The mixture of the product was dissolved in MeOH (3 ml) and treated with K2CO3 (150 mg). The conversion of bis-sulfonamide to monosulfonamide was monitored by TLC. The solvent was removed under vacuum and quenched with water. The product was extracted with ethyl acetate (3×10 ml). The combined organic layer was evaporated and the crude was purified by silica gel column chromatography (20% Ethyl acetate/Hexane) to obtain methyl 3-(nonylsulfonamido) isonicotinate (47 mg, 21%)

1H NMR (400 MHz, DMSO-d6) δ 9.75 (s, 1H), 8.79 (s, 1H), 8.50 (d, J=5.0 Hz, 1H), 7.72 (d, J=5.0 Hz, 1H), 3.89 (s, 3H), 3.31-3.26 (m, 2H), 1.74-1.57 (m, 2H), 1.40-1.10 (m, 12H), 0.84 (t, J=6.8 Hz, 3H). MS observed: 342.30(M+H).

Step-2: 3-(nonylsulfonamido)isonicotinic acid: To a solution of methyl 3-aminopicolinate (200 mg, 1.3 mmol) and nonylsulfonyl chloride (296 mg, 1.3 mmol) in DCM (4 ml), TEA (0.85 ml, 6.3 mmol) was added drop-wise and stirred at room temperature. After completion of reaction as indicated by TLC, reaction mixture was quenched with 1 N HCl and extracted with DCM (3×10 ml). The combined organic layer was dried over anhydrous sodium sulphate and evaporated under vacuum. The mixture of R5-0022 and R5-0022-A was dissolved in MeOH (3 ml) and added into 1N NaOH (1 ml). The resulting mixture was stirred at room temperature. After completion of reaction as indicated by TLC, The solvent was removed and quenched with 1 N HCl. The solid was filtered and washed with water. The crude was triturated with diethyl ether to obtain title compound as brown solid (56 mg, 13%).

1H NMR (400 MHz, DMSO-d6) δ 8.81 (s, 1H), 8.41 (d, J=5.0 Hz, 1H), 7.79 (d, J=4.9 Hz, 1H), 3.30-3.35 (m, 2H), 1.74-1.44 (m, 2H), 1.38-1.10 (m, 12H), 0.84 (t, J=6.5 Hz, 3H). MS observed: 329.2(M+H).

Example 1.8: Synthesis of 3-(nonylsulfonamido)picolinic acid

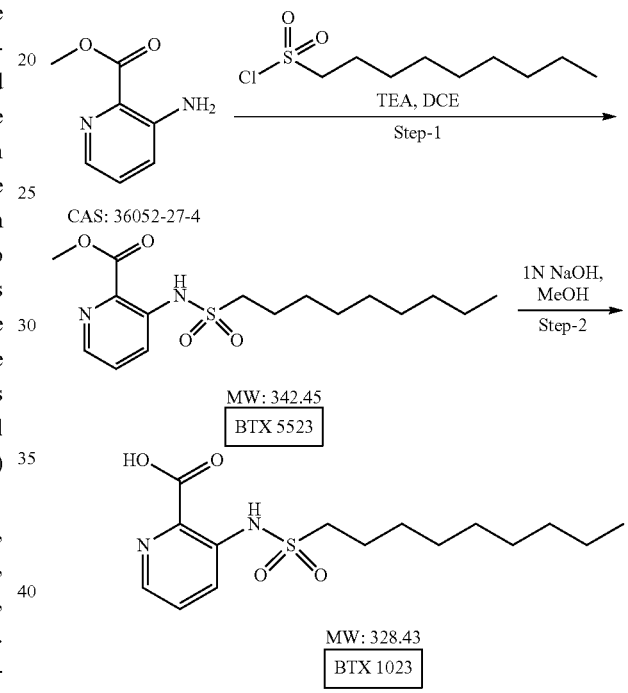

Step-1: methyl 3-(nonylsulfonamido)picolinate: To a solution of methyl 3-aminopicolinate (200 mg, 1.31 mmol) and nonylsulfonyl chloride (297 mg, 1.31 mmol) in DCM (2 ml), TEA (0.92 ml, 6.5 mmol) was added drop-wise and stirred at room temperature. After completion of reaction as indicated by TLC, reaction mixture was quenched with 1 N HCl and extracted with DCM (3×10 ml). The combined organic layer was dried over anhydrous sodium sulphate and evaporated under vacuum. The crude was purified by silica gel column chromatography (20% Ethyl acetate/Hexane) to obtain title compound as off-white solid (100 mg, 22%). 1H NMR (400 MHz, DMSO-d6) δ 10.03 (s, 1H), 8.42 (d, J=4.4 Hz, 1H), 8.00 (d, J=8.5 Hz, 1H), 7.64 (dd, J=8.5, 4.4 Hz, 1H), 3.89 (s, 3H), 3.34-3.26 (m, 2H), 1.71-1.58 (m, 2H), 1.37-1.10 (m, 12H), 0.84 (t, J=6.8 Hz, 3H). MS observed: 343.2(M+H).

Step-2: 3-(nonylsulfonamido)picolinic acid: To a stirred solution of methyl 3-(nonylsulfonamido)picolinate (80 mg, 0.23 mmol) in MeOH (2 ml), 1N NaOH (1 ml) was added and stirred at room temperature for 2 h. After completion of reaction as indicated by TLC, reaction mixture was evaporated under vacuum and neutralized with dilute HCl. The solid was filtered, washed with water and dried under vacuum. The solid was triturated with diethyl ether to obtain title compound as off-white solid (25 mg, 32%) $^1$H NMR (400 MHz, DMSO-d6) δ 8.39 (d, J=4.5 Hz, 1H), 8.13 (d, J=8.6 Hz, 1H), 7.72 (dd, J=8.5, 4.6 Hz, 1H), 3.30-3.35 (m, 2H), 1.72-1.57 (m, 2H), 1.40-1.06 (m, 12H), 0.84 (t, J=6.9 Hz, 3H). MS observed: 329.45(M$^+$H).

Example 1.9: Synthesis of 4-(nonylsulfonamido)nicotinic acid

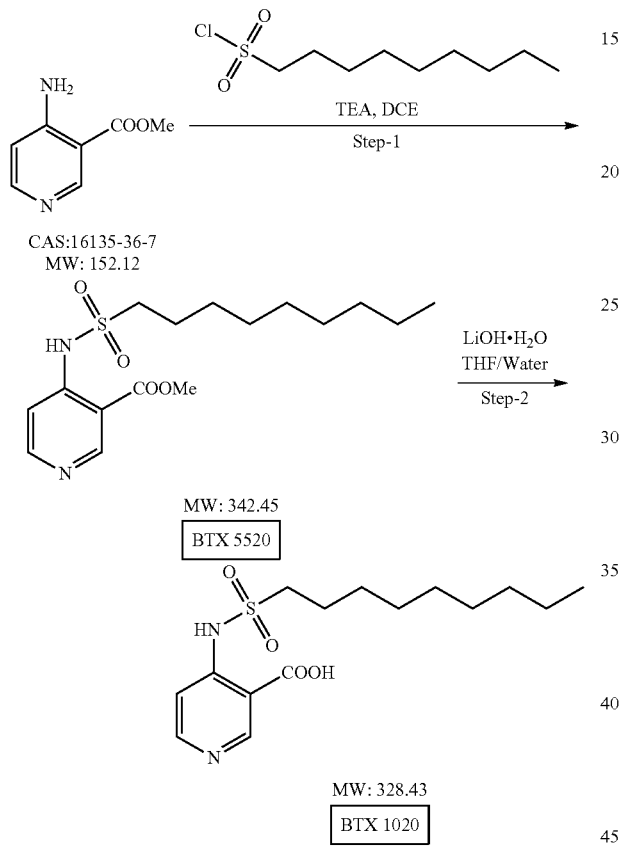

Step-1: methyl 4-(nonylsulfonamido)nicotinate: To a solution of methyl 4-aminonicotinate (250 mg, 1.64 mmol) and nonylsulfonyl chloride (557 mg, 2.46 mmol) in DCM (3 ml), TEA (0.71 ml, 4.9 mmol) was added drop-wise and stirred at room temperature. After completion of reaction as indicated by TLC, reaction mixture was quenched with 1 N HCl and extracted with ethyl acetate (3×10 ml). The combined organic layer was dried over anhydrous sodium sulphate and evaporated under vacuum. The crude was purified by silica gel column chromatography (54% Ethyl acetate/Hexane) to obtain title compound as white solid (120 mg, 21%). $^1$H NMR (400 MHz, CDCl$_3$) δ 10.92 (bs, 1H), 9.17 (s, 1H), 8.58 (d, 1H), 7.80 (d, J=5.4 Hz, 1H), 4.01 (s, 3H), 3.45-3.09 (m, 2H), 1.95-1.76 (m, 2H), 1.50-1.08 (m, 12H), 0.86 (t, J=6.8 Hz, 3H). MS observed: 343.1(M$^+$H).

Step-2: 4-(nonylsulfonamido)nicotinic acid: To a stirred solution of methyl 3-(nonylsulfonamido)picolinate (40 mg, 0.12 mmol) in MeOH:THF (1:1, 4 ml), lithium hydroxide (10 mg, 0.23 mmol) in water (1 ml) was added and stirred at room temperature for 16 h. After completion of reaction as indicated by TLC, reaction mixture was evaporated under vacuum and neutralized with dilute HCl. The product was extracted with ethyl acetate (3×10 ml) and combined organic layer was dried over anhydrous sodium sulphate and concentrated under vacuum to obtain title compound as white solid (13 mg, 34%) $^1$H NMR (400 MHz, DMSO-d6) δ 8.82 (s, 1H), 8.26 (d, J=7.2 Hz, 1H), 7.58 (d, J=7.1 Hz, 1H), 3.22-3.09 (m, 2H), 1.66 (dd, J=7.8 Hz, 2H), 1.35-1.25 (m, 12H), 0.84 (t, J=6.7 Hz, 3H). MS observed: 329.1(M$^+$H).

Example 1.10: Synthesis of 2-(cyclohexanesulfonamido)benzoic acid

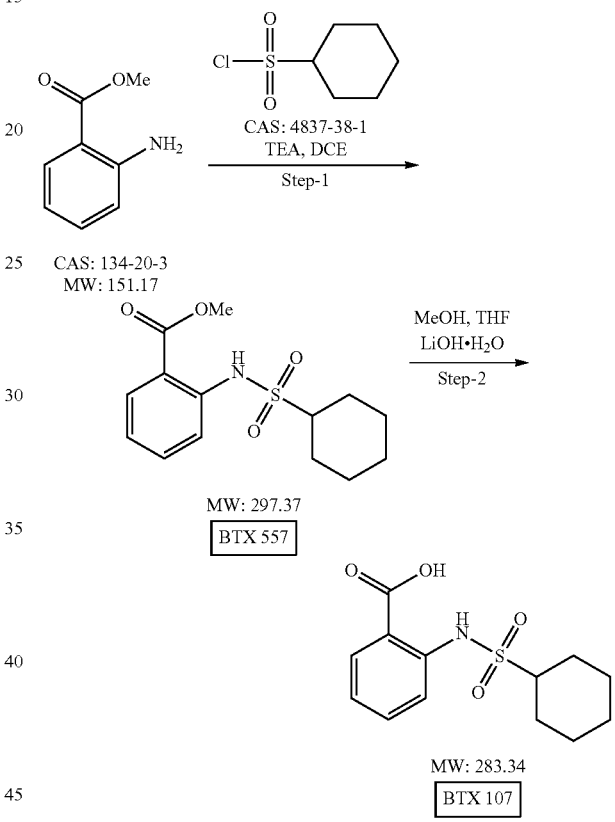

Step-1: methyl 2-(cyclohexanesulfonamido)benzoate: To a solution of methyl 2-aminobenzoate (150 mg, 0.10 mmol) and cyclohexylsulfonyl chloride (181 mg, 0.10 mmol) in DCE (1 ml), TEA (0.92 ml, 6.9 mmol) was added drop-wise and stirred at room temperature for another 1 h. The reaction mixture was quenched with 1N HCl and extracted with ethyl acetate (3×10 ml). The combined organic layer was dried over anhydrous sodium sulphate and evaporated under vacuum. The crude was purified by reverse phase prep HPLC (acetonitrile/water) to obtain title compound as white solid (50 mg, 17%). $^1$H NMR (400 MHz, DMSO-d6) δ 10.21 (s, 1H), 8.16-7.82 (m, 1H), 7.75-7.46 (m, 2H), 7.32-6.96 (m, 1H), 3.88 (s, 3H), 3.29-3.15 (m, 1H), 2.00 (d, J=11.2 Hz, 2H), 1.75 (d, J=13.1 Hz, 2H), 1.63-1.04 (n, 6H). MS observed: 298.45(M$^+$H).

Step-2: 2-(cyclohexanesulfonamido)benzoic acid: To a stirred solution of methyl 2-(cyclohexanesulfonamido)benzoate (45 mg, 0.15 mmol) in MeOH:THF (1:1, 4 ml), lithium hydroxide(6.3 mg, 0.16 mmol) in water (1 ml) was added and stirred at room temperature for 16 h. After completion of reaction as indicated by TLC, reaction mixture was evaporated under vacuum and neutralized with dilute HCl. The product was extracted with DCM (3×10 ml) and combined organic layer was dried over anhydrous sodium sulphate and concentrated under vacuum to obtain title compound as off-white solid (30 mg, 70%). H NMR (400 MHz, DMSO-d6) 8.82 (s, 1H), 8.26 (d, J=7.2 Hz, 1H), 7.58 (d, J=7.1 Hz, 1H), 3.22-3.07 (s, 2H), 1.66 (dd, J=7.8 Hz, 2H), 1.40-1.11 (m, 12H), 0.84 (t, J=6.7 Hz, 3H). MS observed: 282.1(M-H).

The following compounds were prepared by following similar procedure as described for any of examples 1.3-1.10.

TABLE 2

| No | Structure | Code | Analytical data |
|---|---|---|---|
| 1 |  | BTX 551 | $^1$H NMR (400 MHz, CDCl$_3$) δ 10.48 (s, 1H), 8.08 (dd, J = 8.0, 1.5 Hz, 1H), 7.76 (d, J = 8.4 Hz, 1H), 7.63-7.53 (m, 1H), 7.19-7.10 (m, 1H), 3.96 (s, 3H), 3.08 (s, 3H). MS observed: 228.2 (M − H) |
| 2 |  | BTX 552 | $^1$H NMR (400 MHz, DMSO-d6) δ 10.15 (s, 1H), 7.96 (dd, J = 7.9, 1.4 Hz, 1H), 7.71-7.54 (m, 2H), 7.26-7.16 (m, 1H), 3.89 (s, 3H), 3.31-3.25 (m, 2H), 1.69-1.52 (m, J = 7.6 Hz, 2H), 1.40-1.25 (m, 2H), 0.80 (t, J = 7.4 Hz, 3H). MS observed: 270.3 (M − H) |
| 3 |  | BTX 553 | $^1$H NMR (400 MHz, CDCl$_3$) δ 10.44 (s, 1H), 8.06 (dd, J = 8.0, 1.6 Hz, 1H), 7.80-7.70 (m, 1H), 7.59-7.52 (m, 1H), 7.12 (td, J = 8.4, 1H), 3.95 (s, 3H), 3.24-3.07 (m, 2H), 1.89-1.74 (m, 2H), 1.47-1.12 (m, 12H), 0.86 (t, 3H). MS observed: 326 (M − H) |
| 4 |  | BTX 555 | $^1$H NMR (400 MHz, DMSO-d6) δ 10.19 (s, 1H), 7.97 (d, J = 7.5 Hz, 1H), 7.73-7.55 (m, 2H), 7.25-7.12 (m, 1H), 3,89 (s, 3H), 3.47 (hep, J = 6.9 Hz, 1H), 1.24 (d, J = 6.8 Hz, 6H). MS observed: 256.0 (M − H) |
| 5 |  | BTX 556 | $^1$H NMR (400 MHz, DMSO-d6) δ 10.17 (s, 1H), 7.96 (d, J = 7.9 Hz, 1H), 7.73-7.52 (m, 2H), 7.21 (t, J = 7.6 Hz, 1H), 3.88 (s, 3H), 3.20 (d, J = 6.5 Hz, 2H), 2.17-2.03 (m, J = 6.6 Hz, 1H), 0.98 (d, J = 6.7 Hz, 6H). MS observed: 270 (M − H) |
| 6 |  | RBTX 5510 | $^1$H NMR (400 MHz, DMSO-d6) δ 10.09 (s, 1H), 7.94 (dt, J = 7.8 Hz, 1H), 7.66-7.49 (m, 2H), 7.43-7.12 (m, 6H), 4.69 (s, 3H), 3.82 (s, 2H). MS observed: 304.2 (M − H) |

TABLE 2-continued

| No | Structure | Code | Analytical data |
|---|---|---|---|
| 7 | | BTX 5512 | $^1$H NMR (400 MHz, CDCl3) δ 10.92 (s, 1H), 9.18 (s, 1H), 8.61 (s, 1H), 7.72 (d, 1H), 3.98 (s, 3H), 3.20 (s, 3H). MS observed: 231.0 (M + H) |
| 8 | | BTX 5514 | $^1$H NMR (400 MHz, DMSO-d6) δ 9.74 (s, 1H), 8.78 (s, 1H), 8.52 (d, J = 5.0 Hz, 1H), 7.73 (d, J = 5.1 Hz, 1H), 3.89 (s, 3H), 3.17 (s, 3H). MS observed: 231.24 (M + H) |
| 9 | | BTX 5518 | $^1$H NMR (400 MHz, DMSO-d6) δ 9.76 (s, 1H), 8.79 (s, 1H), 8.50 (d, J = 5.0 Hz, 1H), 7.73 (d, J = 5.0 Hz, 1H), 3.89 (s, 3H), 3.33-3.26 (m, 2H), 1.72-1.57 (m, 2H), 1.44-1.31 (m, 2H), 0.85 (t, J = 7.4 Hz, 3H). MS observed: 273.1 (M + H) |
| 10 | | BTX 5519 | $^1$H NMR (400 MHz, DMSO-d6) δ 10.02 (s, 1H), 8.42 (s, 1H), 8.00 (d, J = 8.4 Hz, 1H), 7.69-7.61 (m, 1H), 3.89 (s, 2H), 1.72-1.58 (m, J = 7.5 Hz, 2H), 1.42-1.31 (m, 2H), 0.84 (t, J = 7.3 Hz, 3H). MS observed: 273.1.1 (M + H) |
| 11 | | BTX5524 | $^1$H NMR (400 MHz, DMSO-d6) δ 9.99 (s, 1H), 7.78 (s, 1H), 7.59-7.41 (m, 2H), 3.87 (s, 3H), 3.28-3.17 (m, 2H), 2.30 (s, 3H), 1.66-1.50 (m, 2H), 1.33-1.07 (m, 12H), 0.84 (t, J = 6.9 Hz, 3H). MS observed: 356.56 (M + H) |
| 12 | | BTX5525 | $^1$H NMR (400 MHz, DMSO-d6) δ 9.67 (s, 1H), 7.50 (d, J = 9.0 Hz, 1H), 7.38 (d, J = 3.0 Hz, 1H), 7.25 (dd, J = 9.0, 3.1 Hz, 1H), 3.87 (s, 3H), 3.78 (s, 3H), 3.20-2.98 (m, 2H), 1.68-1.48 (m, 2H), 1.38-1.06 (m, 12H), 0.84 (t, J = 6.9 Hz, 3H). MS observed: 372.46 (M + H) |
| 14 | | BTX5530 | $^1$H NMR (400 MHz, DMSO-d6) δ 10.05 (s, 1H), 7.91 (d, J = 2.6 Hz, 1H), 7.72 (dd, J = 8.9, 2.6 Hz, 1H), 7.61 (d, J = 8.9 Hz, 1H), 3.89 (s, 3H), 3.33-3.25 (m, 2H), 1.62 (dt, J = 7.6 Hz, 2H), 1.35-1.11 (m, 12H), 0.84 (t, J = 6.9 Hz, 3H). MS observed: 374.38 (M − H) |

Table—3

TABLE 3

| No | Structure | Code | Analytical data |
|---|---|---|---|
| 1 | (2-(methanesulfonamido)benzoic acid) | BTX 601 | $^1$H NMR (400 MHz, DMSO-d6) δ 13.91 (bs, 1H), 10.70 (bs, 1H), 8.00 (dd, J = 7.9, 1.3 Hz, 1H), 7.70-7.53 (m, 2H), 7.17 (t, J = 7.5 Hz, 1H), 3.19 (s, 3H). MS observed: 214.2 (M − H) |
| 2 | (2-(butylsulfonamido)benzoic acid) | BTX 102 | $^1$H NMR (400 MHz, DMSO-d6) δ 14.47 (bs, 1H), 11.21 (bs, 1H), 8.55-8.41 (m, 1H), 8.21-7.96 (m, 2H), 7.74-7.56 (m, 1H), 3.80-3.68 (m, 2H), 2.15-1.97 (m, 2H), 1.90-1.72 (m, 2H), 1.26 (t, J = 7.3 Hz, 3H). MS observed: 256.3 (M − H) |
| 3 | (2-(octylsulfonamido)benzoic acid) | BTX 103 | $^1$H NMR (400 MHz, DMSO-d6) δ 14.03 (bs, 1H), 10.86 (bs, 1H), 8.00 (d, J = 8.0 Hz, 1H), &.65-7.55 (m, 2H), 7.17 (d, J = 7.7 Hz, 1H), 3.33-3.18 (m, 2H), 1.65-1.55 (m, 2H), 1.37-1.01 (m, 10H), 0.81 (t, J = 6.9 Hz, 3H). MS observed: 312.4 (M − H) |
| 4 | (2-(isopropylsulfonamido)benzoic acid) | BTX205 | $^1$H NMR (400 MHz, DMSO-d6) δ 14.49 (bs, 1H), 11.23 (bs, 1H), 8.47 (d, J = 7.6 Hz, 1H), 8.18-7.99 (m, 2H), 7.63 (t, J = 7.4 Hz, 1H), 3.90 (hept, J = 6.7 Hz, 1H), 1.70 (d, J = 6.8 Hz, 6H). MS observed: 244.0 (M + H) |
| 5 | (2-(isobutylsulfonamido)benzoic acid) | BTX 106 | $^1$H NMR (400 MHz, DMSO-d6) δ 13.99 (bs, 1H), 10.79 (bs, 1H), 8.00 (dd, J = 7.9, 1.4 Hz, 1H), 7.69-7.53 (m, 2H), 7.16 (t, 1H), 3.20 (d, J = 6.5 Hz, 2H), 2.15-2.05 (m, 1H), 0.97 (d, J = 6.7 Hz, 6H). MS observed: 256.1 (M − H) |
| 6 | (2-(benzylsulfonamido)benzoic acid) | BTX 1010 | $^1$H NMR (400 MHz, DMSO-d6) δ 10.95 (bs, 1H), 7.98 (d, J = 8.2 Hz, 1H), 7.61-7.52 (m, 2H), 7.37-7.26 (m, 3H), 7.24-7.07 (m, 3H), 4.67 (s, 2H). MS observed: 290.0 (M − H) |
| 7 | (4-(methanesulfonamido)nicotinic acid) | BTX1012 | $^1$H NMR (400 MHz, DMSO-d6) δ 15.83 (bs, 1H), 13.70 (bs, 1H), 8.83 (s, 1H), 8.29 (d, J = 6.9 Hz, 1H), 7.57 (d, J = 7.1 Hz, 1H), 3.09 (s, 3H), MS observed: 217.0 (M + H) |
| 8 | (3-(methanesulfonamido)isonicotinic acid) | BTX1014 | $^1$H NMR (400 MHz, DMSO-d6) δ 8.79 (s, 1H), 8,40 (d, J = 4.9 Hz, 1H), 7.79 (d, J = 4.8 Hz, 1H), 3.18 (s, 3H). MS observed: 215.20 (M − H) |

TABLE 3-continued

| No | Structure | Code | Analytical data |
|---|---|---|---|
| 9 | 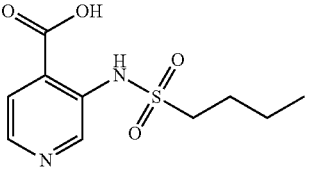 [SMILES: CCCCS(=O)(=O)Nc1cnccc1C(=O)O] | BTX1018 | $^1$H NMR (400 MHz, DMSO-d6) δ 8.70 (s, 1H), 8.22 (d, J = 4.8 Hz, 1H), 7.74 (d, J = 4.8 Hz, 1H), 3.19-3.04 (m, 2H), 1.64-1.51 (m, 2H), 1.38-1.24 (m, 2H), 0.79 (t, J = 7.4 Hz, 3H). MS observed: 259.1 (M + H) |
| 10 | 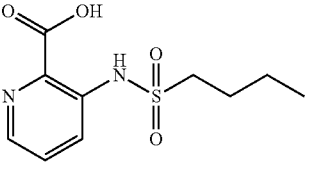 [SMILES: CCCCS(=O)(=O)Nc1cccnc1C(=O)O] | BTX1019 | $^1$H NMR (400 MHz, DMSO-d6) δ 8.39 (d, J = 4.2 Hz, 1H), 8.12 (d, J = 8.6 Hz, 1H), 7.71 (dd, J = 8.3, 4.6 Hz, 1H), 3.35-3.30 (m, 2H), 1.72-1.55 (m, 2H), 1.40-1.30 (m, 2H), 0.82 (t, J = 7.3 Hz, 3H). MS observed: 259.1 (M + H) |
| 11 | 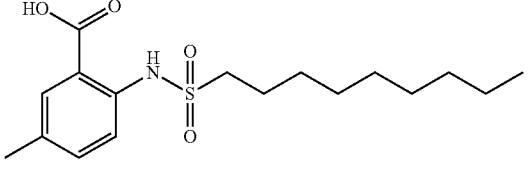 [SMILES: CCCCCCCCCS(=O)(=O)Nc1ccc(C)cc1C(=O)O] | BTX1024 | $^1$H NMR (400 MHz, DMSO-d6) δ 13.95 (bs, 1H), 10.65 (bs, 1H), 7.82 (s, 1H), 7.50 (d, J = 8.4 Hz, 1H), 7.44 (d, J = 8.4 Hz, 1H), 3.26-3.16 (m, 2H), 2.29 (s, 3H), 1.65-1.49 (m, 2H), 1.34-1.05 (m, 12H), 0.84 (t, J = 7.0 Hz, 3H). MS observed: 342.3 (M + H) |
| 12 | 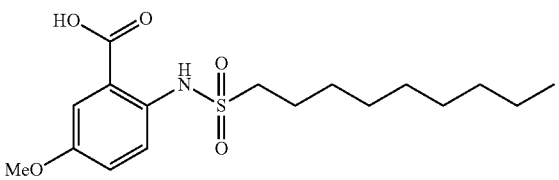 [SMILES: CCCCCCCCCS(=O)(=O)Nc1ccc(OC)cc1C(=O)O] | BTX1025 | $^1$H NMR (400 MHz, DMSO-d6) δ 14.06 (bs, 1H), 10.34 (bs, 2H), 7.53 (d, J = 9.1 Hz, 1H), 7.46 (d, J = 3.1 Hz, 1H), 7.25 (dd, J = 9.1, 3.1 Hz, 1H), 3.77 (s, 3H), 3.21-3.08 (m, 2H), 1.65-1.50 (m, 2H), 1.34-1.04 (m, 12H), 0.84 (t, J = 7.0 Hz, 3), MS observed: 356.42 (M − H) |
| 13 | 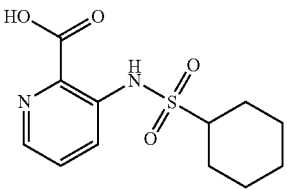 [SMILES: O=C(O)c1ncccc1NS(=O)(=O)C1CCCCC1] | BTX1029 | $^1$H NMR (400 MHz, DMSO-d6) δ 11.54 (bs, 1H), 8.38 (d, J = 4.0 Hz, 1H), 8.21 (d, J = 8.6 Hz, 1H), 7.73 (dd, J = 8.5, 4.5 Hz, 1H), 3.35-3.30 (m, 1H), 2.12-1.94 (m, 2H), 1.85-1.67 (m, 2H), 1.64-1.06 (m, 6H). MS observed: 284.90 (M + H) |
| 14 | 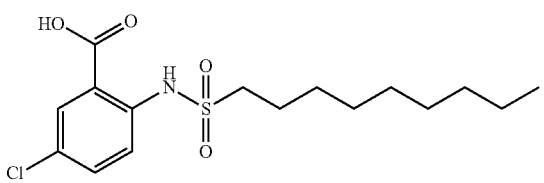 [SMILES: CCCCCCCCCS(=O)(=O)Nc1ccc(Cl)cc1C(=O)O] | BTX1030 | $^1$H NMR (400 MHz, DMSO-d6) δ 10.71 (bs, 1H), 7.94 (d, J = 2.6 Hz, 1H), 7.70 (dd, J = 8.9, 2.6 Hz, 1H), 7.65-7.59 (m, J = 8.9 Hz, 1H), 3.37-3.23 (m, 2H), 1.61 (dt, J = 7.6 Hz, 2H), 1.37-1.06 (m, 12H), 0.84 (t, J = 7.0 Hz, 3H). MS observed: 360.5 & 362.1 (M − H) |

Synthesis of N-(2-(1H-tetrazol-5-yl)phenyl)nonane-1-sulfonamide

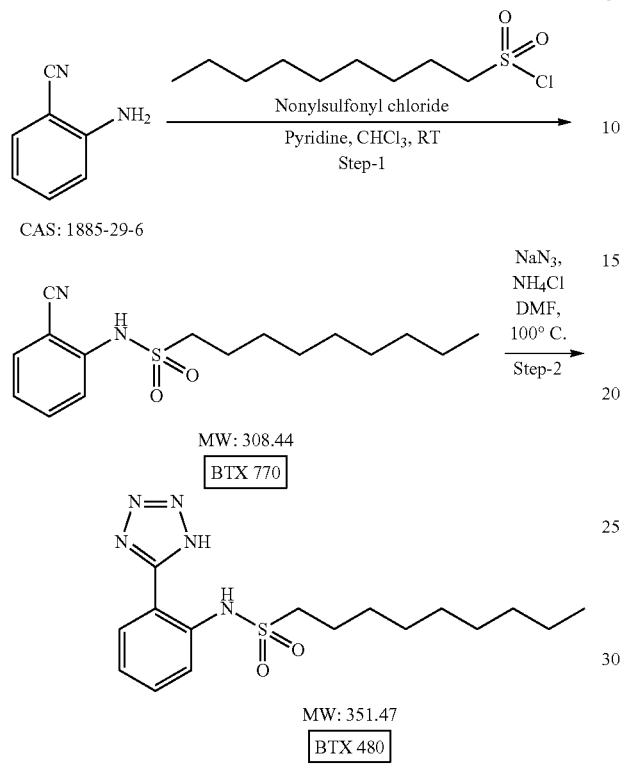

Step-1: Synthesis of N-(2-cyanophenyl)nonane-1-sulfonamide

To a solution of methyl 2-aminobenzonitrile (336 mg, 2.80 mmol) in chloroform(3 ml) was added nonylsulfonyl-chloride (500 mg, 2.2 mmol) and pyridine (0.5 ml, 6.30 mmol) at room temperature and stirred at reflux for 16 h. The reaction mixture was poured in to dilute HCl and extracted with DCM (3×15 ml). The combined organic layer was washed with sodium bicarbonate, brine, dried over sodium sulphate and evaporated under vacuum. The crude was purified by column chromatography (20% ethyl acetate/hexane) followed by trituration with diethyl ether/n-pentane to obtain title compound as off-white solid (170 mg, 19%). $^1$H NMR (400 MHz, DMSO-d6) δ 10.09 (s, 1H), 7.84 (dd, J=7.8, 1H), 7.73-7.67 (m, 1H), 7.48 (d, J=7.8 Hz, 1H), 7.41 (td, J=7.7, 1H), 3.20-3.10 (m, 2H), 1.73 (dt, J=7.6 Hz, 2H), 1.28-1.16 (m, 12H), 0.84 (t, J=6.8 Hz, 3H). MS observed: 307.4(M-H)

Step-2: Synthesis of N-(2-(1H-tetrazol-5-yl)phenyl) nonane-1-sulfonamide

A mixture of N-(2-cyanophenyl)nonane-1-sulfonamide (80 mg, 0.26 mmol), sodium azide (67 mg, 1 mmol) and ammonium chloride (53 mg, 1 mmol) in DMF (2 ml) was heated at 100° C. for 1 h. After completion of reaction as indicated by TLC, reaction mixture was quenched with HCl. The solid was filtered, washed with water and dried under vacuum to obtain title compound as off-white solid (45 mg, 49%). $^1$H NMR (400 MHz, DMSO-d6) δ 10.52 (s, 1H), 7.99 (d, J=7.9 Hz, 1H), 7.68 (d, J=8.2 Hz, 1H), 7.57 (t, J=7.2 Hz, 1H), 7.32 (t, J=7.2 Hz, 1H), 3.28-3.18 (m, 2H), 1.55 (dt, J=7.7 Hz, 2H), 1.34-1.01 (m, 12H), 0.82 (t, J=7.0 Hz, 3H). MS observed: 352.2(M$^+$H)

Synthesis of N-(2-cyanophenyl)cyclohexanesulfonamide

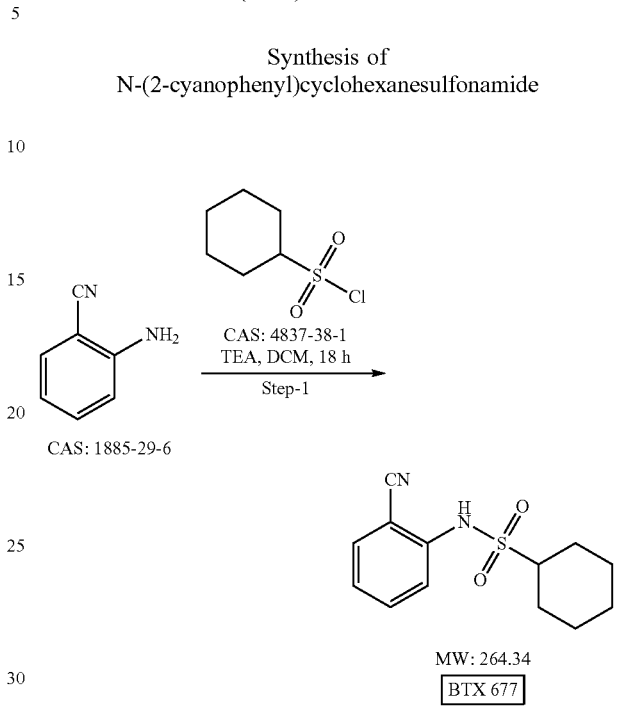

To a solution of 2-aminobenzonitrile (300 mg, 2.50 mmol) and cyclohexylsulfonyl chloride (460 mg, 2.5 mmol) in DCM, TEA (1.75 ml, 12.7 mmol) was added and stirred at room temperature for 16 h.

The reaction mixture was poured in to dilute HCl and extracted with DCM (3×15 ml).

The combined organic layer was washed with sodium bicarbonate, brine, dried over anhydrous sodium sulphate and evaporated under vacuum. The crude was purified by silica gel column chromatography reverse phase prep HPLC (acetonitrile/water) to obtain title compound as off white solid (5 mg). $^1$H NMR (400 MHz, DMSO-d6) δ 10.07 (s, 1H), 7.85-7.60 (m, 2H), 7.49 (d, J=7.8 Hz, 1H), 7.41-7.27 (m, 1H), 3.10-2.92 (m, 1H), 2.20-2.00 (m, 2H), 1.83-1.68 (m, 2H), 1.65-1.02 (m, 6H). MS observed: 263.2(M-H)

Synthesis of N-(2-(1H-tetrazol-5-yl)phenyl)cyclo-hexanesulfonamide

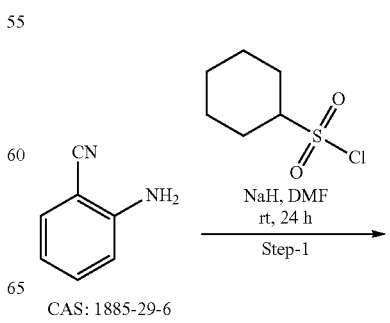

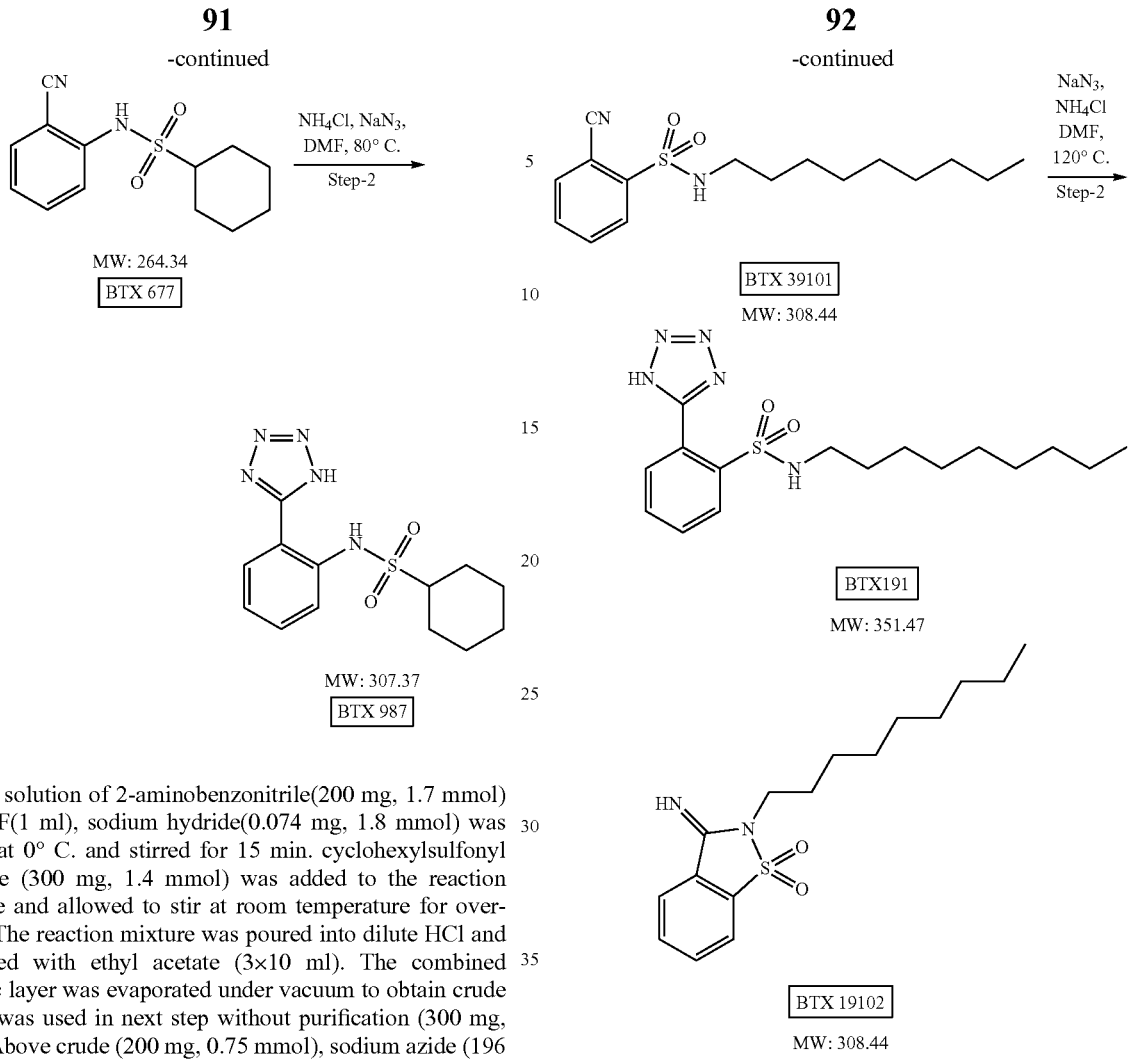

To a solution of 2-aminobenzonitrile(200 mg, 1.7 mmol) in DMF(1 ml), sodium hydride(0.074 mg, 1.8 mmol) was added at 0° C. and stirred for 15 min. cyclohexylsulfonyl chloride (300 mg, 1.4 mmol) was added to the reaction mixture and allowed to stir at room temperature for overnight. The reaction mixture was poured into dilute HCl and extracted with ethyl acetate (3×10 ml). The combined organic layer was evaporated under vacuum to obtain crude which was used in next step without purification (300 mg, 68%) Above crude (200 mg, 0.75 mmol), sodium azide (196 mg, 3.0 mmol) and ammonium chloride (160 mg, 3.0 mmol) in DMF (4 ml) was heated at 80° C. for 2 h. After completion of reaction as indicated by TLC, reaction mixture was quenched with HCl. It was extracted with ethyl acetate (3×10 ml) and concentrated under vacuum. The crude was purified by reverse phase prep HPLC (acetonitrile/water) to obtain title compound as yellow solid (89 mg, 40%)

$^1$H NMR (400 MHz, DMSO-d6) δ 7.98 (d, J=7.7 Hz, 1H), 7.71 (d, J=7.6 Hz, 1H), 7.60-7.51 (m, 1H), 7.33-7.26 (m, 1H), 3.24-3.11 (m, 1H), 1.92 (d, J=11.2 Hz, 2H), 1.69 (d, J=11.3 Hz, 2H), 1.59-0.99 (m, 6H). MS observed: 306.3(M-H)

Synthesis of 2-cyano-N-nonylbenzenesulfonamide and N-nonyl-2-(1H-tetrazol-5-yl)benzene sulfonamide

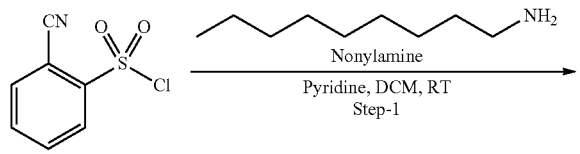

Step-1: Synthesis of 2-cyano-N-nonylbenzenesulfonamide and 3-imino-2-nonyl-2,3-dihydrobenzo[d]isothiazole 1,1-dioxide To a solution of 2-cyanobenzenesulfonyl chloride (300 mg, 1.49 mmol) and nonyl amine (213 mg, 1.40 mmol) in DCM (5 ml), pyridine (0.35 ml, 4.40 mmol) was added at room temperature. The resulting reaction mixture was stirred at room temperature for 8 h. The reaction mixture was poured into dilute HCl and extracted with DCM (3×10 ml). The combined organic layer was washed with water, dried over anhydrous sodium sulphate and evaporated under vacuum. The crude was purified by silica gel column chromatography to obtain following two compounds as off white solid.

R9-0001-A2: $^1$H NMR (400 MHz, DMSO-d6) δ 9.74 (s, 1H), 8.38 (d, J=7.6 Hz, 1H), 8.13 (d, J=7.4 Hz, 1H), 7.99-7.81 (m, 2H), 3.68 (t, J=7.3 Hz, 2H), 1.80-1.68 (m, 2H), 1.35-1.14 (m, 12H), 0.83 (t, J=6.4 Hz, 3H). MS observed: 309(M$^+$H)

R9-0001-A1: $^1$H NMR (400 MHz, DMSO-d6) δ 8.12-8.04 (m, 2H), 8.00 (d, J=7.9 Hz, 1H), 7.91 (t, J=7.7 Hz, 1H), 7.84-7.78 (m, 1H), 2.88 (dd, J=12.9, 6.6 Hz, 2H), 1.43-1.05 (m, 14H), 0.84 (t, J=6.8 Hz, 3H). MS observed: 309.5(M$^+$H)

Step-2: Synthesis of N-nonyl-2-(1H-tetrazol-5-yl)benzenesulfonamide

A mixture of 2-cyano-N-nonylbenzenesulfonamide (90 mg, 0.29 mmol), sodium azide (75 mg, 1.16 mmol) and ammonium chloride (61 mg, 1.16 mmol) in DMF (3 ml) was heated at 80° C. for 4 h. After completion of reaction as indicated by TLC, reaction mixture was poured into 1 N HCl. The solid was filtered, washed with water and dried under vacuum. The crude was purified by silica gel column chromatography (MeOH: DCM) to obtain title compound as off white solid (27 mg, 26%).

$^1$H NMR (400 MHz, DMSO-d6) δ 9.48 (s, 1H), 8.03-7.92 (m, 2H), 7.68 (t, J=7.5 Hz, 1H), 7.56 (t, J=7.7 Hz, 1H), 2.87-2.76 (m, 2H), 1.50-1.33 (m, 2H), 1.28-1.05 (m, 12H), 0.82 (t, J=7.0 Hz, 3H). MS observed: 352.2(M$^+$H)

Following targets were prepared by following similar procedure as described for above examples.

TABLE 4

| No | Structure | Code | Analytical data |
|---|---|---|---|
| 1 | | BTX 671 | $^1$H NMR (400 MHz, DMSO-d6) δ 10.05 (s, 1H), 7.85 (d, J = 7.7 Hz, 1H), 7.71 (t, J = 7.8 Hz, 1H), 7.50 (d, J = 8.1 Hz, 1H), 7.42 (t, J = 7.6 Hz, 1H), 3.09 (s, 3H). MS observed: 195.1 (M − H) |
| 2 | | BTX672 | $^1$H NMR (400 MHz, DMSO-d6) δ 10.09 (s, 1H), 7.84 (d, J = 7.8 Hz, 1H), 7.70 (t, J = 7.9 Hz, 1H), 7.48 (d, J = 8.3 Hz, 1H), 7.40 (t, J = 7.6 Hz, 1H), 3.22-3.06 (m, 2H), 1.79-1.63 (m, 2H), 1.46-1.30 (m, 2H), 0.87 (t, J = 7.3 Hz, 3H). MS observed: 237.0 (M − H) |
| 3 | | BTX 773 | $^1$H NMR (400 MHz, DMSO-d6) δ 10.08 (s, 1H), 7.84 (dd, J = 7.7, 1.4 Hz, 1H), 7.70 (td, J = 8.2, 1.6 Hz, 1H), 7.48 (d, J = 8.2 Hz, 1H), 7.41 (td, J = 7.7, 1.0 Hz, 1H), 3.22-3.11 (m, 2H), 1.81-1.66 (m, 2H), 1.45-1.10 (m, 10H), 0.84 (t, J = 6.8 Hz, 3H). MS observed: 293.3 (M − H) |
| 4 | | BTX 675 | $^1$H NMR (400 MHz, DMSO-d6) δ 10.10 (s, 1H), 7.83 (d, J = 7.8 Hz, 1H), 7.69 (t, J = 7.9 Hz, 1H), 7.51 (d, J = 8.2 Hz, 1H), 7.39 (t, J = 7.7 Hz, 1H), 3.40-3.20 (m, 1H), 1.30 (d, J = 6.8 Hz, 6H). MS observed: 223.1 (M − H) |
| 5 | | BTX 676 | $^1$H NMR (400 MHz, DMSO-d6) δ 10.10 (s, 1H), 7.82 (d, J = 7.8 Hz, 1H), 7.73-7.65 (m, 1H), 7.47 (d, J = 8.0 Hz, 1H), 7.38 (s, 1H), 3.06 (d, J = 6.3 Hz, 1H), 2.26-2.09 (m, 2H), 1.02 (d, J = 6.7 Hz, 6H). MS observed: 237.4 (M − H) |
| 6 | | BTX 678 | $^1$H NMR (400 MHz, DMSO-d6) δ 10.08 (s, 1H), 7.83 (d, J = 7.3 Hz, 1H), 7.69 (t, J = 7.4 Hz, 1H), 7.51 (d, J = 8.0 Hz, 1H), 7.39 (t, J = 7.5 Hz, 1H), 3.75 (t, J = 6.1 Hz, 2H), 3.58-3.37 (m, 4H), 1.04 (t, J = 6.9 Hz, 3H). MS observed: 253.3 (M − H) |
| 7 | | BTX 679 | $^1$H NMR (400 MHz, DMSO-d6) δ 10.84 (s, 1H), 7.87 (d, J = 7.7 Hz, 1H), 7.72 (t, J = 7.7 Hz, 1H), 7.55 (d, J = 8.4 Hz, 1H), 7.47 (d, J = 7.7 Hz, 1H), 4.70-4.54 (m, J = 9.5 Hz, 2H). MS observed: 263.2 (M − H) |
| 8 | | BTX6710 | $^1$H NMR (400 MHz, DMSO-d6) δ 10.16 (s, 1H), 7.80 (d, J = 7.6 Hz, 1H), 7.59 (d, J = 8.1 Hz, 1H), 7.45-7.26 (m, 7H), 4.56 (s. 2H). MS observed: 271.3 (M − H) |

TABLE 5

| No | Structure | Code | Analytical data |
|---|---|---|---|
| 1 | | BTX 281 | $^1$H NMR (400 MHz, DMSO-d6) δ 10.35 (s, 1H), 7.97 (d, J = 7.9 Hz, 1H), 7.66 (d, J = 8.0 Hz, 1H), 7.58 (dd, J = 6.3 Hz, 1H), 7.35 (t, J = 7.6 Hz, 1H), 3.13 (s, 3H). MS observed: 240.1 (M − H) |
| 2 | | BTX 982 | $^1$H NMR (400 MHz, DMSO-d6) δ 10.35 (s, 1H), 7.97 (d, J = 7.7 Hz, 1H), 7.69 (d, J = 8.2 Hz, 1H), 7.59 (t, J = 7.8 Hz, 1H), 7.34 (t, J = 7.6 Hz, 1H), 3.29-3.19 (m, 2H), 1.62-1.49 (m, 2H), 1.36-1.21 (m, 2H), 0.74 (t, J = 7.3 Hz, 3H). MS observed: 281.9 (M + H) |
| 3 | | BTX 483 | $^1$H NMR (400 MHz, DMSO-d6) δ 11.06 (bs, 1H), 8.05 (d, J = 7.6 Hz, 1H), 7.65 (d, J = 8.4 Hz, 1H), 7.49 (t, J = 8.4 Hz, 1H), 7.26 (t, J = 6.8 Hz, 1H), 3.20-3.16 (m, 2H), 1.54-1.50 (m, 2H), 1.20-1.05 (m, 10H), 0.79 (t, J = 6.8 Hz, 3H). MS observed: 336.3 (M − H) |
| 4 | | BTX 985 | $^1$H NMR (400 MHz, DMSO-d6) δ 10.69 (s, 1H), 8.07-7.98 (m, 1H), 7.78-7.72 (m, 1H), 7.58-7.50 (m, 1H), 7.35-7.25 (m, 1H), 3.50-3.30 (m, 1H), 1.20 (d, 6H). MS observed: 266.3 (M − H) |
| 5 | | BTX 986 | $^1$H NMR (400 MHz, DMSO-d6) δ 10.44 (s, 1H), 7.97 (d, J = 7.8 Hz, 1H), 7.66 (d, J = 8.3 Hz, 1H), 7.58 (t, J = 7.7 Hz, 1H), 7.32 (t, J = 7.4 Hz, 1H), 3.15 (d, J = 6.4 Hz, 2H), 2.12-2.00 (m, 1H), 0.93 (d, J = 6.6 Hz, 6H). MS observed: 280.3 (M − H) |
| 6 | | BTX988 | $^1$H NMR (400 MHz, DMSO-d6) δ 10.47 (bs, 1H), 7.97 (d, J = 7.8 Hz, 1H), 7.71 (d, J = 8.2 Hz, 1H), 7.58 (t, J = 7.9 Hz, 1H), 7.31 (t, J = 7.4 Hz, 1H), 3.62 (d, J = 5.1 Hz, 2H), 3.53 (d, J = 5.1 Hz, 2H), 3.20-3.07 (q, 2H), 0.72 (t, J = 6.9 Hz, 3H). MS observed: 298.3 (M + H) |
| 7 | | BTX 989 | $^1$H NMR (400 MHz, DMSO-d6) δ 8.17 (d, J = 7.8 Hz, 1H), 7.59 (d, J = 8.2 Hz, 1H), 7.40-7.33 (m, 1H), 7.24-7.17 (m, 1H), 4.66 (dd, 2H). MS observed: 308.1 (M + H) |

TABLE 5-continued

| No | Structure | Code | Analytical data |
|---|---|---|---|
| 8 | 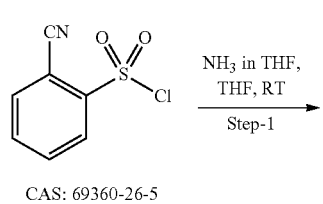 | BTX 9810 | $^1$H NMR (400 MHz, DMSO-d6) δ 10.35 (s, 1H), 7.96 (d, J = 7.7 Hz, 1H), 7.67 (d, J = 8.2 Hz, 1H), 7.55 (t, J = 7.7 Hz, 1H), 7.32 (t, J = 7.5 Hz, 1H), 7.25-7.08 (m, 5H), 4.64 (s, 2H), MS observed: 314.3 (M − H) |

Synthesis of 2-cyanobenzenesulfonamide and 3-aminobenzo[d]isothiazole 1,1-dioxide

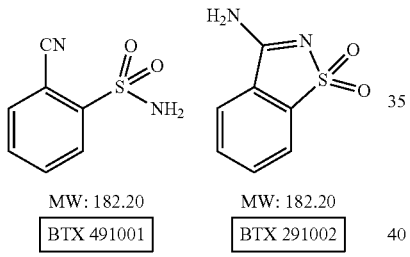

CAS: 69360-26-5

Synthesis of 2-cyano-N-nonylbenzenesulfonamide and 3-imino-2-nonyl-2,3-dihydrobenzo[d]isothiazole 1,1-dioxide A solution of 2-cyanobenzenesulfonyl chloride (300 mg, 1.49 mmol) in THF (5 ml) was added to a saturated solution of ammonia in THF (10 ml) at room temperature. The resulting reaction mixture was stirred at room temperature for 2 h. The reaction mixture was quenched with sodium bicarbonate solution and extracted with ethyl acetate (3×20 ml). The combined organic layer was washed with dilute HCl (10 ml), brine (10 ml) dried over anhydrous sodium sulphate and evaporated under vacuum. The crude was purified by silica gel column chromatography (20-50% Ethyl acetate/Hexane) to obtain Int-B1 (135 mg, 49%) and Int-B2 (110 mg, 40%) as white solid.

R9-0001-B1: $^1$H NMR (400 MHz, DMSO-d6) δ 8.10-8.00 (m, 2H), 7.90 (td, J=7.8, 1.3 Hz, 1H), 7.85 (s, 2H), 7.78 (td, J=7.6, 1.2 Hz, 1H). MS observed: 181.2(M-H)

R9-0001-B2: $^1$H NMR (400 MHz, DMSO-d6) δ 8.93 (s, 2H), 8.13 (dd, J=7.3, 3.6 Hz, 1H), 7.96 (dd, J=6.7, 3.7 Hz, 1H), 7.88-7.78 (m, 2H). MS observed: 181.2(M-H)

Synthesis of 2-(N-nonylsulfamoyl)benzoic acid

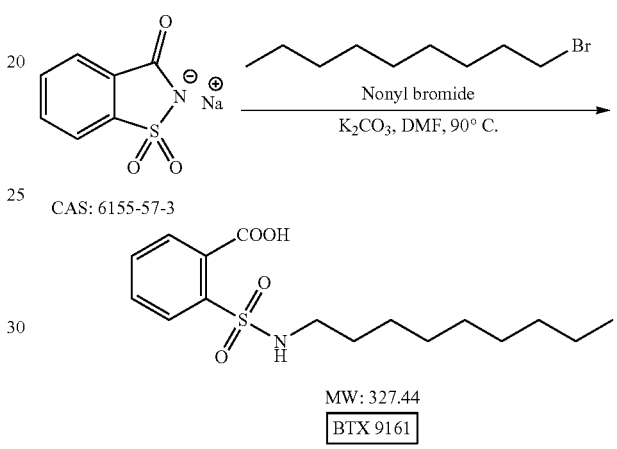

CAS: 6155-57-3

BTX 9161

A mixture of sodium 3-oxo-3H-benzo[d]isothiazol-2-ide 1,1-dioxide (200 mg, 0.97 mmol), K2CO$_3$ (67 mg, 0.48 mmol) stirred in DMF(2 ml) for 30 min at room temperature. Nonyl bromide (201 mg, 0.97 mmol) was added to the reaction mixture and heated at 90° C. for 3 h. After completion of reaction as indicated by TLC, reaction mixture was poured into cold water and extracted with ethyl acetate (3×15 ml). The combined organic layer was dried over sodium sulphate and evaporated under vacuum. The crude was purified by column chromatography to obtain title compound as Pale yellow gummy solid (221 mg, 69%). $^1$H NMR (400 MHz, DMSO-d6) δ 8.30 (d, J=7.7 Hz, 1H), 8.10 (d, J=6.8 Hz, 1H), 8.07-7.95 (m, 2H), 3.69 (t, J=7.3 Hz, 2H), 1.70 (dt, J=7.1 Hz, 2H), 1.43-1.15 (m, 12H), 0.83 (t, J=6.8 Hz, 3H). MS observed: 326(M-H)

Synthesis of 2-amino-N-((trifluoromethyl)sulfonyl)benzamide

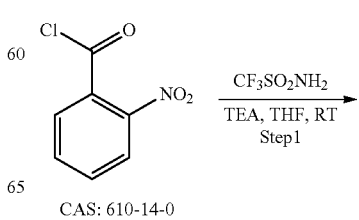

CAS: 610-14-0

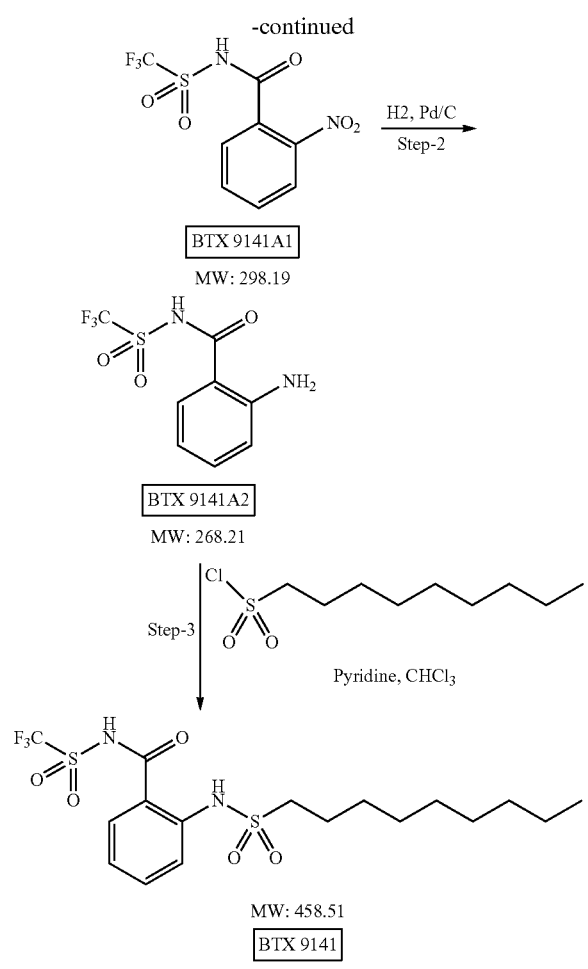

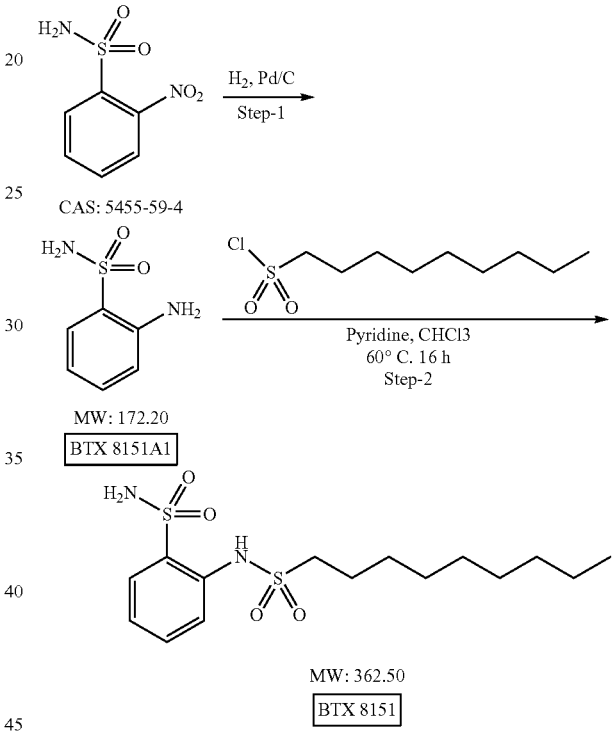

Step-1: Synthesis of 2-nitro-N-((trifluoromethyl)sulfonyl)benzamide

A solution of trifluoromethansulfonamide (401 mg, 2.7 mmol) and TEA (1 ml, 7.7 mmol) in THF (2 ml) was added to a pre-stirred solution of 2-nitrobenzoyl chloride (500 mg, 2.7 mmol) in THF (3 ml) at room temperature. Resulting reaction mixture was stirred for 1 h. After completion of reaction as indicated by TLC, reaction mixture was poured into sodium bicarbonate (10 ml) and extracted with ethyl acetate (3×10 ml). The combined organic layer was dried over sodium sulphate and evaporated under vacuum to obtain title compound as crude (1 g). This crude was dissolved in MeOH (8 ml) and purged with nitrogen. 10% Pd/C (50% wet, 100 mg) was charged and stirred the reaction mixture under hydrogen balloon pressure for 2 h. After completion of reaction as indicated by TLC, reaction mixture was filtered through a bed of celite and washed with methanol. The filtrate was evaporated under vacuum to obtain 2-amino-N-((trifluoromethyl)sulfonyl)benzamide (900 mg, 100%). MS observed: 269(M$^+$H)

Step-3: 2-(nonylsulfonamido)—N-((trifluoromethyl)sulfonyl)benzamide

To a solution of 2-amino-N-((trifluoromethyl)sulfonyl) benzamide (200 mg, 0.67 mmol) in chloroform(3 ml) was added nonylsulfonyl chloride(151 mg, 0.67 mmol) and pyridine(0.40 ml, 5.0 mmol) at room temperature and stirred for 24 h at 50° C. The reaction mixture was poured in to dilute HCl and extracted with ethyl acetate (3×10 ml). The combined organic layer was dried over sodium sulphate and evaporated under vacuum. The crude was purified by column chromatography (41% EA/Hexane) to obtain title compound as white solid (90 mg, 26%)

$^1$H NMR (400 MHz, DMSO-d6) δ 12.01 (s, 1H), 8.05 (d, J=7.8 Hz, 1H), 7.59-7.35 (m, 2H), 7.07 (t, J=7.5 Hz, 1H), 3.18-3.07 (m, 2H), 1.58 (dt, J=7.7 Hz, 2H), 1.32-1.04 (m, 12H), 0.82 (t, J=6.9 Hz, 3H). MS observed: 457.1(M-H)

Synthesis of 2-(nonylsulfonamido)benzenesulfonamide

Step-1: 2-aminobenzenesulfonamide

A solution of 2-nitrobenzenesulfonamide (1 g, 4.90 mmol) in MeOH (8 ml) was purged with nitrogen. 10% Pd/C (50% wet, 100 mg) was charged and stirred the reaction mixture under hydrogen balloon pressure for 3 h. After completion of reaction as indicated by TLC, reaction mixture was filtered through a bed of celite and washed with methanol. The filtrate was evaporated under vacuum to obtain 2-aminobenzenesulfonamide (750 mg, 88%). MS observed: 173.1(M$^+$H)

Step-2: 2-(nonylsulfonamido)benzenesulfonamide

To a solution of 2-aminobenzenesulfonamide (200 mg, 1.16 mmol) and nonylsulfonylchloride (262 mg, 1.16 mmol) in chloroform (3 ml), pyridine (0.6 ml, 8.13 mmol) was added at room temperature and stirred at 50° C. for 16 h. The reaction mixture was poured in to dilute HCl and extracted with DCM (3×10 ml). The combined organic layer was dried over sodium sulphate and evaporated under vacuum. The crude was purified by column chromatography (37% Ethyl acetate/Hexane) to obtain title compound as white solid (109 mg, 26%). $^1$H NMR (400 MHz, DMSO-d6) δ 8.83 (s, 1H), 7.91-7.79 (m, 2H), 7.68-7.55 (m, 3H), 7.29 (t, J=7.3 Hz, 1H), 3.32-3.22 (m, 2H), 1.63 (dt, J=7.8 Hz, 2H), 1.37-1.09 (m, 12H), 0.83 (t, J=6.9 Hz, 3H). MS observed: 361.2(M-H)

Synthesis of 1-(nonylsulfonyl)-1,4-dihydro-2H-benzo[d][1,3]oxazin-2-one

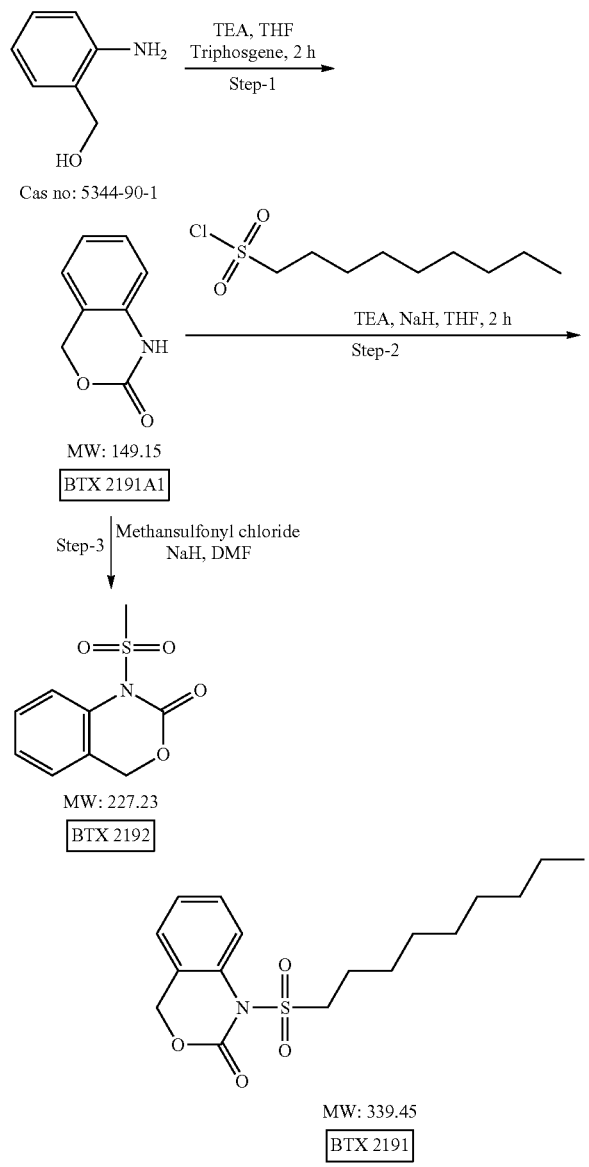

Step-1: 1,4-dihydro-2H-benzo[d][1,3]oxazin-2-one

A solution of (2-aminophenyl)methanol (500 mg, 4.06 mmol) and triphosgene (1.44 g, 4.72 mmol) in THF (5 ml) was stirred for 10 min and TEA (1.2 ml, 8.12) was added to the reaction mixture and stirred for 1 h. After completion of reaction as indicated by TLC, reaction mixture was poured in to water and extracted with ethyl acetate (3×10 ml). The combined organic layer was dried over anhydrous sodium sulphate and evaporated under vacuum. The crude was purified by silica gel column chromatography (26% Ethyl acetate/Hexane) to obtain title compound (200 mg, 33%). MS observed: 149.9(M$^+$H)

Step-2: 1-(nonylsulfonyl)-1,4-dihydro-2H-benzo[d][1,3]oxazin-2-one

To a solution of 1,4-dihydro-2H-benzo[d][1,3]oxazin-2-one(100 mg, 0.67 mmol) in THF (1 ml), TEA(0.15 ml, 1.04 mmol) was added at 0° C. followed by addition of sodium hydride(44 mg, 1.10 mmol) and stirred for 1 h. Nonylsulfonyl chloride (227 mg, 1 mmol) was added to the reaction mixture and stirred for 48 h. The reaction mixture was poured in to dilute HCl and extracted with ethyl acetate (3×10 ml). The crude was purified by silica gel column chromatography (20% Ethyl acetate/Hexane) to obtain title compound as white solid (77 mg, 34%). $^1$H NMR (400 MHz, DMSO-d6) δ 7.56-7.39 (m, 3H), 7.29 (t, J=7.2 Hz, 1H), 5.35 (s, 2H), 3.98-3.82 (m, 2H), 1.98-1.77 (m, 2H), 1.55-1.09 (m, 12H), 0.84 (t, J=6.9 Hz, 3H). MS observed: 357.2 (M$^+$18)

Step-3: 1-(methylsulfonyl)-1,4-dihydro-2H-benzo[d][1,3]oxazin-2-one 1,4-dihydro-2H-benzo[d][1,3]oxazin-2-one(50 mg, 0.34 mmol) was added to the pre-stirred solution of sodium hydride (22 mg, 0.55 mmol) in DMF (4 ml) and stirred for 30 min at 0° C. methanesulfonyl chloride was added to the reaction mixture and allowed to stir at room temperature for 7 h. Reaction mixture was quenched with dilute HCl and extracted with ethyl acetate (3×10 ml). The combined organic layer was washed with water, dried over anhydrous sodium sulphate and evaporated to dryness. The crude was purified by column chromatography (38% Ethyl acetate/Hexane) to obtain title compound as white solid (35 mg, 46%).

$^1$H NMR (400 MHz, DMSO) δ 7.77 (d, J=8.1 Hz, 1H), 7.47-7.42 (m, 2H), 7.31 (t, J=7.3 Hz, 1H), 5.36 (s, 2H), 3.76 (s, 3H). MS observed: 228.10(M$^+$H)

Synthesis of N-(2-fluorophenyl)nonane-1-sulfonamide

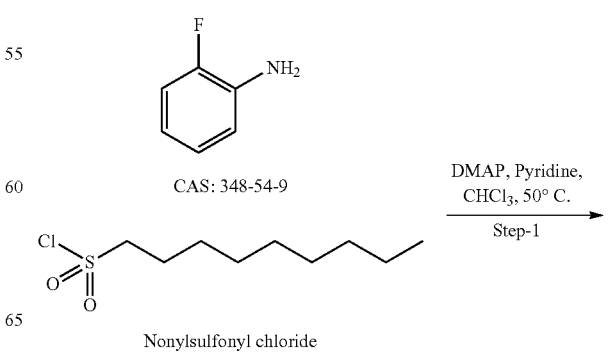

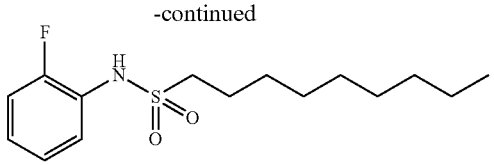

MW: 301.42

BTX 1101

To a solution of methyl 2-fluoroaniline (300 mg, 2.70 mmol), nonylsulfonyl chloride (610 mg, 2.70 mmol) and DMAP (32 mg) in chloroform (3 ml), pyridine (0.64 ml, 8.1 mmol) was added at room temperature and stirred at 50 0C for 18 h. The reaction mixture was poured in to dilute HCl and extracted with DCM (3×20 ml). The combined organic layer was washed sodium bicarbonate (10 ml), brine (10 ml), dried over anhydrous sodium sulphate and evaporated under vacuum. The crude was purified by column chromatography (20% Ethyl acetate/Hexane) to obtain title compound as colorless oil (124 mg, 15%). $^1$H NMR (400 MHz, DMSO-d6) δ 9.57 (s, 1H), 7.39 (t, J=8.0 Hz, 1H), 7.32-7.03 (m, 3H), 3.11-3.00 (m, 2H), 1.69 (dt, J=7.7 Hz, 2H), 1.42-1.08 (m, 12H), 0.84 (t, J=6.8 Hz, 3H). MS observed: 300.5 (M-H)

Synthesis of N-(2-(methylsulfonyl)phenyl)nonane-1-sulfonamide

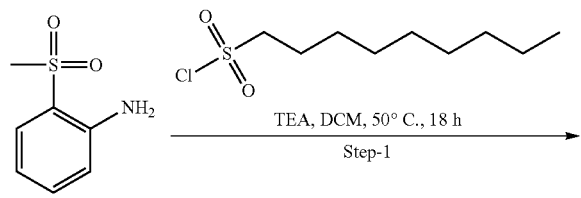

TEA, DCM, 50° C., 18 h
Step-1

CAS: 2987-49-7

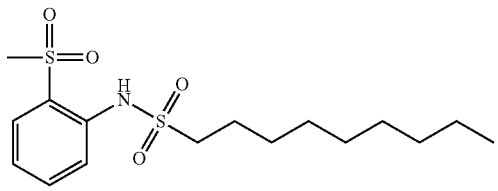

MW: 361.51

BTX 4171

To a solution of 2-(methylsulfonyl) aniline (50 mg, 0.29 mmol) and nonylsulfonyl chloride (65 mg, 0.28 mmol) in DCM (2 ml), TEA (0.2 ml, 1.45 mmol) was added at room temperature. The resulting reaction mixture was stirred at 50 0C for 18 h. The reaction mixture was poured in to dilute HCl and extracted with DCM (3×10 ml). The combined organic layer was dried over anhydrous sodium sulphate and evaporated under vacuum.

The crude was purified by silica gel column chromatography (20% EA/Hexane) to obtain title compound as colorless oil (20 mg, 19%).

$^1$H NMR (400 MHz, DMSO-d6) δ 9.11 (s, 1H), 7.91 (d, J=7.9 Hz, 1H), 7.73 (t, J=7.8 Hz, 1H), 7.63 (d, J=8.1 Hz, 1H), 7.40 (t, J=7.5 Hz, 1H), 3.48-3.37 (m, 2H), 3.32 (s, 3H), 1.70 (dt, J=7.7 Hz, 2H), 1.41-1.13 (m, 12H), 0.84 (t, J=6.7 Hz, 3H). MS observed: 360.3 (M-H)

Synthesis of N-(2-methoxyphenyl)nonane-1-sulfonamide

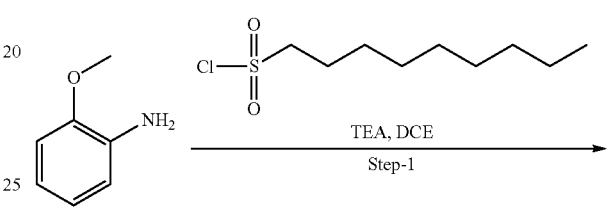

TEA, DCE
Step-1

CAS: 90-04-0
MW: 123.15

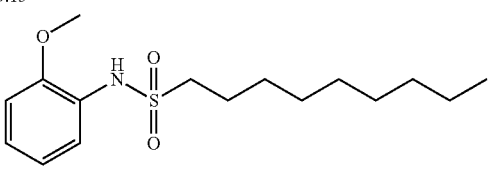

MW: 313.46

BTX 1027

To a solution of 2-methoxyaniline (100 mg, 0.81 mmol) and TEA (0.80 ml, 5.6 mmol) in DCE (3 ml), nonylsulfonyl chloride (184 mg, 0.81 mmol) was added and stirred at room temperature for overnight. Reaction mixture was quenched with water and extracted with ethyl acetate (3×10 ml). The combined organic layer was dried over anhydrous sodium sulphate and evaporated under vacuum. The crude was purified by reverse phase prep HPLC (acetonitrile/water) to obtain title compound as pale yellow gummy solid (14 mg, 5%). $^1$H NMR (400 MHz, DMSO-d6) δ 8.89 (s, 1H), 7.26 (dd, J=7.8, 1.4 Hz, 1H), 7.21-7.14 (m, 1H), 7.05 (d, J=8.2 Hz, 1H), 6.91 (t, J=7.6 Hz, 1H), 3.80 (s, 3H), 3.03-2.93 (m, 2H), 1.69 (dt, J=7.6 Hz, 2H), 1.38-1.14 (m, 12H), 0.85 (t, J=6.8 Hz, 3H). MS observed: 314.49(M$^+$H)

Following targets were prepared by following similar procedure as described for above examples.

TABLE 6

| No | Structure | Code | Analytical data |
|---|---|---|---|
| 1 | ![structure with Cl] | BTX 2111 | $^1$H NMR (400 MHz, DMSO-d6) δ 9.41 (s, 1H), 7.53-7.42 (m, J = 2H), 7.33 (td, J = 7.7, 1.5 Hz, 1H), 7.23 (td, J = 7.8, 1.6 Hz, 1H), 3.14-3.02 (m, 2H), 1.79-1.61 (m, 2H), 1.43-1.09 (m, 12H), 0.84 (t, J = 6.8 Hz, 3H). MS observed: 316.3 (M − H) |

TABLE 6-continued

| No | Structure | Code | Analytical data |
|---|---|---|---|
| 2 | [Structure: 2-bromo phenyl sulfonamide with alkyl chain] | BTX 2121 | $^1$H NMR (400 MHz, DMSO-d6) δ 9.34 (s, 1H), 7.63 (dd, J = 8.0, 1.3 Hz, 1H), 7.42 (dd, J = 8.0, 1.6 Hz, 1H), 7.38-7.30 (m, 1H), 7.16-7.04 (m, 1H), 3.14-3.00 (m, 2H), 1.78-1.59 (m, 2H), 1.43-1.06 (m, 12H), 0.91-6.74 (m, 3H). MS observed: 360.3 (M − H) |
| 3 | [Structure: 2-nitro phenyl sulfonamide with alkyl chain] | BTX 3131 | $^1$H NMR (400 MHz, DMSO-d6) δ 9.73 (s, 1H), 7.98 (d, J = 8.2 Hz, 1H), 7.70 (t, J = 7.9 Hz, 1H), 7.60 (d, J = 8.2 Hz, 1H), 7.38 (d, J = 7.9 Hz, 1H), 3.28-3.12 (m, 2H), 1.73-1.58 (m, 2H), 1.41-1.10 (m, 12H), 0.84 (t, J = 6.8 Hz, 3H). MS observed: 327.3 (M − H) |

Example 2

We present a comprehensive overview of how the MYC oncogene controls lipogenesis to promote tumorigenesis. We find that MYC globally regulates the expression of key genes and their resulting proteins and metabolites in lipogenesis for human and murine cell lines as well as for transgenic mouse models. By gene expression analysis, nuclear run-on, $^{13}$C-isotope labeling, and chromatin immuno-precipitation, MYC in conjunction with a Sterol Regulatory Element-Binding Protein 1 (SREBP1) was found to induce the nonlinear expression of fatty acid biosynthesis pathway genes including Acetyl-CoA Carboxylase A (ACACA), Fatty Acid Synthase (FASN), and Stearoyl-CoA Desaturase (SCD) and to drive fatty acid chain elongation from glucose and glutamine. Desorption electrospray ionization mass spectrometric imaging (DESI-MSI) from tissue samples of several conditional transgenic mouse models identified in vivo metabolic changes in simple fatty acids and in complex phospholipids induced by MYC. Thus, MYC not only increased oleate abundance in multiple tumors, but also notably elevated the abundances of phosphatidylglycerols with elongation of fatty acid side chains and concomitant suppression of phosphatidylinositol abundances in a transgenic renal cell carcinoma model. Long, polyunsaturated fatty acids were also notably higher in abundance with prolonged MYC activation. Strong correlation between these in situ changes and elevation of gene expressions of cytidinediphosphate diacylglycerol pathway genes as well as fatty acid elongase genes were found. By administering FSG67, which inhibits GPAT, MYC-induced tumorigenesis was blocked, metabolic changes were suppressed, and tumors regressed in xenograft and primary mouse models. These results expose the vulnerability of MYC-induced cancers to inhibition of GPAT, thereby providing a therapeutic approach to treatment.

Our results show that MYC induced tumors are dependent on lipogenesis and phospholipid synthesis. MYC induced human tumors can be highly sensitive to inhibition of phospholipid synthesis. There is an emerging general model, that MYC orchestrates the orderly activation of glycolysis, glutaminolysis, phospholipid and fatty acid synthesis, providing a means for the balanced acquisition of nutrients and stoichiometric production of cellular biomass. For a normal cell, this is essential to enable the coordination between coordinating the need for energy metabolism and generating building blocks for biomass generation. MYC's regulation of lipid metabolism similarly is required to coordinate the respective requirements for energy, signaling molecules and membrane production. For a cancer cell, MYC overexpression provides the ability to maximize unrestrained growth but at the expense of a remarkable vulnerability to the inhibition of key regulators of this pathway.

Figure 2:
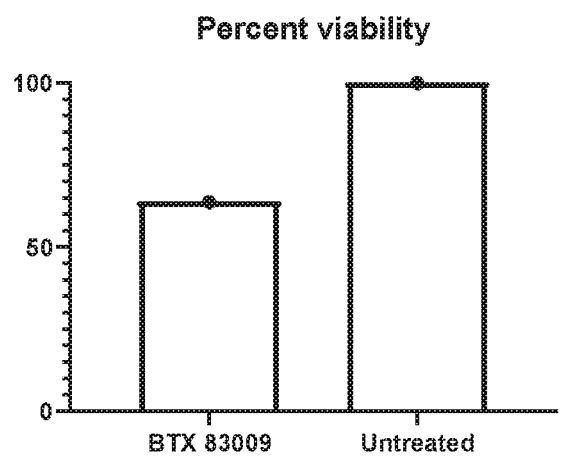
FIG. 2 illustrates that exemplary GPAT inhibitor BTX 83009 suppresses cancer cell proliferation.
Figure 3:
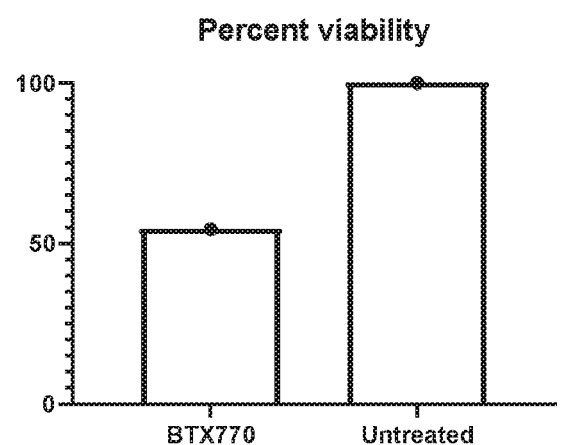
FIG. 3 illustrates that exemplary GPAT inhibitor BTX 770 suppresses cancer cell proliferation.
Figure 4:
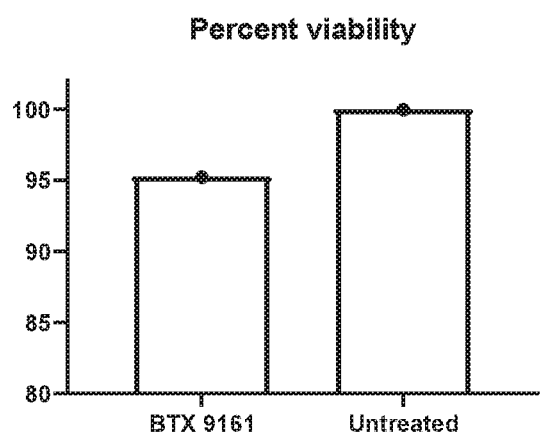
FIG. 4 illustrates that exemplary GPAT inhibitor BTX 9161 suppresses cancer cell proliferation.
Figure 5:
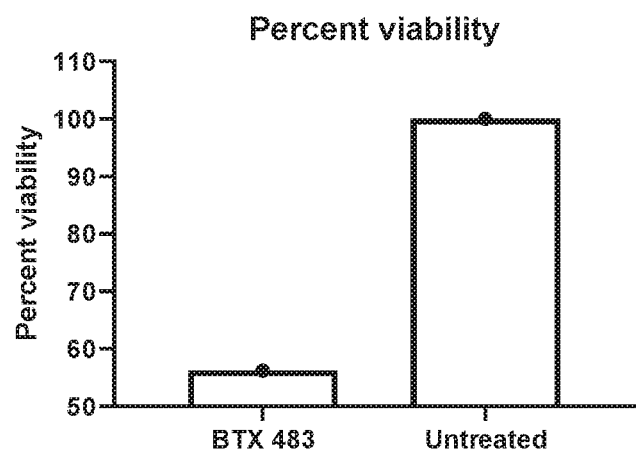
FIG. 5 illustrates that exemplary GPAT inhibitor BTX 783 suppresses cancer cell proliferation.
Figure 6:
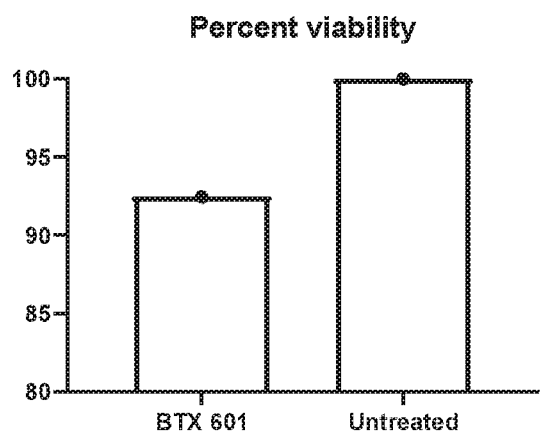
FIG. 6 illustrates that exemplary GPAT inhibitor BTX 601 suppresses cancer cell proliferation.
Figure 7:
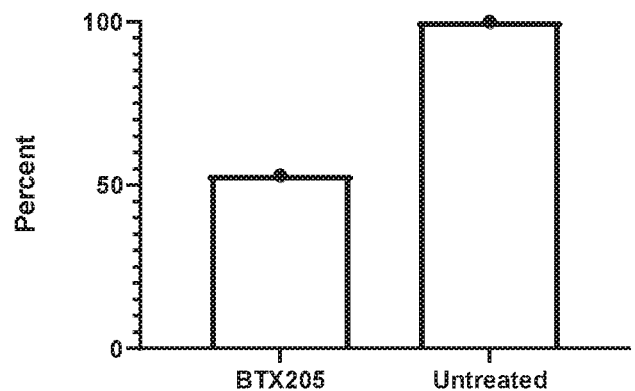
FIG. 7 illustrates that exemplary GPAT inhibitor BTX 205 suppresses renal cell carcinoma cell proliferation.
Figure 8:
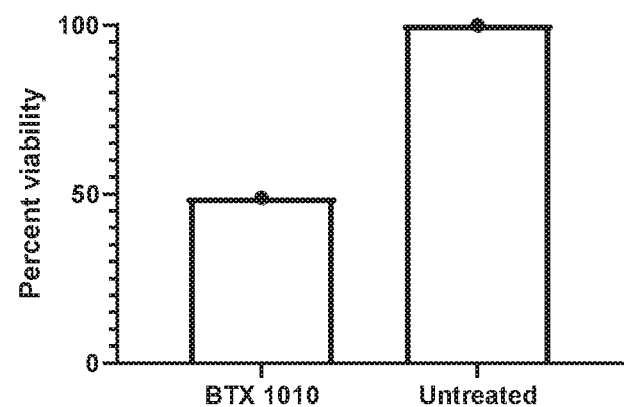
FIG. 8 illustrates that exemplary GPAT inhibitor BTX 1010 suppresses cancer cell proliferation.
Figure 9:
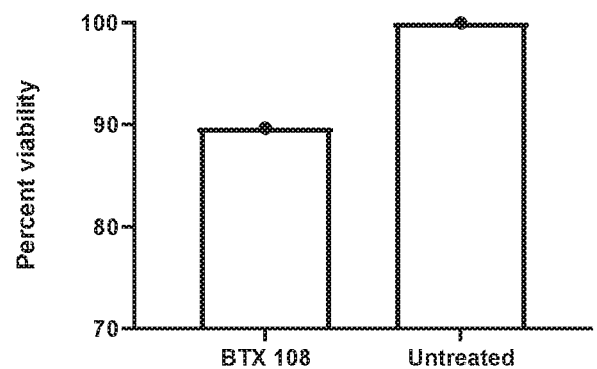
FIG. 9 illustrates that exemplary GPAT inhibitor BTX 108 suppresses cancer cell proliferation.
Figure 10:
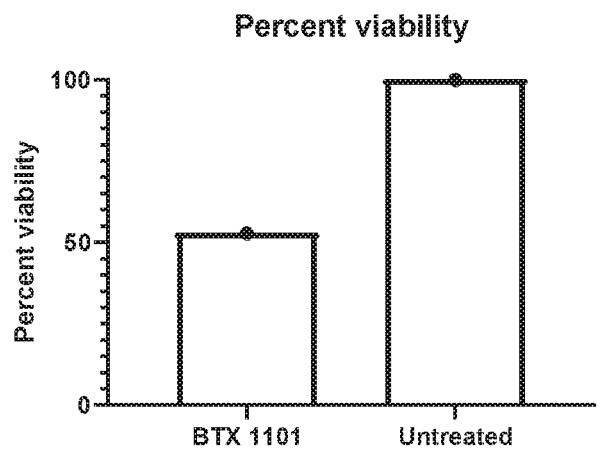
FIG. 10 illustrates that exemplary GPAT inhibitor BTX 1101 suppresses cancer cell proliferation.
Figure 11:
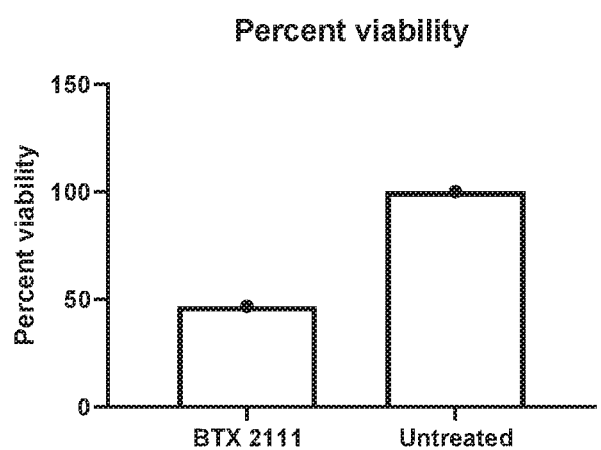
FIG. 11 illustrates that exemplary GPAT inhibitor BTX 2111 suppresses cancer cell proliferation.
Figure 12:
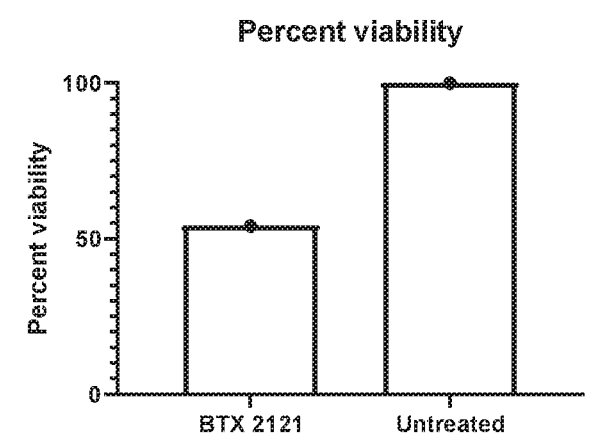
FIG. 12 illustrates that exemplary GPAT inhibitor BTX 2121 suppresses cancer cell proliferation.
Figure 13:
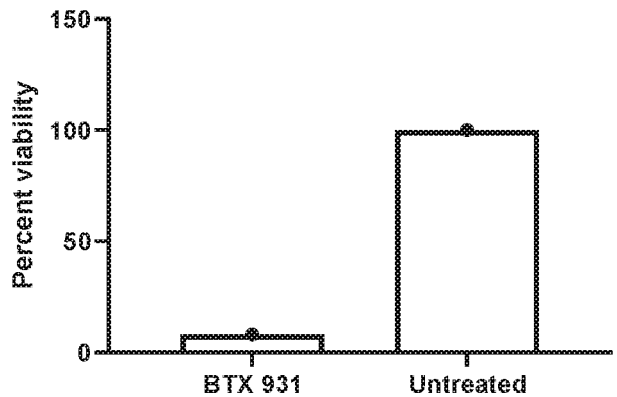
FIG. 13 illustrates that exemplary GPAT inhibitor BTX 931 suppresses Burkitt lymphoma cell proliferation.
Figure 14:
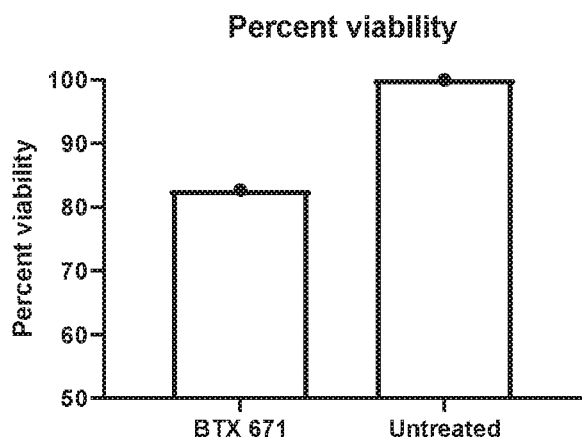
FIG. 14 illustrates that exemplary GPAT inhibitor BTX 671 suppresses cancer cell proliferation.
Figure 15:
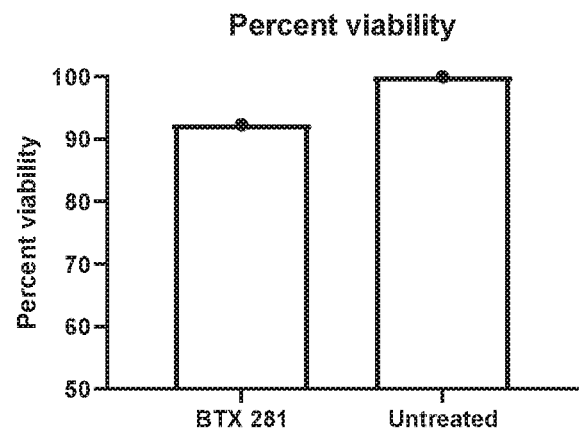
FIG. 15 illustrates that exemplary GPAT inhibitor BTX 281 suppresses cancer cell proliferation.
Figure 16:
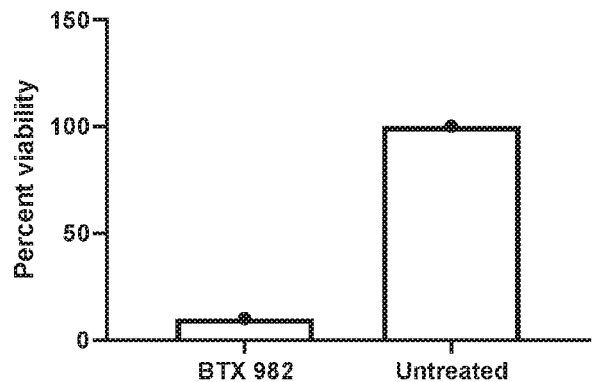
FIG. 16 illustrates that exemplary GPAT inhibitor BTX 982 suppresses Burkitt lymphoma cell proliferation.
Figure 17:
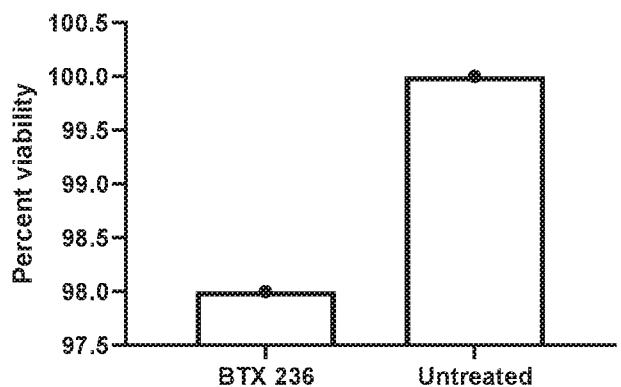
FIG. 17 illustrates that exemplary GPAT inhibitor BTX 236 suppresses cancer cell proliferation.
Figure 18:
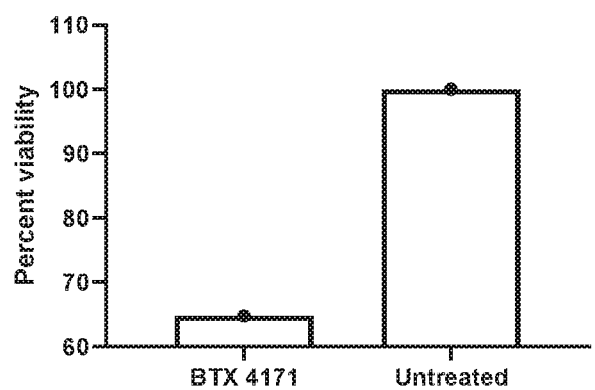
FIG. 18 illustrates that exemplary GPAT inhibitor BTX 4171 suppresses cancer cell proliferation.
Figure 19:
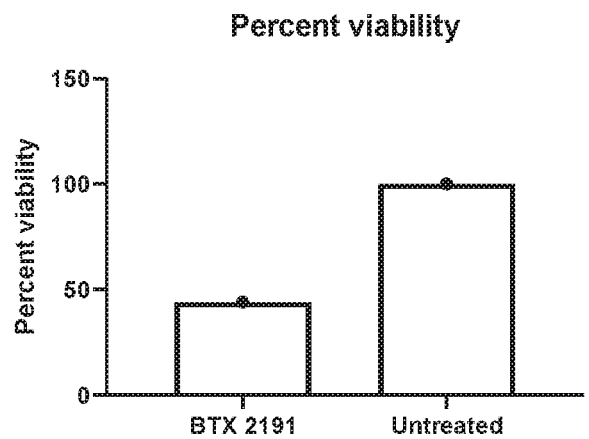
FIG. 19 illustrates that exemplary GPAT inhibitor BTX 2191 suppresses cancer cell proliferation.
Figure 20:
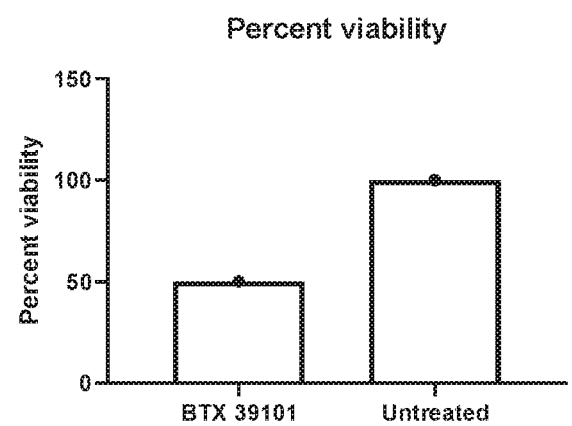
FIG. 20 illustrates that exemplary GPAT inhibitor BTX 39101 suppresses cancer cell proliferation.
Figure 21:
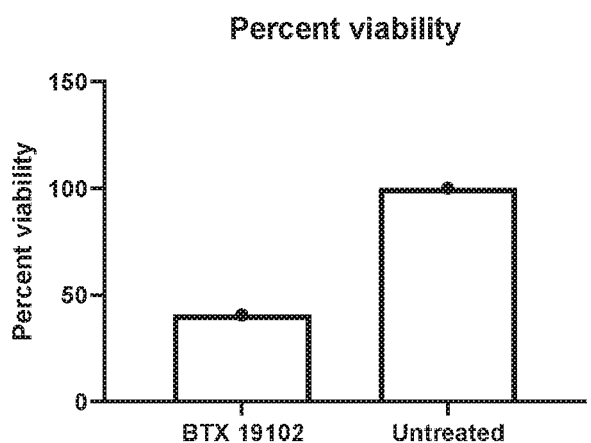
FIG. 21 illustrates that exemplary GPAT inhibitor BTX 19102 suppresses cancer cell proliferation.
Figure 22:
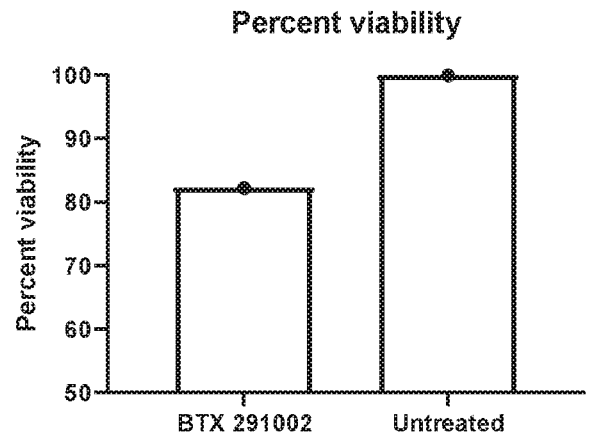
FIG. 22 illustrates that exemplary GPAT inhibitor BTX 291002 suppresses cancer cell proliferation.
Figure 23:
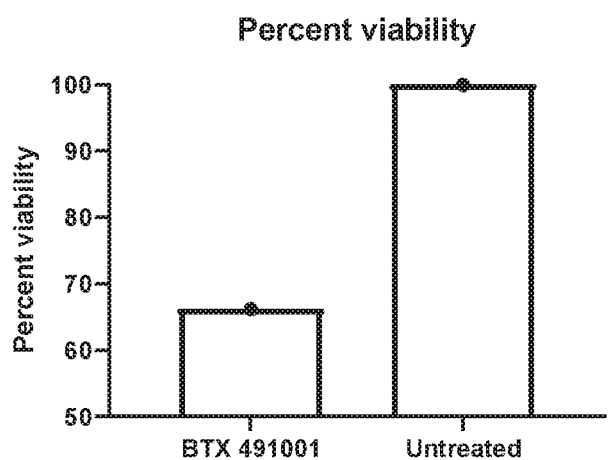
FIG. 23 illustrates that exemplary GPAT inhibitor BTX 491001 suppresses cancer cell proliferation.
Figure 24:
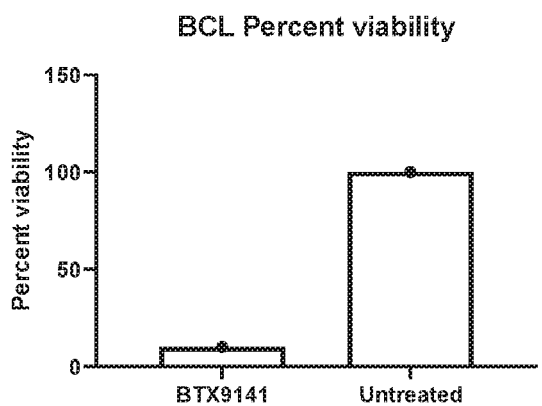
FIG. 24 illustrates that exemplary GPAT inhibitor BTX 9141 suppresses Burkitt lymphoma cell proliferation.
Figure 25:
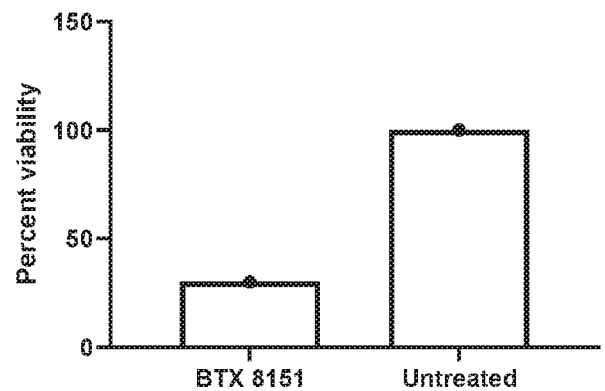
FIG. 25 illustrates that exemplary GPAT inhibitor BTX 8151 suppresses Burkitt lymphoma cell proliferation.
Figure 26:
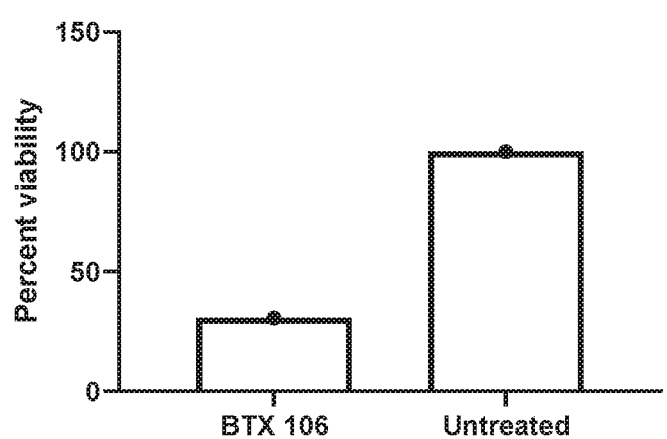
FIG. 26 illustrates that exemplary GPAT inhibitor BTX 106 suppresses Burkitt lymphoma cell proliferation.
Figure 27:
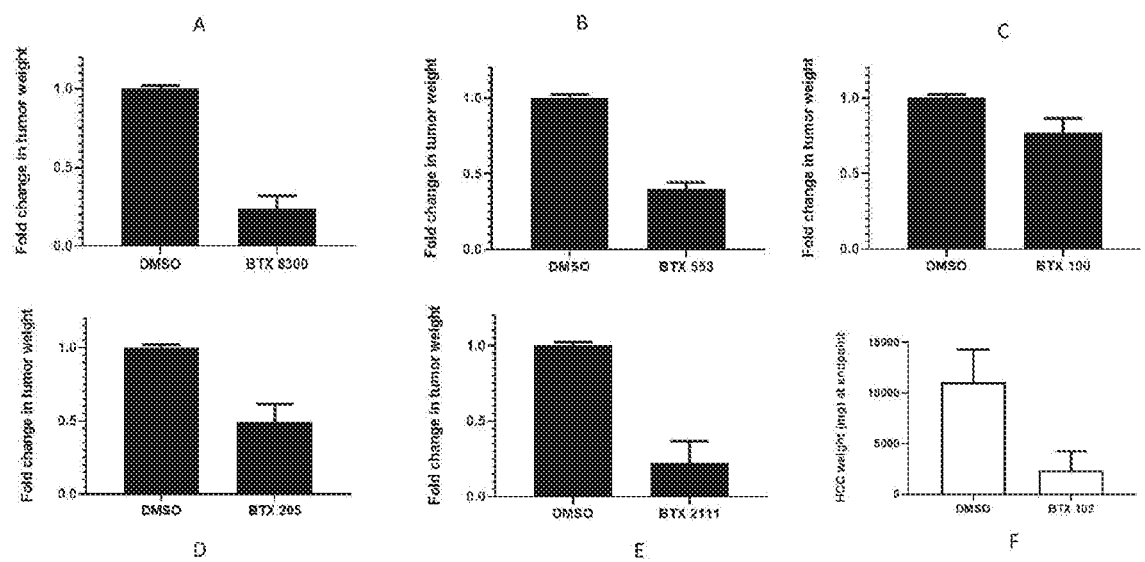
FIGS. 27A-27F. All data points in black bars are done on RCC tumors in mice upon injection of the indicated compound at 10 mg/kg after 7 days. The blank bar was performed on HCC tumors in mice upon injection of the indicated compound at 10 mg/kg after 7 days.

FIG. 1-26 illustrate various exemplary GPAT inhibitors that suppress cancer cell proliferation. With reference to FIG. 1-26: BCL stands for Burkitt lymphoma line, all experiments on BCL were done using trypan blue and cell counts. Cells are treated 1-3 days with dosage range 1 mM to 0.1 nM. RCC stands for renal cell carcinoma, all experiments on RCC were in vivo experiments. Tumors are treated with dosage range 0.1 mg/kg to 100 mg/kg for X days, wherein X ranges from 7 to 30 days. All experiments are done in MTT assay on mouse hepatocellular carcinoma lines that are treated 1-3 days with the dosage range from 1 mM to 0.1 nM. The bar in each of FIGS. 1-26 entitled "Untreated" refers to a sample without an exemplary GPAT inhibitor compound, diluted in DMSO solvent.

Example 3

In Vivo Efficacy

MYC RCC mice were generated by crossing FVB/N-Tg (tetO-MYC)$_{28}$aBop/J mice for MYC with Tg(Ggt1-tTA) #Agoc or (GGT-tTA) for kidney specificity. MYC HCC mice were generated by crossing FVB/N-Tg(tetO-MYC)$_{28}$aBop/J mice for MYC with Tg(Cebpb-tTA)$_5$Bjd or (LAP-tTA) for liver specificity. All parental lines had undergone at least 10 generations of backcrossing. MYC RCC and MYC HCC mice were bred on doxycycline until 4 weeks of age, when doxycycline was replaced with water for at least 2 weeks for tumorigenesis depending on the experiment described in the patent. Light cycle for the duration of the study was set to 12-hour light/12-hour darkness. Permissible temperature and relative humidity levels were 68 F-79 F and 30%-70%. For in vivo treatment of mice, 10 mg/kg of BTX compounds were administered weekly by intraperitoneal injections (IP) for treatment periods that last for more than a week. The stock BTXs were diluted in 0.1% DMSO. Mice received IP injection of 10 mg/kg of the indicated compound, starting on day 14 upon MYC induction in the MYC induced RCC transgenic mouse models, and the kidneys were harvested and weighed 7 days later. Male and female That which is claimed is:

1. A method of treating a subject for cancer, the method comprising:
   administering an effective dose of a GPAT inhibitor described by formula (IIAa):
   comparing a lipogenesis profile obtained from a subject having a neoplasm with a reference lipogenesis profile to classify whether the neoplasm is lipogenesis-dependent; and
   administering to the subject an effective amount of a GPAT inhibitor described by formula (IIAa):

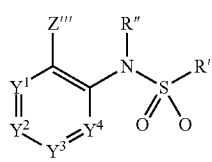
(IIAa)

wherein:
   Z''' is a heteroaryl or substituted heteroaryl;
   R' is an alkyl, substituted alkyl, cycloalkyl, or heterocycloalkyl, wherein alkyl moieties are optionally substituted with a group selected from $OCH_3$, and $CF_3$;
   R" is hydrogen;
   $Y^1$ is $CR^1$;
   $Y^2$ is $CR^2$;
   $Y^3$ is $CR^3$;
   $Y^4$ is $CR^4$; and
   $R^1$-$R^4$ are hydrogen, when the neoplasm is classified as lipogenesis-dependent, to treat the subject for the lipogenesis-dependent neoplasm for a period of time sufficient to inhibit growth of the cancer.

2. A method of treating a subject for cancer, the method comprising:
   administering an effective dose of a GPAT inhibitor wherein the GPAT inhibitor has the structure:

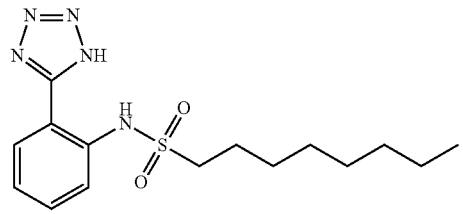 [SMILES: CCCCCCCCS(=O)(=O)Nc1ccccc1-c1nnn[nH]1]

for a period of time sufficient to inhibit growth of the cancer.

3. A method of treating a subject for cancer, the method comprising:
   administering an effective dose of a GPAT inhibitor described by formula (IIAa):

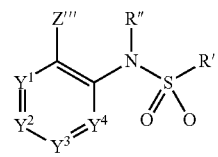
(IIAa)

wherein:
   Z''' is

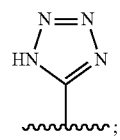

R' is an alkyl, substituted alkyl, cycloalkyl, or heterocycloalkyl, wherein alkyl moieties are optionally substituted with a group selected from $OCH_3$, and $CF_3$;
   R" is hydrogen;
   $Y^1$ is $CR^1$;
   $Y^2$ is $CR^2$;
   $Y^3$ is $CR^3$;
   $Y^4$ is $CR^4$; and
   $R^1$-$R^4$ are hydrogen;
   for a period of time sufficient to inhibit growth of the cancer.

4. The method of claim 3, wherein the GPAT inhibitor is selected from

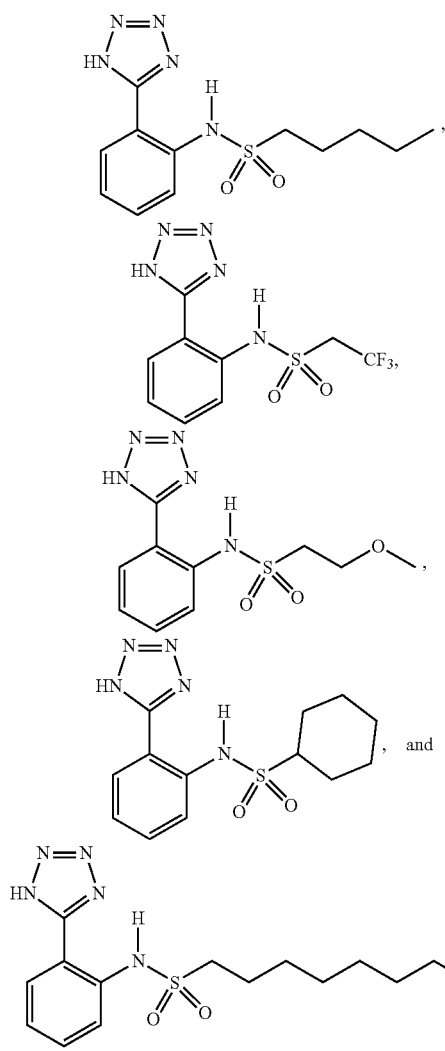

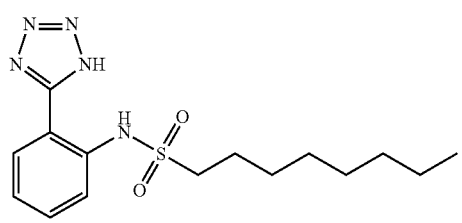 [SMILES: CCCCCCCCS(=O)(=O)Nc1ccccc1-c1nnn[nH]1]

5. A method of treating a metabolic syndrome related disease, the method comprising:
   administering to a subject an effective dose of a GPAT inhibitor wherein the GPAT inhibitor has the structure:

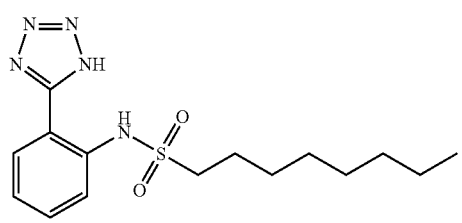 [SMILES: CCCCCCCCS(=O)(=O)Nc1ccccc1-c1nnn[nH]1]

for a period of time sufficient to reduce symptoms of the disease in the subject.

6. A method of treating a metabolic syndrome related disease, the method comprising:
   administering an effective dose of a GPAT inhibitor described by formula (IIAa):

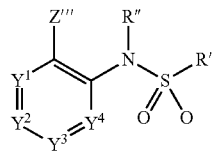

wherein:
Z''' is

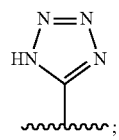

R' is an alkyl, substituted alkyl, cycloalkyl, or heterocycloalkyl, wherein alkyl moieties are optionally substituted with a group selected from $OCH_3$, and $CF_3$;
R'' is hydrogen;
$Y^1$ is $CR^1$;
$Y^2$ is $CR^2$;
$Y^3$ is $CR^3$;
$Y^4$ is $CR^4$; and
$R^1$-$R^4$ are hydrogen for a period of time sufficient to reduce symptoms of the disease in the subject.

7. The method of claim 6, wherein the GPAT inhibitor is selected from

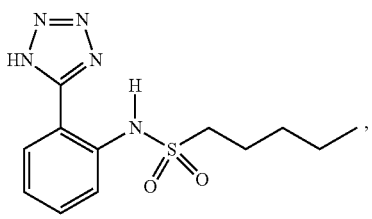

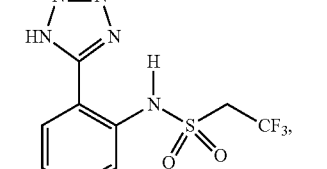

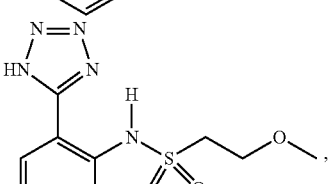

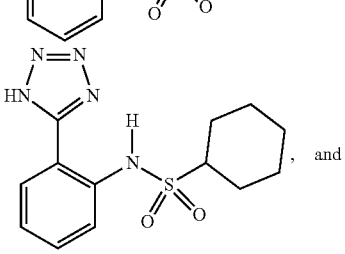

-continued
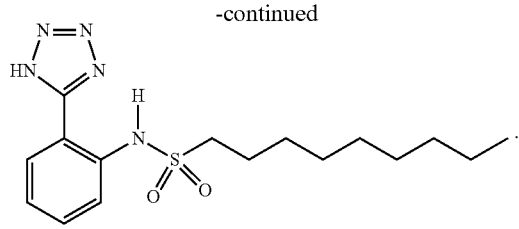
* * * * *